(12) United States Patent
Kohler et al.

(10) Patent No.: US 9,151,384 B2
(45) Date of Patent: Oct. 6, 2015

(54) PRIMARY CLUTCH ELECTRONIC CVT

(71) Applicant: Polaris Industries Inc., Medina, MN (US)

(72) Inventors: Beat R. Kohler, Kirchberg (CH); Stephen L. Nelson, Osceola, WI (US); Brian R. Gillingham, Osceola, WI (US); Urs Wenger, Rumisberg (CH); Donovan L. Fredrickson, Independence, MN (US); Brian D. Krosschell, North Branch, MN (US); Karl J. Grajkowski, Hudson, WI (US); Philipp Meyer, Bern (CH); Donald E. Frost, Roseau, MN (US); Ronald Zurbruegg, Oppligen (CH); Peter J. Erasmus, Mellingen (CH)

(73) Assignee: Polaris Industries Inc., Medina, MN (US)

( * ) Notice: Subject to any disclaimer, the term of this patent is extended or adjusted under 35 U.S.C. 154(b) by 143 days.

(21) Appl. No.: 13/652,297

(22) Filed: Oct. 15, 2012

(65) Prior Publication Data

US 2013/0096784 A1    Apr. 18, 2013

Related U.S. Application Data

(60) Provisional application No. 61/547,485, filed on Oct. 14, 2011.

(51) Int. Cl.
*F16H 61/662* (2006.01)
*F16H 63/06* (2006.01)
(Continued)

(52) U.S. Cl.
CPC .......... *F16H 63/50* (2013.01); *F16H 61/66259* (2013.01); *F16H 63/067* (2013.01); *F16H 59/06* (2013.01); *F16H 2059/0226* (2013.01); *F16H 2059/082* (2013.01); *Y10T 477/6237* (2015.01)

(58) Field of Classification Search
CPC .................. F16H 2059/0226; F16H 2059/082; F16H 63/067; F16H 61/66259
USPC ......... 701/51, 52, 67, 68; 192/32; 477/34, 37, 477/38, 39
See application file for complete search history.

(56) References Cited

U.S. PATENT DOCUMENTS

| 5,025,686 | A | 6/1991 | Sato et al. |
| 5,094,652 | A | 3/1992 | Sakakibara et al. |

(Continued)

FOREIGN PATENT DOCUMENTS

| CN | 101382193 | 3/2009 |
| DE | 10231210 | 1/2004 |

(Continued)

OTHER PUBLICATIONS

Gangadurai et al.; Development of control strategy for optimal control of a continuously variable transmission operating in combination with a throttle controlled engine; SAE International; Oct. 12, 2005.

(Continued)

*Primary Examiner* — Fadey Jabr
*Assistant Examiner* — Aaron L Troost
(74) *Attorney, Agent, or Firm* — Faegre Baker Daniels LLP

(57) ABSTRACT

A continuously variable transmission (CVT) is provided for use on a recreational or utility vehicle. The CVT is electronically controlled by at least one control unit of the vehicle. The CVT includes a primary clutch having a first sheave and a second sheave moveable relative to the first sheave. An actuator controls movement of the second sheave.

15 Claims, 33 Drawing Sheets

(51) Int. Cl.
*F16H 63/50* (2006.01)
*F16H 59/08* (2006.01)
*F16H 59/02* (2006.01)
*F16H 59/06* (2006.01)

(56) References Cited

U.S. PATENT DOCUMENTS

| | | | |
|---|---|---|---|
| 5,514,046 | A | 5/1996 | Petersmann et al. |
| 5,976,054 | A | 11/1999 | Yasuoka |
| 6,182,784 | B1 | 2/2001 | Pestotnik |
| 6,257,081 | B1 | 7/2001 | Gagnon |
| 6,379,278 | B1 | 4/2002 | Eguchi et al. |
| 6,902,502 | B2 | 6/2005 | Murakami et al. |
| 7,282,010 | B2 * | 10/2007 | Iriyama et al. ............... 477/107 |
| 7,367,420 | B1 | 5/2008 | Sherrod et al. |
| 7,407,462 | B2 | 8/2008 | Tsukada et al. |
| 7,505,842 | B2 * | 3/2009 | Luh ................................ 701/55 |
| 7,641,588 | B2 | 1/2010 | Thomson |
| 7,688,557 | B2 | 3/2010 | Ishioka |
| 7,731,613 | B2 | 6/2010 | Ishida |
| 7,744,505 | B2 | 6/2010 | Tanaka et al. |
| 7,901,319 | B2 | 3/2011 | Tabata |
| 7,905,803 | B2 | 3/2011 | Mochizuki |
| 8,029,395 | B2 | 10/2011 | Hokari et al. |
| 8,052,572 | B2 | 11/2011 | Unno |
| 8,442,731 | B2 | 5/2013 | Unno |
| 8,534,413 | B2 | 9/2013 | Nelson et al. |
| 2002/0028727 | A1 * | 3/2002 | Iida et al. ..................... 477/125 |
| 2004/0097328 | A1 | 5/2004 | Makiyama et al. |
| 2004/0116245 | A1 | 6/2004 | Yamamoto et al. |
| 2004/0171457 | A1 | 9/2004 | Fuller |
| 2005/0096822 | A1 | 5/2005 | Aoki |
| 2005/0205313 | A1 | 9/2005 | Gilmore et al. |
| 2006/0137920 | A1 | 6/2006 | Aoki et al. |
| 2006/0213703 | A1 | 9/2006 | Long |
| 2007/0004552 | A1 | 1/2007 | Matsudaira et al. |
| 2007/0026982 | A1 | 2/2007 | Aoyama |
| 2007/0111854 | A1 * | 5/2007 | Tabata et al. ................. 477/110 |
| 2007/0207884 | A1 | 9/2007 | Unno |
| 2008/0103019 | A1 | 5/2008 | Cronin |
| 2008/0108463 | A1 | 5/2008 | Unno |
| 2008/0178838 | A1 | 7/2008 | Ota |
| 2008/0182713 | A1 | 7/2008 | Asaoka |
| 2008/0183350 | A1 | 7/2008 | Noguchi |
| 2008/0183357 | A1 | 7/2008 | Asaoka |
| 2008/0183359 | A1 | 7/2008 | Sawada |
| 2008/0194380 | A1 | 8/2008 | Unno |
| 2008/0215217 | A1 | 9/2008 | Unno |
| 2008/0287256 | A1 | 11/2008 | Unno |
| 2008/0319596 | A1 | 12/2008 | Yamada |
| 2009/0105039 | A1 | 4/2009 | Sah et al. |
| 2009/0239705 | A1 * | 9/2009 | Tawara et al. ................. 477/38 |
| 2009/0291788 | A1 | 11/2009 | Hokari et al. |
| 2010/0152982 | A1 | 6/2010 | Bowman et al. |
| 2011/0029181 | A1 | 2/2011 | Hyde et al. |
| 2011/0034279 | A1 | 2/2011 | Yamaguchi |
| 2011/0059821 | A1 | 3/2011 | Lee et al. |
| 2011/0070991 | A1 | 3/2011 | Wu et al. |
| 2011/0071712 | A1 | 3/2011 | Mizuno et al. |
| 2011/0152020 | A1 | 6/2011 | Brind'Amour et al. |
| 2011/0160969 | A1 | 6/2011 | Oguri et al. |
| 2011/0166755 | A1 | 7/2011 | Eguchi et al. |
| 2011/0306457 | A1 | 12/2011 | Lee et al. |
| 2012/0035019 | A1 | 2/2012 | Martini et al. |
| 2012/0178561 | A1 | 7/2012 | Lafreniere et al. |
| 2012/0238384 | A1 | 9/2012 | Lee et al. |
| 2013/0092468 | A1 | 4/2013 | Nelson et al. |
| 2013/0096793 | A1 | 4/2013 | Krosschell |
| 2014/0038755 | A1 | 2/2014 | Ijichi et al. |

FOREIGN PATENT DOCUMENTS

| | | |
|---|---|---|
| EP | 1865227 | 12/2007 |
| EP | 2131074 | 12/2009 |

OTHER PUBLICATIONS

Unno et al.; Development of Electronically Controlled DVT Focusing on Rider's Intention of Acceleration and Deceleration; SAE International; Oct. 30, 2007.
http://www.hilliardcorp.com/centrifugal-clutch.html, Motion Control Division, Centrifugal Clutches, accessed Jan. 8, 2013.
International Search Report and Written Opinion issued by the European Patent Office, dated Jul. 17, 2013, for International Application No. PCT/US2012/060269; 18 pages.
Non-final Office Action mailed Apr. 9, 2015, in corresponding U.S. Appl. No. 13/652,289; 19 pages.

* cited by examiner

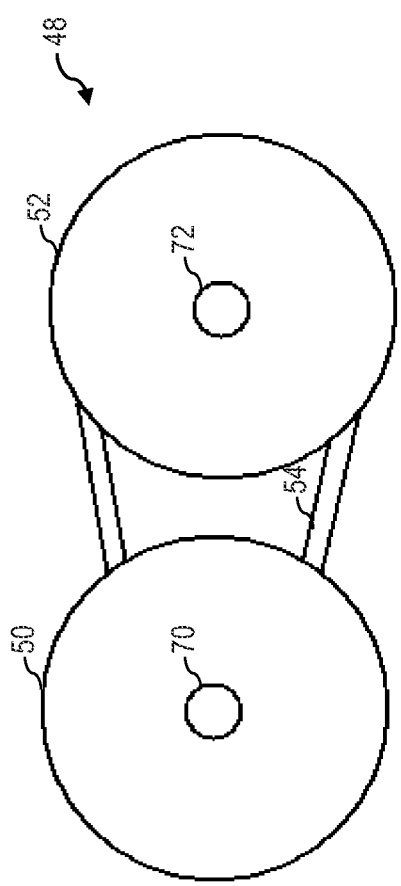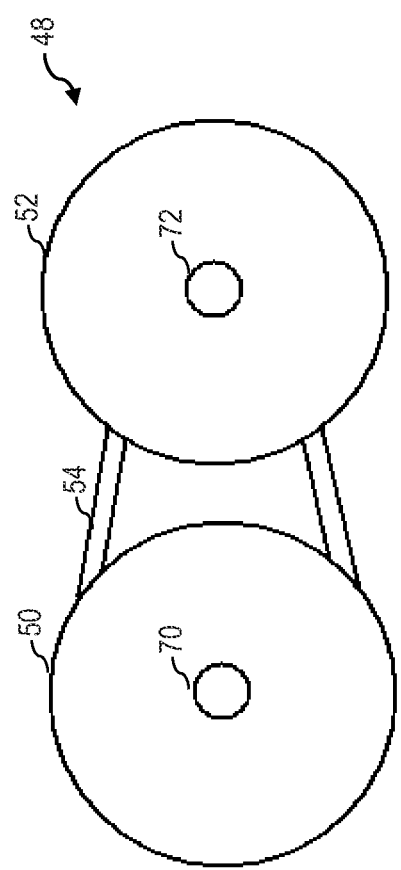

T0 = Torque Reduction Request Initiation
T1 = Onset of Torque Reduction
T2 = Start of Full Reduction
T3 = End of Full Reduction
T4 = End of Torque Reduction

PRIMARY CLUTCH ELECTRONIC CVT

RELATED APPLICATIONS

This application claims the benefit of U.S. Provisional Patent Application No. 61/547,485, titled "Primary Clutch Electronic CVT," filed Oct. 14, 2011, the disclosure of which is expressly incorporated by reference herein.

FIELD OF THE DISCLOSURE

The present disclosure relates to electronically controlled transmissions, and more particularly to systems and methods for controlling an electronically controlled continuously variable transmission (CVT) for recreational and utility vehicles.

BACKGROUND AND SUMMARY

Some recreational vehicles, such as all-terrain vehicles (ATV's), utility vehicles, motorcycles, etc., include a continuously variable transmission (CVT). In these vehicles, an actuator adjusts the position of one of the primary and secondary clutches of the CVT. The thrust requirement of the actuator for moving the clutch is generally dependent on the sliding friction between the movable sheave and the sliding coupling.

Available space is often limited around the CVT for placing the components of the actuator assembly. As such, actuator components having a large package size are often difficult to place in close proximity to the CVT. Further, the removal of some or all of the actuator components is often required when replacing the CVT belt.

A starting clutch is sometimes used to engage the CVT. The starting clutch is positioned at the driven or secondary clutch of the CVT to engage the secondary clutch when the CVT is in a low gear ratio condition. Due to the low speeds and high torques of the secondary clutch when the starting clutch engages the secondary clutch, the starting clutch is generally large in size.

In some recreational vehicles with CVT's, such as snowmobiles, the electrical system does not include a battery. As such, the rotational motion of the engine is used to generate power for the vehicle. In these vehicles, or in vehicles that experience a sudden power loss, the clutch assembly of the CVT may require a manual reset to a home position prior to starting the vehicle.

In an exemplary embodiment of the present disclosure, a recreational vehicle is provided including a chassis and a drive train. The drive train includes an engine supported by the chassis, a continuously variable transmission driven by the engine, and a ground engaging mechanism configured to support the chassis. The continuously variable transmission includes a first clutch and a second clutch. The first clutch is adjustable to modulate a gear ratio of the continuously variable transmission. The vehicle includes a suspension system coupled between the chassis and the ground engaging mechanism. The vehicle further includes at least one of a speed sensor and a suspension sensor. The speed sensor is configured to detect a speed of the drive train, and the suspension sensor is configured to detect a height of the suspension system. The vehicle further includes a controller configured to control the first clutch of the continuously variable transmission. The controller is operative to detect an airborne state of the vehicle based on at least one of the detected speed of the drive train and the detected height of the suspension system. The controller is operative to adjust the first clutch upon a detection of the airborne state to reduce an acceleration of the drive train.

In another exemplary embodiment of the present disclosure, a method of controlling a continuously variable transmission of a vehicle is provided. The method includes providing a vehicle including a chassis, a suspension system, and a drive train. The drive train includes an engine, a continuously variable transmission driven by the engine, and a ground engaging mechanism configured to support the chassis. The continuously variable transmission includes a first clutch and a second clutch. The first clutch is adjustable to modulate a gear ratio of the continuously variable transmission. The method includes detecting a speed of the drive train with a speed sensor and detecting an airborne state of the vehicle based on at least one of an acceleration of the drive train and a height of the suspension system. The acceleration is determined based on the detected speed of the vehicle. The method further includes adjusting the first clutch of the continuously variable transmission upon detection of the airborne state of the vehicle to reduce the acceleration of the drive train.

In yet another exemplary embodiment of the present disclosure, a method of controlling a continuously variable transmission of a vehicle is provided. The method includes providing a vehicle having a continuously variable transmission, an actuator coupled to the continuously variable transmission, and an auxiliary power connector configured to route electrical power from an external power supply to the actuator. The continuously variable transmission includes a first clutch, a second clutch, and a belt coupled to the first and second clutches. The actuator is configured to move the first clutch to adjust a gear ratio of the continuously variable transmission. The method includes detecting a connection of the external power supply to the auxiliary power connector. The method further includes routing to the actuator electrical power from the auxiliary power connector upon detecting the external power supply. The method further includes controlling the actuator with the electrical power to move the first clutch to a home position.

In still another exemplary embodiment of the present disclosure, a recreational vehicle is provided including a chassis and a drive train. The drive train includes an engine supported by the chassis, a continuously variable transmission driven by the engine, and a ground engaging mechanism configured to support the chassis. The continuously variable transmission includes a first clutch, a second clutch, and a belt coupled to the first and second clutches. The first clutch is adjustable to modulate a gear ratio of the continuously variable transmission. The vehicle further includes an actuator coupled to the continuously variable transmission for adjusting the first clutch. The vehicle further includes an auxiliary power connector configured to route electrical power to the actuator from an external power source. The vehicle further includes a controller operative to control routing of the electrical power from the external power source to the actuator to power the actuator. The controller is operative to detect a connection of the external power source to the auxiliary power connector and to control the actuator with the electrical power to move the first clutch to a home position upon detection of the external power supply.

In another exemplary embodiment of the present disclosure, a method of controlling a continuously variable transmission of a vehicle is provided. The method includes providing a vehicle having a continuously variable transmission, an actuator coupled to the continuously variable transmission, a power generator configured to provide electrical power to the vehicle during operation of the vehicle, and an energy storage device. The continuously variable transmission includes a first clutch and a second clutch. The actuator is configured to adjust a position of the first clutch to modulate a gear ratio of the continuously variable transmission. The method includes controlling the first clutch of the continuously variable transmission with the electrical power provided with the power generator. The method further includes charging the energy storage device with the electrical power provided with the power generator during operation of the vehicle while the energy storage device is electrically decoupled from the actuator. The method further includes detecting a loss of electrical power from the power generator. The method further includes routing electrical power from the energy storage device to the actuator to move the first clutch to a home position upon detecting the loss of electrical power from the power generator.

In yet another exemplary embodiment of the present disclosure, a recreational vehicle is provided that includes a chassis and a drive train. The drive train includes an engine supported by the chassis, a continuously variable transmission driven by the engine, and a ground engaging mechanism configured to support the chassis. The continuously variable transmission includes a first clutch, a second clutch, and a belt coupled to the first and second clutches. The first clutch is adjustable to modulate a gear ratio of the continuously variable transmission. The vehicle includes a power generator coupled to and driven by the engine for providing electrical power to the vehicle. The vehicle includes an energy storage device configured to store electrical power provided by the power generator. The vehicle further includes at least one controller operative to route power from the power generator to the actuator to control the position of first clutch of the continuously variable transmission during vehicle operation. The at least one controller is further operative to route electrical power stored at the energy storage device to the actuator to move the first clutch to a home position upon detection by the at least one controller of a loss of electrical power from the power generator.

In still another exemplary embodiment of the present disclosure, a method of controlling a continuously variable transmission of a vehicle is provided. The vehicle includes an engine operative to drive the continuously variable transmission. The continuously variable transmission of the vehicle includes a first clutch and a second clutch. The first clutch is moveable by an actuator to modulate a gear ratio of the continuously variable transmission. The method includes determining a speed of the engine of the vehicle, detecting a throttle demand, and determining a clutch control variable based on an operator input device. The method includes calculating a target engine speed based on the throttle demand and the clutch control variable. The method further includes calculating a target position of the first clutch of the continuously variable transmission based on the calculated target engine speed and the determined speed of the engine.

In another exemplary embodiment of the present disclosure, a vehicle is provided that includes a chassis, a ground engaging mechanism configured to support the chassis, an engine supported by the chassis, and a continuously variable transmission driven by the engine. The continuously variable transmission includes a first clutch, a second clutch, and a belt coupled to the first and second clutches. The first clutch is adjustable with an actuator to modulate a gear ratio of the continuously variable transmission. The vehicle includes a throttle valve configured to regulate a speed of the engine. The vehicle includes at least one controller including engine control logic operative to control a position of the throttle valve and transmission control logic operative to control a position of the first clutch of the continuously variable transmission. The vehicle further includes an engine speed sensor in communication with the at least one controller for detecting a speed of the engine. The vehicle further includes a throttle operator device moveable by an operator. The throttle operator device includes a position sensor in communication with the at least one controller, and the position sensor is configured to detect a position of the throttle operator. The vehicle further includes an operator input device in communication with the at least one controller and configured to adjust a clutch control variable provided to the at least one controller. The transmission control logic is operative to calculate a target engine speed based on the clutch control variable and the position of the throttle operator device. The transmission control logic is operative to calculate a target position of the first clutch of the continuously variable transmission based on the target engine speed and the detected engine speed.

In yet another exemplary embodiment of the present disclosure, a method of controlling a continuously variable transmission of a vehicle is provided. The vehicle includes an engine operative to drive the continuously variable transmission. The method includes controlling, by transmission control logic, a first clutch of the continuously variable transmission of the vehicle to an initial fixed position in a manual mode of operation. The continuously variable transmission includes the first clutch, a second clutch, and a belt coupled to the first and second clutches. The first clutch is adjustable to modulate a gear ratio of the continuously variable transmission. The first clutch of the continuously variable transmission in the manual mode of operation is adjustable between a plurality of discrete fixed positions based on shift requests initiated with a shift request device. The method further includes receiving a shift request identifying a target fixed position of the first clutch of the continuously variable transmission. The method further includes shifting the continuously variable transmission from the initial fixed position to the target fixed position. The method further includes initiating a torque reduction of the engine during the shifting to reduce a torque generated by the engine. At least one of a magnitude and a duration of the torque reduction is adjustable based on an operator input device.

In still another exemplary embodiment of the present disclosure, a vehicle is provided that includes a chassis, a ground engaging mechanism configured to support the chassis, an engine supported by the chassis, and a continuously variable transmission driven by the engine. The continuously variable transmission includes a first clutch, a second clutch, and a belt coupled to the first and second clutches. The first clutch is adjustable to modulate a gear ratio of the continuously variable transmission. The vehicle further includes at least one controller configured to control a position of the first clutch of the continuously variable transmission in a manual mode of operation. The vehicle further includes a shift request device in communication with the at least one controller. In the manual mode of operation, the first clutch of the continuously variable transmission is shifted by the at least one controller between a plurality of discrete fixed positions based on shift requests initiated with the shift request device. The vehicle further includes an operator input device in communication with the at least one controller. The at least one controller is operative to initiate a torque reduction of the engine during a shift of the first clutch of the continuously variable transmission from an initial fixed position to a target fixed position. At least one of a magnitude and a duration of the torque reduction is adjustable based on the operator input device.

In another exemplary embodiment of the present disclosure, a method of controlling a continuously variable transmission of a vehicle is provided. The vehicle includes an engine operative to drive the continuously variable transmission. The method includes controlling, by transmission control logic, the continuously variable transmission of the vehicle in a manual mode of operation. In the manual mode of operation, a plurality of indicated gears are selectable by the transmission control logic based on shift requests initiated with a shift request device. The plurality of indicated gears correspond to a plurality of fixed gear ratios of the continuously variable transmission and to at least one variable gear ratio of the continuously variable transmission. The method includes receiving a first shift request identifying an initial indicated gear of the plurality of indicated gears. The method further includes varying the gear ratio of the continuously variable transmission across a predetermined range of gear ratios based on the initial indicated gear identified with the first shift request. The method further includes receiving a second shift request identifying a different indicated gear of the plurality of indicated gears. The method further includes controlling the continuously variable transmission to a fixed gear ratio upon receipt of the second shift request based on the different indicated gear identified with the second shift request.

In yet another exemplary embodiment of the present disclosure, a vehicle is provided including a chassis, a ground engaging mechanism configured to support the chassis, an engine supported by the chassis, and a continuously variable transmission driven by the engine. The continuously variable transmission includes a first clutch, a second clutch, and a belt coupled to the first and second clutches. The first clutch is adjustable to modulate a gear ratio of the continuously variable transmission. The vehicle further includes at least one controller configured to control the gear ratio of the continuously variable transmission in a manual mode of operation. The vehicle further includes a shift request device in communication with the at least one controller. In the manual mode of operation, a plurality of indicated gears are selectable by the at least one controller based on shift requests initiated with the shift request device. The plurality of indicated gears correspond to a plurality of fixed gear ratios of the continuously variable transmission and to at least one variable gear ratio of the continuously variable transmission. Upon selection of an initial indicated gear of the plurality of indicated gears, the at least one controller is operative to vary the gear ratio of the continuously variable transmission across a predetermined range of gear ratios. The at least one controller is operative to control the continuously variable transmission to a fixed gear ratio upon receipt of a shift request identifying a different indicated gear of the plurality of indicated gears.

BRIEF DESCRIPTION OF THE DRAWINGS

FIGS. 3a and 3b are diagrammatic views of the CVT of FIG. 2 according to one embodiment;

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
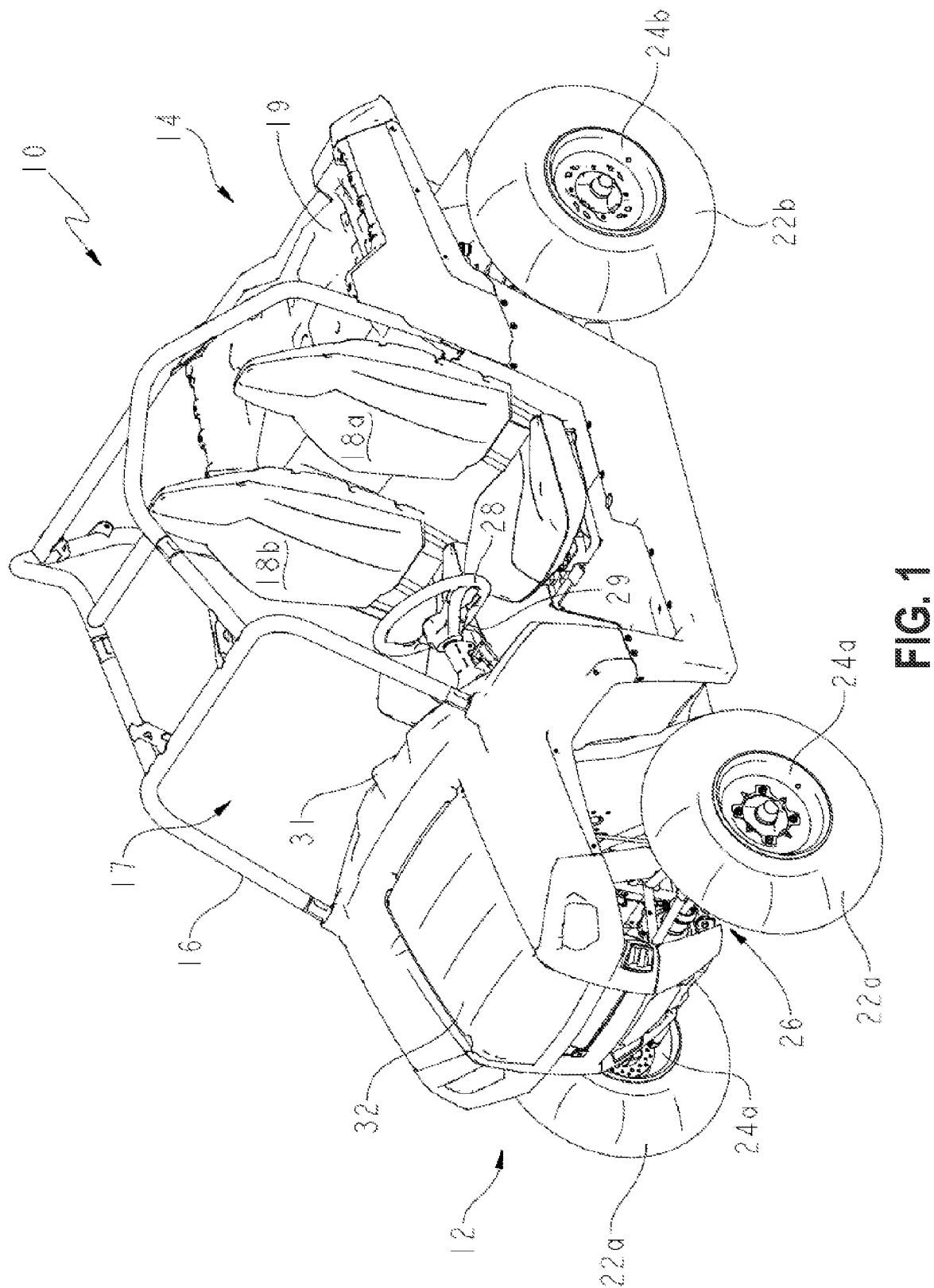
FIG. 1 is a perspective view of an exemplary vehicle incorporating the electronic CVT of the present disclosure.

Referring initially to FIG. 1, an exemplary vehicle 10 having an electronically controlled CVT is illustrated. Vehicle 10 is illustratively a side-by-side ATV 10 including a front end 12, a rear end 14, and a frame or chassis 15 that is supported above the ground surface by a pair of front tires 22a and wheels 24a and a pair of rear tires 22b and wheels 24b. ATV 10 includes a pair of laterally spaced-apart bucket seats 18a, 18b, although a bench style seat or any other style of seating structure may be used. Seats 18a, 18b are positioned within a cab 17 of ATV 10. A protective cage 16 extends over cab 17 to reduce the likelihood of injury to passengers of ATV 10 from passing branches or tree limbs and to act as a support in the event of a vehicle rollover. Cab 17 also includes front dashboard 31, adjustable steering wheel 28, and shift lever 29. Front dashboard 31 may include a tachometer, speedometer, or any other suitable instrument.

Front end 12 of ATV 10 includes a hood 32 and a front suspension assembly 26. Front suspension assembly 26 pivotally couples front wheels 24 to ATV 10. Rear end 14 of ATV 10 includes an engine cover 19 which extends over an engine and transmission assembly (see FIG. 2). Rear end 14 further includes a rear suspension assembly (not shown) pivotally coupling rear wheels 24 to ATV 10. Other suitable vehicles may be provided that incorporate the CVT of the present disclosure, such as a snowmobile, a straddle-seat vehicle, a utility vehicle, a motorcycle, and other recreational and non-recreational vehicles.

Figure 2:
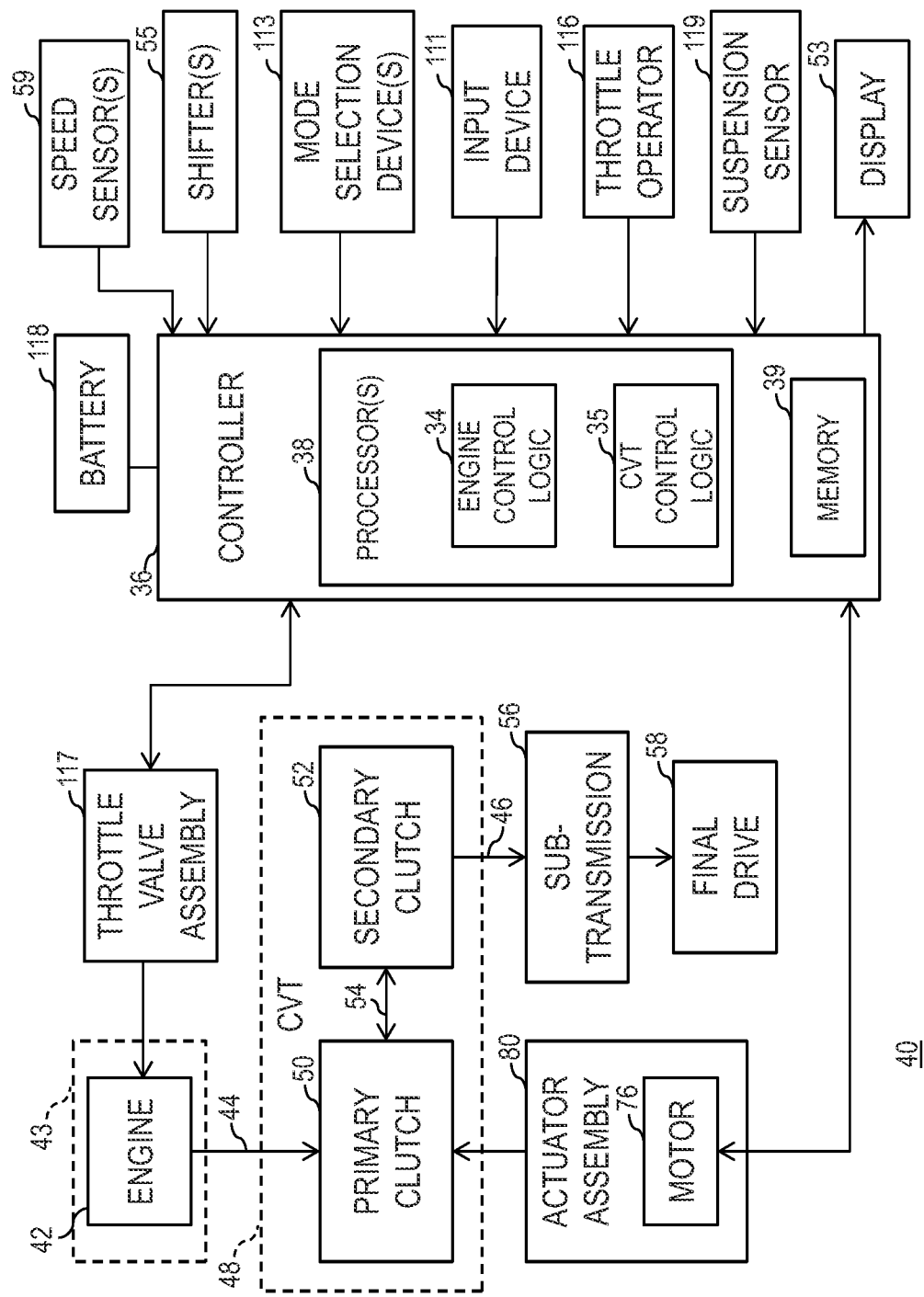
FIG. 2 is a perspective view of an exemplary drive system of the vehicle of FIG. 1 including a continuously variable transmission (CVT)

Referring to FIG. 2, an exemplary drive system 40 of vehicle 10 of FIG. 1 is illustrated including an engine 42 and a CVT 48. CVT 48 includes a primary or drive clutch 50 and a secondary or driven clutch 52. An endless, variable speed belt 54 is coupled to the primary and secondary clutches 50, 52. Engine 42 includes an engine case or housing 43 and an output shaft 44 configured to drive primary clutch 50 of the CVT 48. Rotation of primary clutch 50 is transferred to secondary clutch 52 via belt 54. An output shaft 46 of secondary clutch 52 is coupled to and drives a sub-transmission 56 which is coupled to the final drive 58 for driving wheels 24 (see FIG. 1). In one embodiment, sub-transmission 56 is geared to provide a high gear, a low gear, a reverse gear, and a park configuration for vehicle 10 of FIG. 1. Fewer or additional gears may be provided with sub-transmission 56.

A controller 36 of drive system 40 is operative to control CVT 48 and engine 42, as described herein. Controller 36 includes at least one processor 38 that executes software and/or firmware stored in memory 39 of controller 36. The software/firmware code contains instructions that, when executed by processor 38, causes controller 36 to perform the functions described herein. Controller 36 may alternatively include one or more application-specific integrated circuits (ASICs), field-programmable gate arrays (FPGAs), digital signal processors (DSPs), hardwired logic, or combinations thereof. The at least one processor 38 of controller 36 illustratively includes engine control logic 34 operative to control engine 42 and CVT control logic 35 operative to control CVT 48. Controller 36 may be a single control unit or multiple control units functioning together to perform the functions of controller 36 described herein. Engine control logic 34 and CVT control logic 35 may be provided on a same processing device or different processing devices. For example, CVT control logic 35 may be provided on a designated clutch control unit physically separate from and in communication with an engine control unit (ECU) of vehicle 10 that contains engine control logic 34.

Memory 39 is any suitable computer readable medium that is accessible by processor 38. Memory 39 may be a single storage device or multiple storage devices, may be located internally or externally to controller 36, and may include both volatile and non-volatile media. Exemplary memory 39 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 36.

CVT control logic 35 is operative to control an actuator assembly 80 for controlling the position of primary clutch 50 and thus the gear ratio of CVT 48, as described herein. In particular, actuator assembly 80 includes a motor 76 controlled by CVT control logic 35 that moves primary clutch 50. In an exemplary embodiment, motor 76 is an electrical stepper motor, although motor 76 may alternatively be a brushed motor or other suitable electrical or hydraulic motor. In one embodiment, actuator assembly 80 and/or controller 36 includes a motor drive that controls motor 76 based on control signals provided with CVT control logic 35. Alternatively, CVT control logic 35 may control a relay for selectively routing power to motor 76 for controlling motor 76.

In the illustrated embodiment, a throttle operator 116 including a position sensor is coupled to controller 36, and engine control logic 34 electronically controls the position of a throttle valve 117 of engine 42 based on the detected position of throttle operator 116 to regulate air intake to and thus the speed of engine 42. Throttle operator 116 may include an accelerator pedal, a thumb actuated lever, or any other suitable operator input device that, when actuated by an operator, is configured to provide an operator throttle demand to controller 36. One or more suspension sensors 119 provide feedback to controller 36 indicative of a suspension (e.g., compression) height of the vehicle suspension system. A display 53 is coupled to controller 36 for displaying vehicle operation information to an operator. Exemplary information provided on display 53 includes vehicle speed, engine speed, fuel level, clutch position or gear ratio, selected operation mode (e.g., auto, manual, hydrostatic), indicated gear in manual mode, etc. Vehicle 10 further includes one or more shifters 55 for shifting between discrete gear ratios when vehicle 10 operates in manual mimic mode, as described herein. Speed sensors 59 provide signals to controller 36 representative of an engine speed, a vehicle (ground) speed, a rotational speed of primary clutch 50 and/or secondary clutch 52, and/or a speed of other components of the vehicle drive train. In one embodiment, controller 36 communicates with one or more sensors/devices of vehicle 10 and/or other vehicle controllers via controller area network (CAN) communication.

Figure 25:
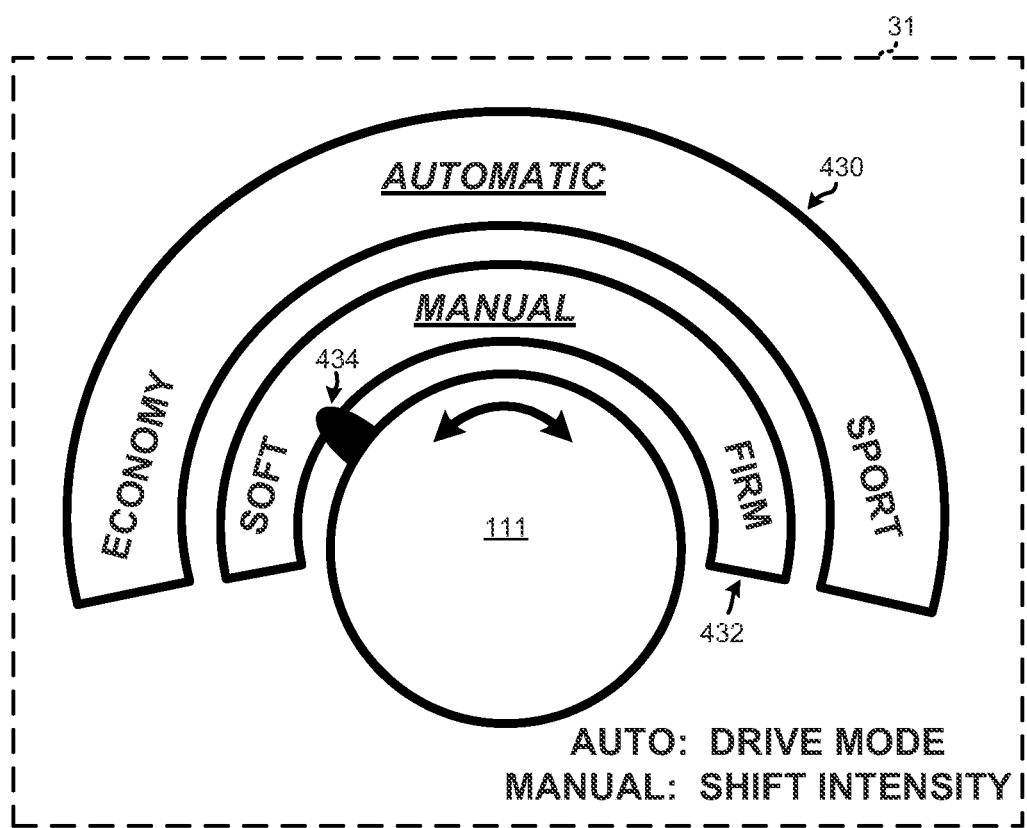
FIG. 25 illustrates an exemplary input device for adjusting a clutch control variable used in the selection of a drive profile of the vehicle of FIG. 1.

One or more mode selection devices 113 in communication with controller 36 are used by an operator to select an operating mode of vehicle 10. Exemplary operating modes include an automatic mode, a manual mimic mode, and a hydrostatic mode. In one embodiment, vehicle 10 further includes a cruise switch for selecting a cruise control mode. Further, an input device 111 is used to select a drive profile (i.e., target engine speed curve) of vehicle 10 in the automatic mode to adjust vehicle operating characteristics to range from economic operation with improved fuel economy to sport operation with increased vehicle performance (e.g., torque, acceleration, etc.), as described herein. In the illustrated embodiment, input device 111 is further used to adjust a shift intensity associated with a gear shift in the manual mimic mode, as described herein. An exemplary input device 111 is illustrated in FIG. 25 and described herein.

In the illustrated embodiment, secondary clutch 52 is a mechanically controlled clutch 52 and includes a stationary sheave and a moveable sheave (not shown). Secondary clutch 52 is configured to control the tension of belt 54 of CVT 48 as primary clutch 50 is adjusted. In one embodiment, secondary clutch 52 includes a spring and a torque-sensing helix (not shown). The helix applies a clamping force on belt 54 proportional to the torque on secondary clutch 52. The spring applies a load proportional to the displacement of the moveable sheave. In one embodiment, secondary clutch 52 provides mechanical load feedback for CVT 48. In an alternative embodiment, controller 36 and actuator assembly 80 may further control secondary clutch 52 of CVT 48.

As illustrated in FIGS. 3A and 3B, primary clutch 50 is coupled to and rotates with a shaft 70, and secondary clutch 52 is coupled to and rotates with a shaft 72. Shaft 70 is driven by the output shaft 44 of engine 42 (see FIG. 2). Shaft 72 of secondary clutch 52 drives sub-transmission 56 (see FIG. 2). Belt 54 wraps around the primary and secondary clutches 50, 52 and transfers rotational motion of primary clutch 50 to secondary clutch 52.

Figure 4:
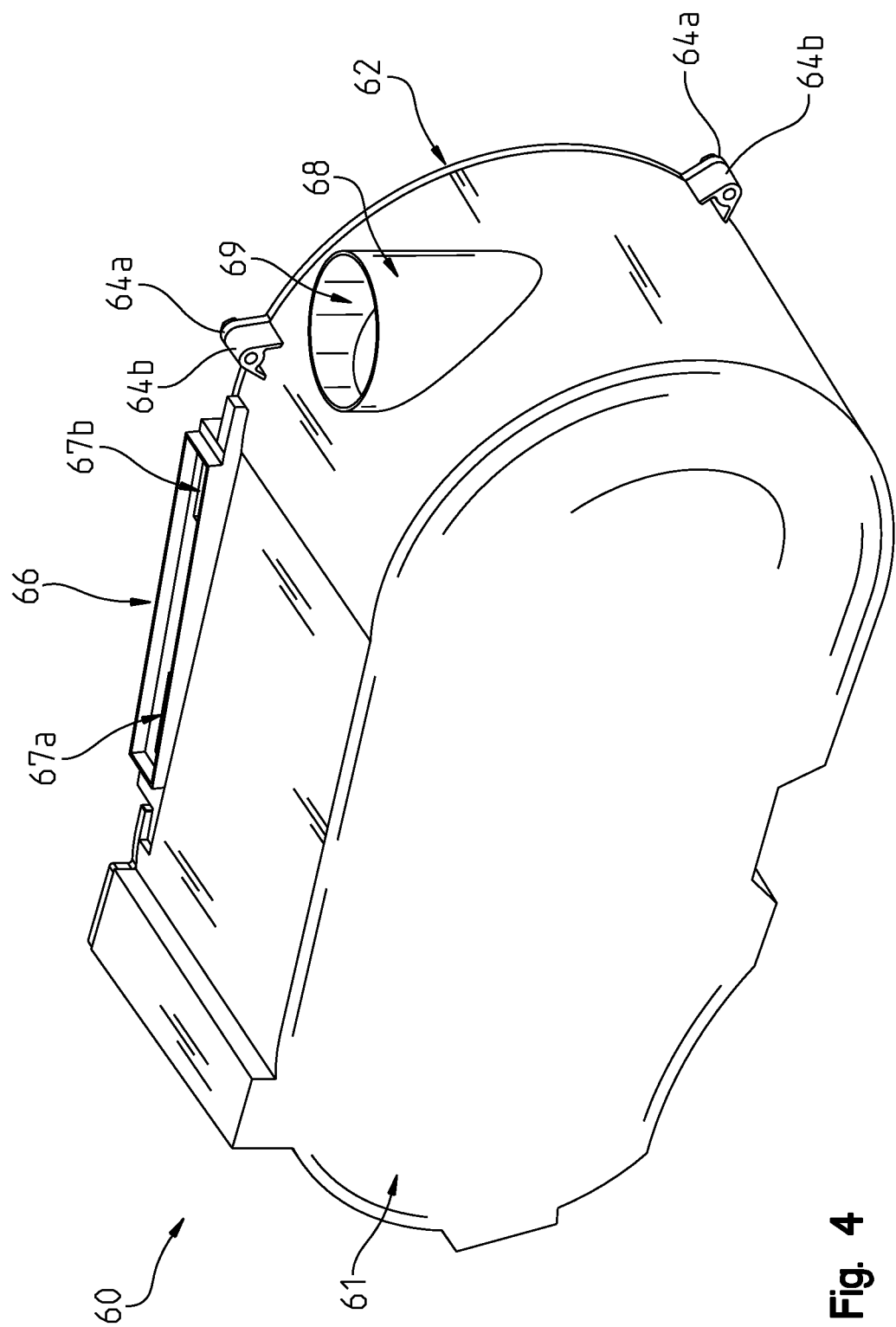
FIG. 4 is a front perspective view of an exemplary CVT of the vehicle of FIG. 1 according to one embodiment including a housing with a cover and a mounting bracket.
Figure 5:
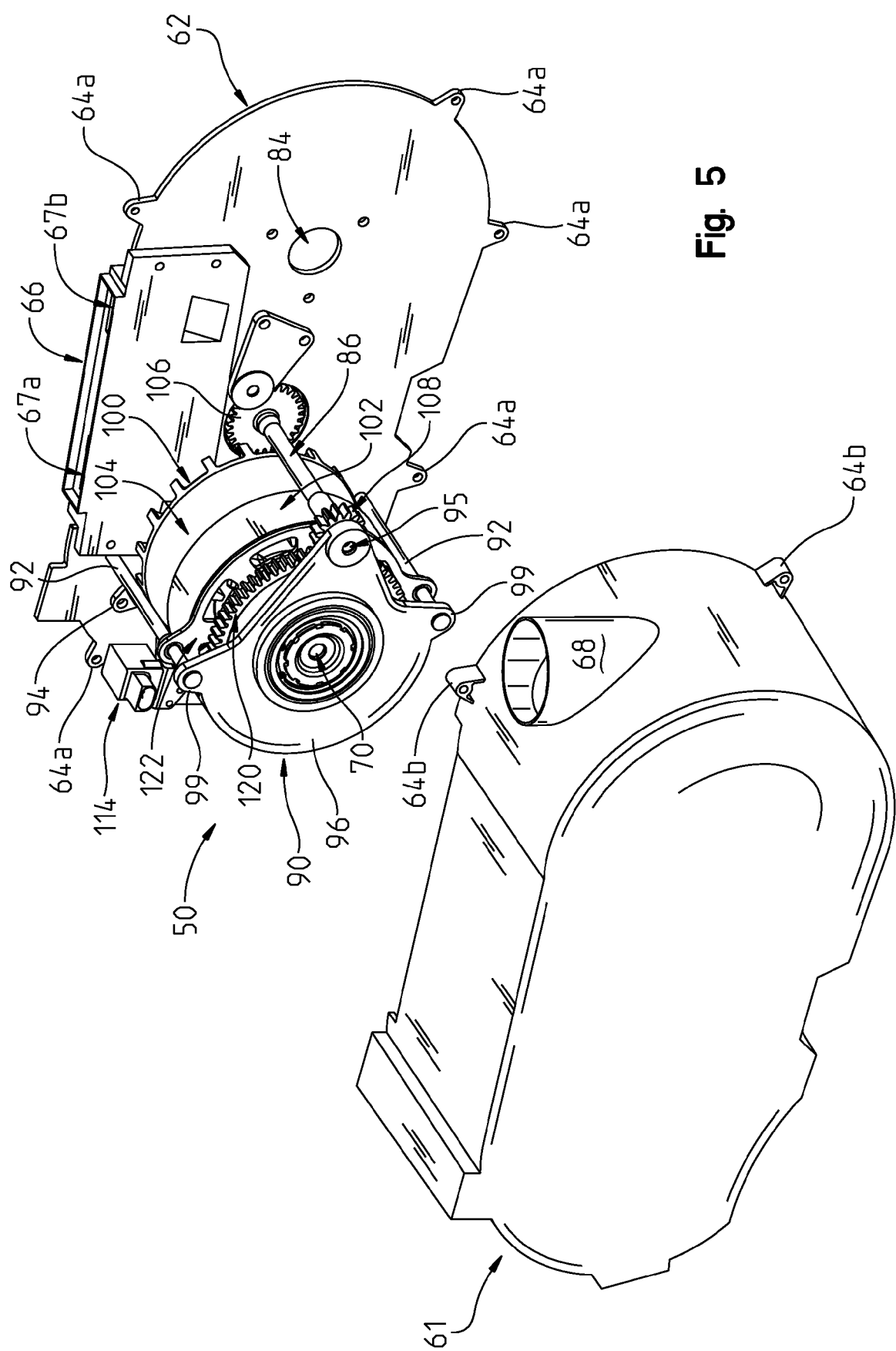
FIG. 5 is a front perspective view of the CVT of FIG. 4 with the cover removed from the mounting bracket.

Referring to FIG. 4, a housing 60 for CVT 48 is illustrated with a cover 61 coupled to a back plate or mounting bracket 62. Flanged portions 64a, 64b of mounting bracket 62 and cover 61, respectively, are illustratively configured to receive fasteners 74 (see FIG. 7) to couple cover 61 to mounting bracket 62. Fasteners 74 are illustratively bolts or screws, although other suitable fasteners 74 may be used. Cover 61 includes a pipe portion 68 forming an opening 69 to provide access to belt 54 of CVT 48. For example, opening 69 may be used to visually inspect belt 54 and/or secondary clutch 52 (see FIG. 2) or to check the tension of belt 54. Mounting bracket 62 includes a vent structure 66 including a pair of vents 67a, 67b extending into the interior of housing 60 (see FIG. 5). Vents 67a, 67b and opening 69 cooperate to provide airflow to CVT 48 to reduce the likelihood of the components of CVT 48 overheating. Vent structure 66 is illustratively coupled to mounting bracket 62 via fasteners 75 (see FIG. 7), although vent structure 66 may alternatively be integrally formed with mounting bracket 62 or cover 61. Cover 61 is removable from mounting bracket 62 upon removing fasteners 74 from flanged portions 64a, 64b. As illustrated in FIG. 5, cover 61 is adapted to be pulled away from mounting bracket 62 in a direction substantially perpendicular to the surface of mounting bracket 62.

Referring to FIG. 5, primary clutch 50 of CVT 48 is secured to mounting bracket 62 via a bracket 90. Bracket 90 includes flanged portions 94 each adapted to receive a fastener (not shown) to couple bracket 90 to mounting bracket 62. Bracket 90 illustratively includes an end wall 96 and a curved wall 98 (see FIG. 10) that extends perpendicularly between end wall 96 and mounting bracket 62. In the illustrated embodiment, curved wall 98 extends partially around the outer circumference of primary clutch 50. A pair of posts 92 further support bracket 90 between end wall 96 and mounting bracket 62. Posts 92 are illustratively press fit between flanged portions 99 of end wall 96 and mounting bracket 62, although posts 92 may alternatively be coupled to end wall 96 and/or mounting bracket 62 with fasteners. A position sensor 114 is coupled to a flange 115 (see FIG. 11) of bracket 90 for detecting the axial location of a moveable sheave 102 of primary clutch 50. In one embodiment, position sensor 114 is a rotary sensor with a bell crank, although a linear sensor or other suitable sensor may be provided. Sensor 114 provides position feedback to controller 36 (FIG. 2).

Figure 6:
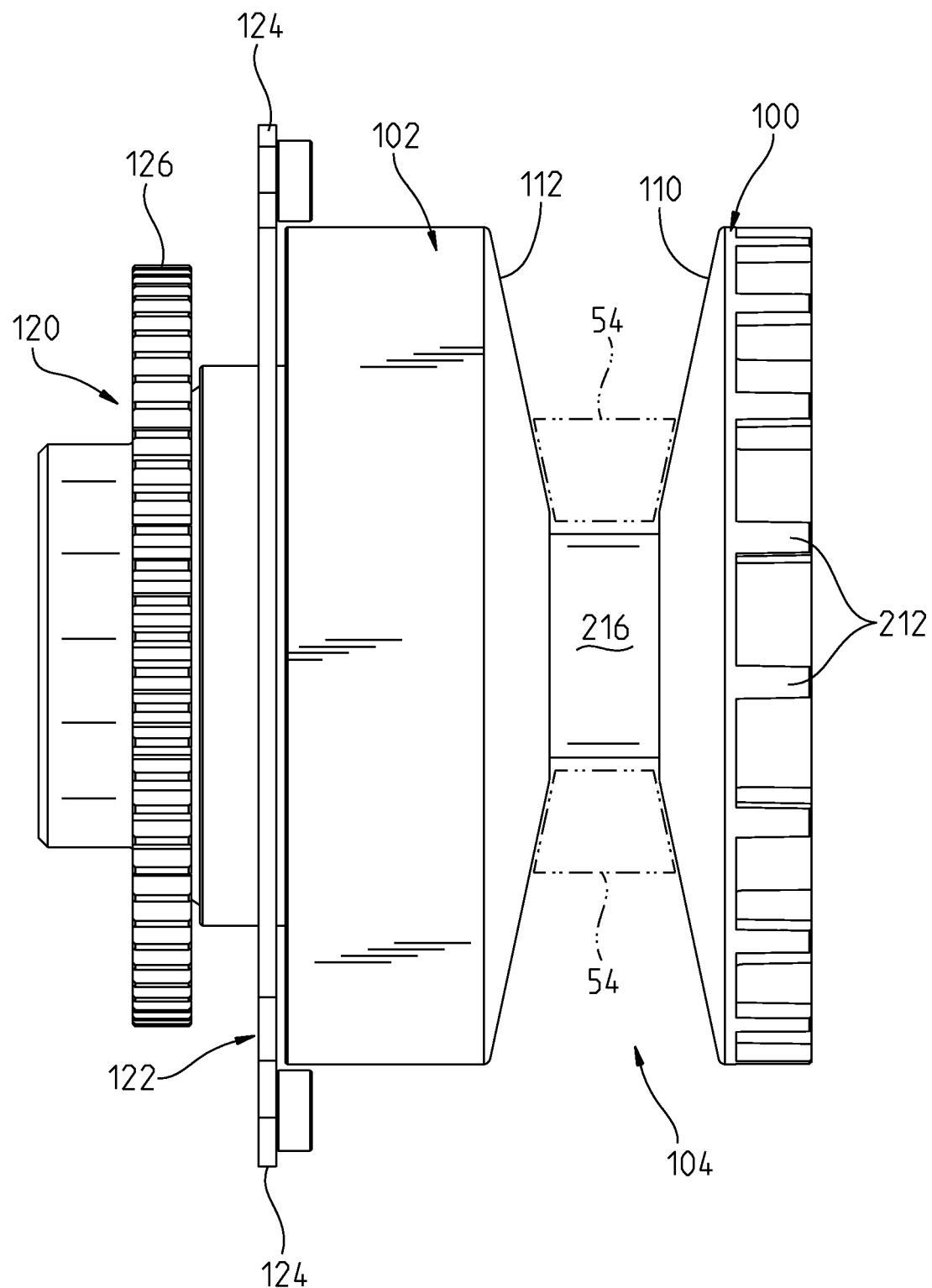
FIG. 6 is a side view of a primary clutch of the CVT of FIG. 4.

As illustrated in FIG. 5, primary clutch 50 includes a pair of sheaves 100, 102 that are supported by and rotate with shaft 70. Sheaves 100, 102 cooperate to define a pulley or slot 104 within which belt 54 (see FIG. 2) rides. As illustrated in FIG. 6, slot 104 is substantially V-shaped due to slanted inner surfaces 110, 112 of respective sheaves 100, 102. Accordingly, belt 54 has a substantially V-shaped cross-section to cooperate with inner surfaces 110, 112 of the sheaves 100, 102. Primary clutch 50 further includes a screw assembly including an outer screw assembly 120 and an inner screw assembly 122 positioned between outer screw assembly 120 and moveable sheave 102.

Figure 14:
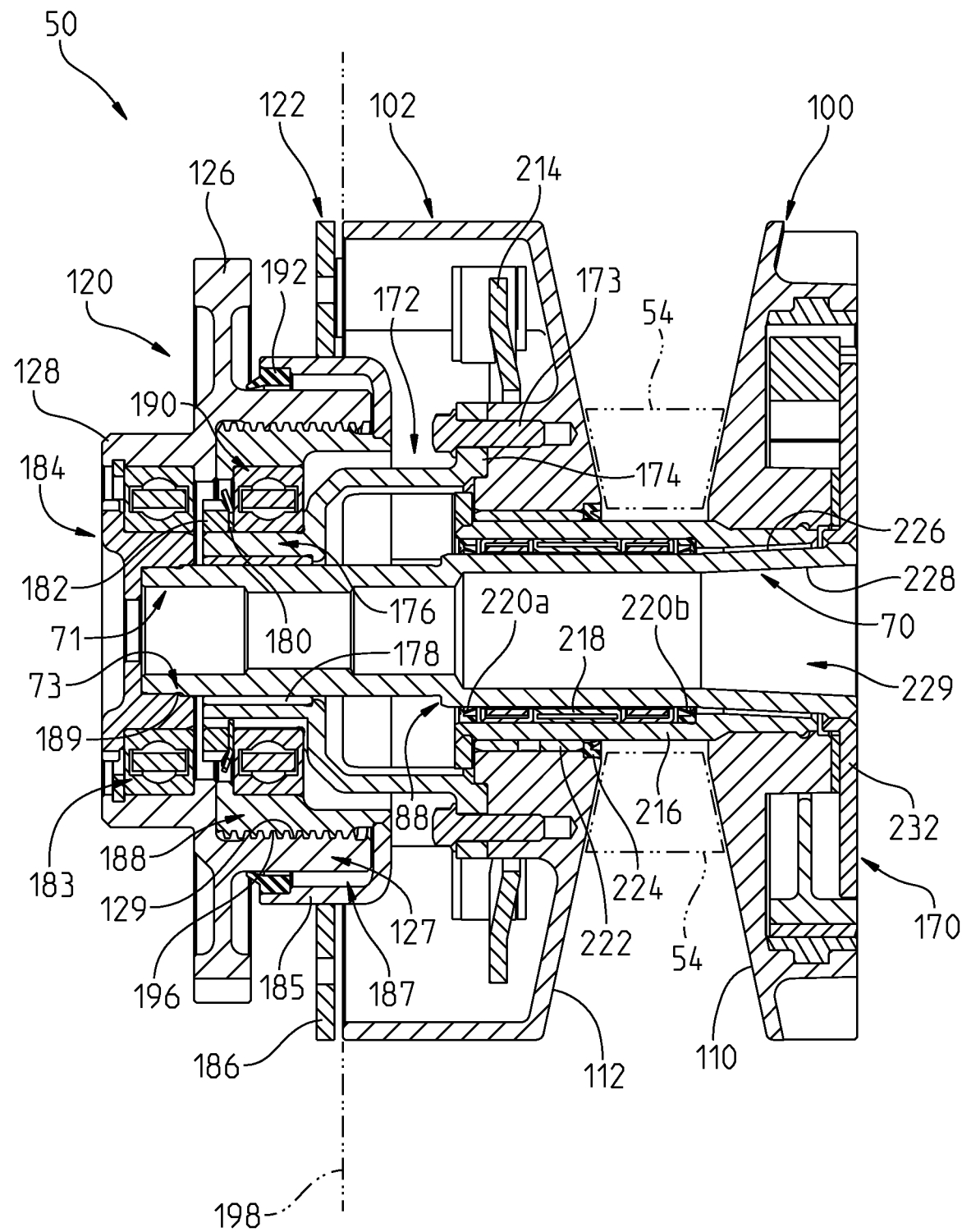
FIG. 14 is a cross-sectional view of the primary clutch of FIG. 6 taken along line 14-14 of FIG. 8.
Figure 15:
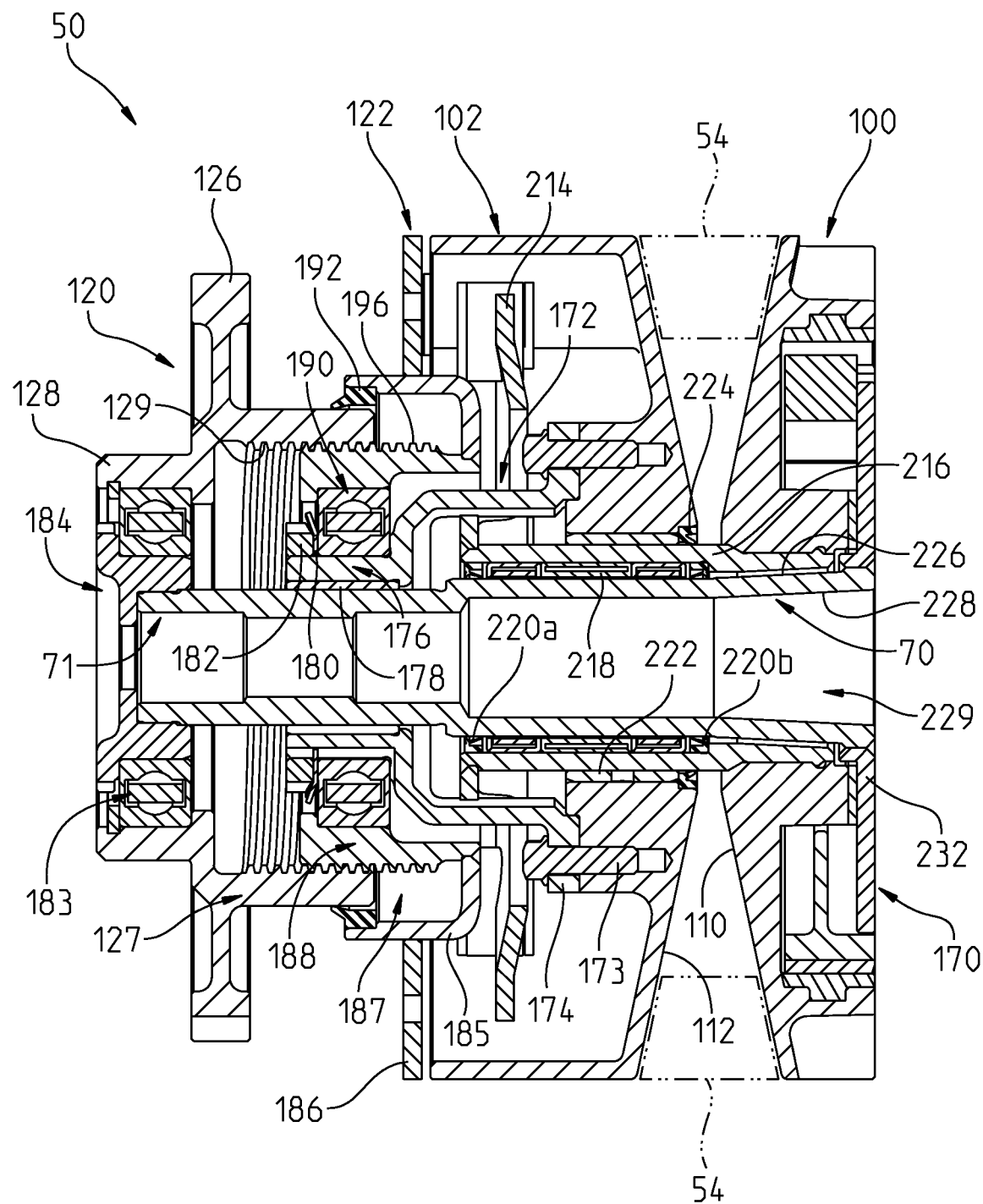
FIG. 15 is a cross-sectional view of the primary clutch of FIG. 6 taken along line 15-15 of FIG. 9.

In the illustrated embodiment, sheave 100 is stationary axially in a direction parallel to the axis of shaft 70, and sheave 102 is movable axially in a direction parallel to the axis of shaft 70. In particular, sheave 102 is configured to slide along shaft 70 to a plurality of positions between a fully extended or open position (see FIGS. 8 and 14) and a fully closed or retracted position (see FIGS. 9 and 15). With moveable sheave 102 in a fully extended or open position, slot 104 is at a maximum axial width, and belt 54 rides near the radial center of primary clutch 50, as illustrated in FIG. 14. In the illustrated embodiment, belt 54 does not contact a tube portion 216 of a sliding support 200 of primary clutch 50 when moveable sheave 102 is at the fully open position of FIG. 14. With moveable sheave 102 in a fully retracted or closed position, slot 104 is at a minimum axial width, and belt 54 rides near the outer periphery of primary clutch 50, as illustrated in FIG. 15. Secondary clutch 52 (see FIG. 2) is similarly configured with a pair of sheaves (not shown) supported by and rotatable with shaft 72. One sheave of secondary clutch 52 is axially movable, and the other sheave is axially stationary. In one embodiment, secondary clutch 52 is configured to control the tension of belt 54. For purposes of illustrating primary clutch 50, secondary clutch 52 and belt 54 are not shown in FIGS. 5, 8, and 9.

Movement of sheave 102 of primary clutch 50 and movement of the moveable sheave of secondary clutch 52 provides variable effective gear ratios of CVT 48. In one embodiment, CVT 48 is configured to provide an infinite number of effective gear ratios between minimum and maximum gear ratios based on the positions of the moveable sheaves of the clutches 50, 52. In the configuration illustrated in FIG. 3A, the moveable sheave 102 (see FIG. 6) of primary clutch 50 is substantially opened, and the moveable sheave (not shown) of secondary clutch 52 is substantially retracted. Accordingly, a low gear ratio is provided by CVT 48 in the configuration of FIG. 3A such that shaft 72 of secondary clutch 52 rotates slower than shaft 70 of primary clutch 50. Similarly, in the configuration illustrated in FIG. 3B, the moveable sheave 102 (see FIG. 6) of primary clutch 50 is substantially retracted, and the moveable sheave (not shown) of secondary clutch 52 is substantially opened. Accordingly, a high gear ratio is provided by CVT 48 in the configuration of FIG. 3B such that shaft 72 of secondary clutch 52 rotates faster than shaft 70 of primary clutch 50.

Figure 7:
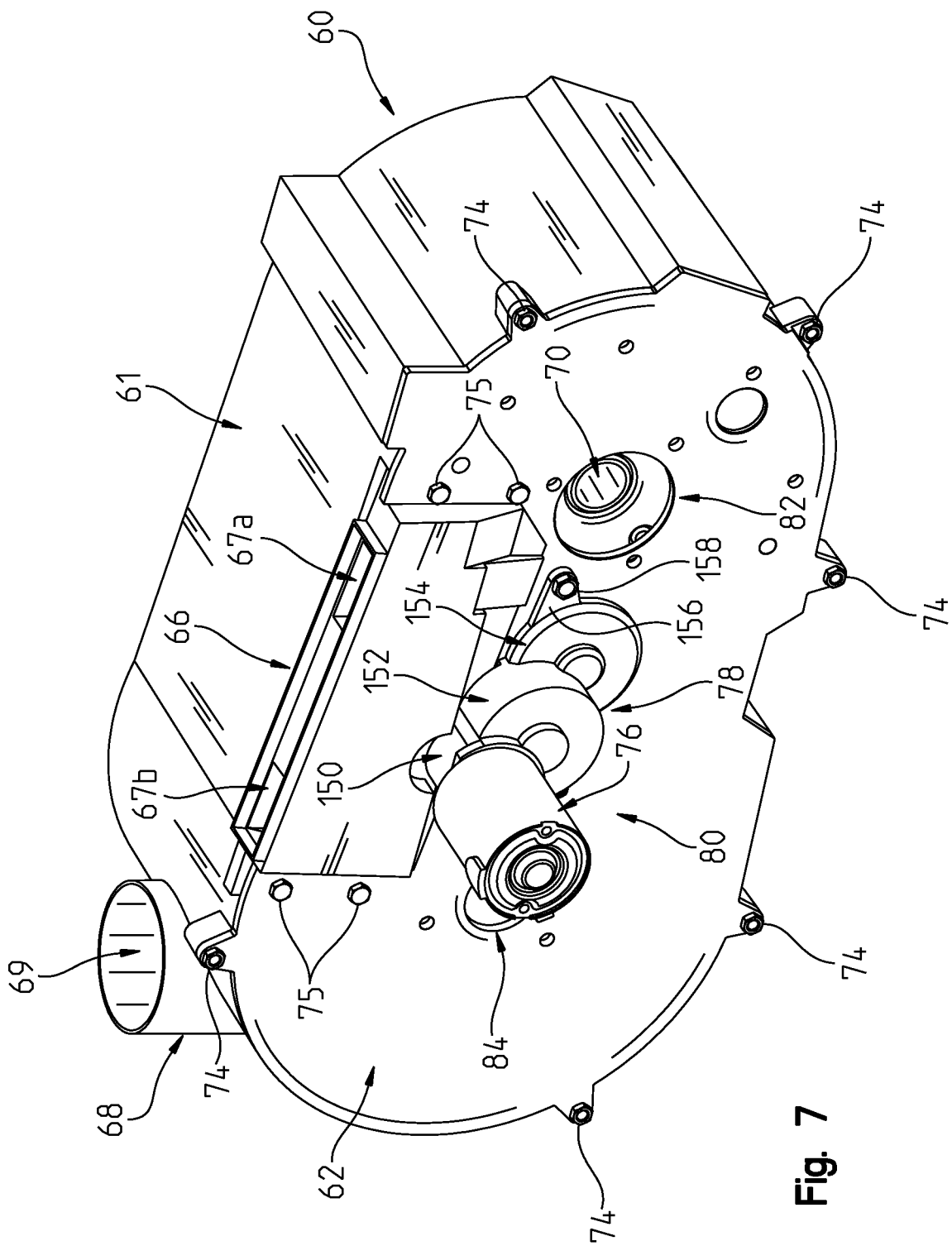
FIG. 7 is a rear perspective view of the CVT of FIG. 4 illustrating an actuator assembly.

As illustrated in FIG. 7, actuator assembly 80 is coupled to the back of mounting bracket 62. Actuator assembly 80 is configured to move the moveable sheave 102 (see FIG. 5) of primary clutch 50, as described herein. In the illustrative embodiment, engine 42 and sub-transmission 56 (see FIG. 2) are configured to be positioned adjacent the back of mounting bracket 62 on either side of actuator assembly 80. In particular, engine 42 is positioned to the right of actuator assembly 80 (as viewed from FIG. 7), and the output of engine 42 couples to shaft 70 of primary clutch 50 through an opening 82 of mounting bracket 62. Similarly, sub-transmission 56 is positioned to the left of actuator assembly 80 (as viewed from FIG. 7), and shaft 72 of secondary clutch 52 (see FIG. 3A) extends through an opening 84 of mounting bracket 62 to drive sub-transmission 56.

Figure 10:
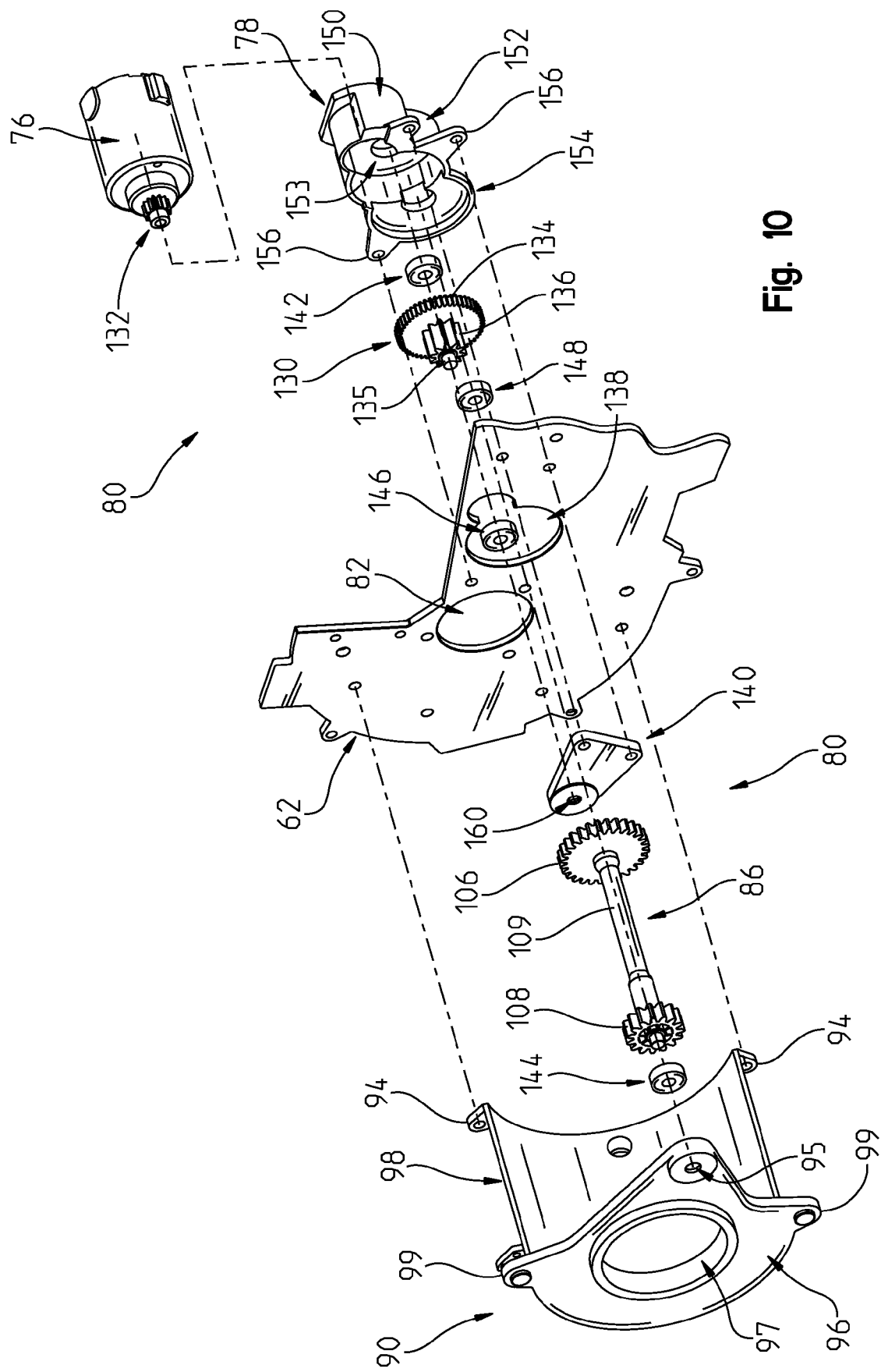
FIG. 10 is an exploded front perspective view of the actuator assembly of FIG. 7 with the mounting bracket partially cut away.
Figure 11:
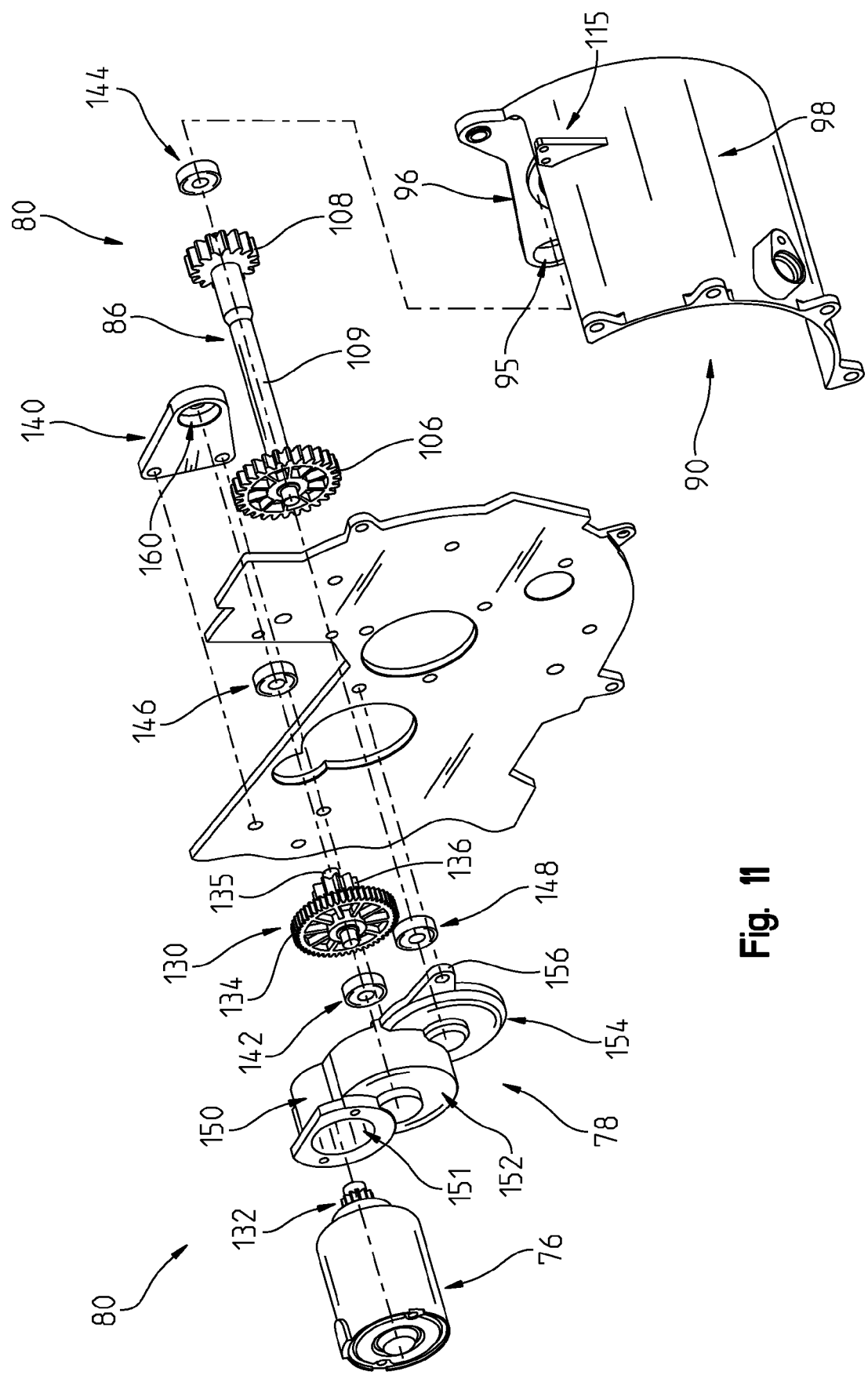
FIG. 11 is an exploded rear perspective view of the actuator assembly of FIG. 7 with the mounting bracket partially cut away.

As illustrated in FIGS. 10 and 11, actuator assembly 80 includes motor 76 with a geared output shaft 132, a reduction gear 130 housed within a gear housing 78, and a main gear drive 86 extending outwardly from the front of mounting bracket 62. Reduction gear 130 includes first and second gears 134, 136 coupled to a shaft 135. First gear 134 engages geared output shaft 132 of motor 76, and second gear 136 engages a first gear 106 coupled to an end of a shaft 109 of main gear drive 86. Main gear drive 86 further includes a second gear 108 coupled to an end of shaft 109 opposite first gear 106. Second gear 108 engages an outer gear 126 of screw assembly 120 (see FIG. 6) of primary clutch 50.

Gear housing 78 includes flange portions 156 each configured to receive a fastener 158 (see FIG. 7) for coupling gear housing 78 to the back of mounting bracket 62. Gear housing 78 includes a first portion 150, a second or intermediate portion 152, and a third portion 154. First portion 150 includes an opening 151 (see FIG. 11) that receives output shaft 132 of motor 76. Second portion 152 includes an opening 153 (see FIG. 10) that receives reduction gear 130. Reduction gear 130 is supported at one end by second portion 152 and at the other end by a support member 140 mounted on the front face of mounting bracket 62. Bearings 142, 146 are positioned at opposite ends of shaft 135 to facilitate rotation of reduction gear 130 within second portion 152 and support member 140, respectively. Third portion 154 of housing 78 houses a portion of first gear 106 and supports the end of shaft 109 adjacent first gear 106. Similarly, end wall 96 of bracket 90 supports the other end of shaft 109 adjacent second gear 108. As illustrated in FIG. 11, bearings 144, 148 are coupled at opposite ends of shaft 109 to facilitate rotation of main gear drive 86 relative to gear housing 78 and bracket 90. In particular, bearing 148 is received within third portion 154 of gear housing 78, and bearing 144 is received within an opening 95 formed in end wall 96 of bracket 90.

Referring to FIGS. 12-16, outer screw assembly 120 of primary clutch 50 includes a neck portion 128 and a threaded screw portion 127. Neck portion 128 extends through an opening 97 formed in end wall 96 of bracket 90 (see FIG. 10). An outer bearing support 184 is rotatably coupled to neck portion 128 via bearing assembly 183 and is fixedly coupled to an end 71 of shaft 70. As such, shaft 70 and outer bearing support 184 rotate together independently from outer screw assembly 120. In the illustrated embodiment, end 71 of shaft 70 is press fit into outer bearing support 184. End 71 further includes a circumferential channel 73 that engages an inner ridge 189 of outer bearing support 184 (see FIG. 14). End 71 of shaft 70 may also be fastened to outer bearing support 184 with an adhesive or other suitable fastener.

Inner screw assembly 122 includes a plate portion 186 and a threaded screw portion 188 positioned radially inwardly from plate portion 186. An L-shaped wall 185 is illustratively coupled between plate portion 186 and screw portion 188 forming a radial gap 187 between screw portion 188 and wall 185. Screw portion 188 includes outer threads 196 that mate with inner threads 129 of screw portion 127 of outer screw assembly 120. Screw portion 127 of outer screw assembly 120 is received within gap 187 formed in inner screw assembly 122 (see FIGS. 14-16). An o-ring seal 192 positioned radially inside of wall 185 is configured to abut screw portion 127 of outer screw assembly 120. Plate portion 186 of inner screw assembly 122 includes flanges 124 having apertures 125 (see FIGS. 12 and 13) that slidably receive posts 92 of bracket 90 (see FIGS. 8 and 9). Plate portion 186 further includes slots 194 circumferentially spaced near the outer perimeter of plate portion 186.

Still referring to FIGS. 12-16, a sliding assembly of primary clutch 50 includes a bushing assembly 172, a sliding support 200, and a bearing assembly 190 positioned between bushing assembly 172 and inner screw assembly 122. Bushing assembly 172 of primary clutch 50 includes a neck portion 176 that receives shaft 70 therethrough and a plurality of flanges 174 that couple to circumferentially spaced seats 202 of moveable sheave 102. A plurality of fasteners 173, illustratively screws 173, are received by corresponding apertures of flanges 174 and seats 202 to couple bushing assembly 172 to sheave 102. A bushing 178 positioned within neck portion 176 engages shaft 70 and supports the outboard end of moveable sheave 102. Shaft 70 is configured to rotate inside of bushing 178 at engine idle (when primary clutch 50 is disengaged) and to rotate with bushing 178 when primary clutch 50 is engaged. Bushing 178 is configured to provide a low-friction surface that slides along shaft 70 during movement of sheave 102. Bushing 178 may alternatively be a needle bearing.

Neck portion 176 of bushing assembly 172 is rotatably coupled to screw portion 188 of inner screw assembly 122 via bearing assembly 190 positioned within screw portion 188. A collar 182 and a toothed lock washer 180 are coupled to neck portion 176 extending through screw portion 188 (see FIGS. 14-16). Lock washer 180 illustratively includes an inner tab 181 (see FIG. 12) that engages a corresponding slot 177 (see FIG. 12) in the outer surface of neck portion 176 such that lock washer 180 rotates with bushing assembly 172. Collar 182 is threaded onto neck portion 176 and is rotatably fixed in place on neck portion 176 with tabbed lock washer 180. Accordingly, bushing assembly 172, sheaves 100, 102, collar 182, washer 180, and outer bearing support 184 are configured to rotate with shaft 70, while outer screw assembly 120 and inner screw assembly 122 do not rotate with shaft 70. Bushing assembly 172 is configured to slide axially along shaft 70 via bearing 178.

Figure 16:
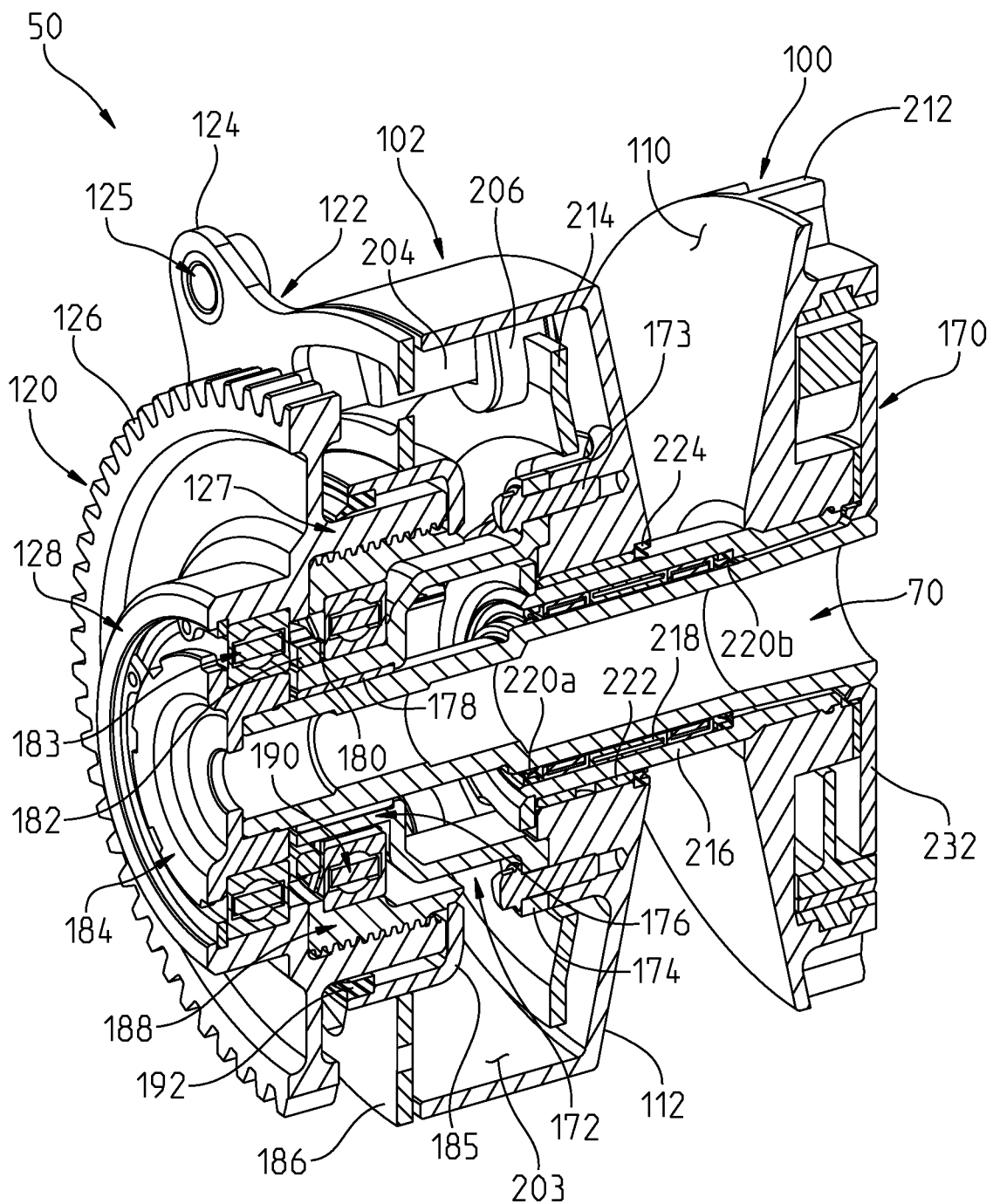
FIG. 16 is a perspective view of the primary clutch of FIG. 14 illustrating the cross-section taken along line 14-14 of FIG. 8.

Sliding support 200 is coupled to sheaves 100, 102 to provide a sliding interface for moveable sheave 102 relative to stationary sheave 100. As illustrated in FIGS. 14-16, sliding support 200 includes a tube portion 216 and a plate portion 214 coupled to and substantially perpendicular to tube portion 216. In one embodiment, plate portion 214 and tube portion 216 are molded together, although plate and tube portions 214, 216 may be coupled together with a fastener or by other suitable coupling means. Plate and tube portions 214, 216 each rotate with sheaves 100, 102 and shaft 70. A pair of seals 220a, 220b and a clutch 218 positioned between seals 220a, 220b are coupled between tube portion 216 and shaft 70. Clutch 218 is illustratively a one-way clutch 218 that free-wheels during vehicle idle and that locks tube portion 216 to shaft 70 during engine braking. As such, one-way clutch 218 acts as a bearing between tube portion 216 and shaft 70 during idling conditions and locks tube portion 216 to shaft 70 when CVT 48 is being driven faster than engine 42 (i.e., when belt 54 and clutch 50 work to overdrive engine 42 of FIG. 2).

Figure 12:
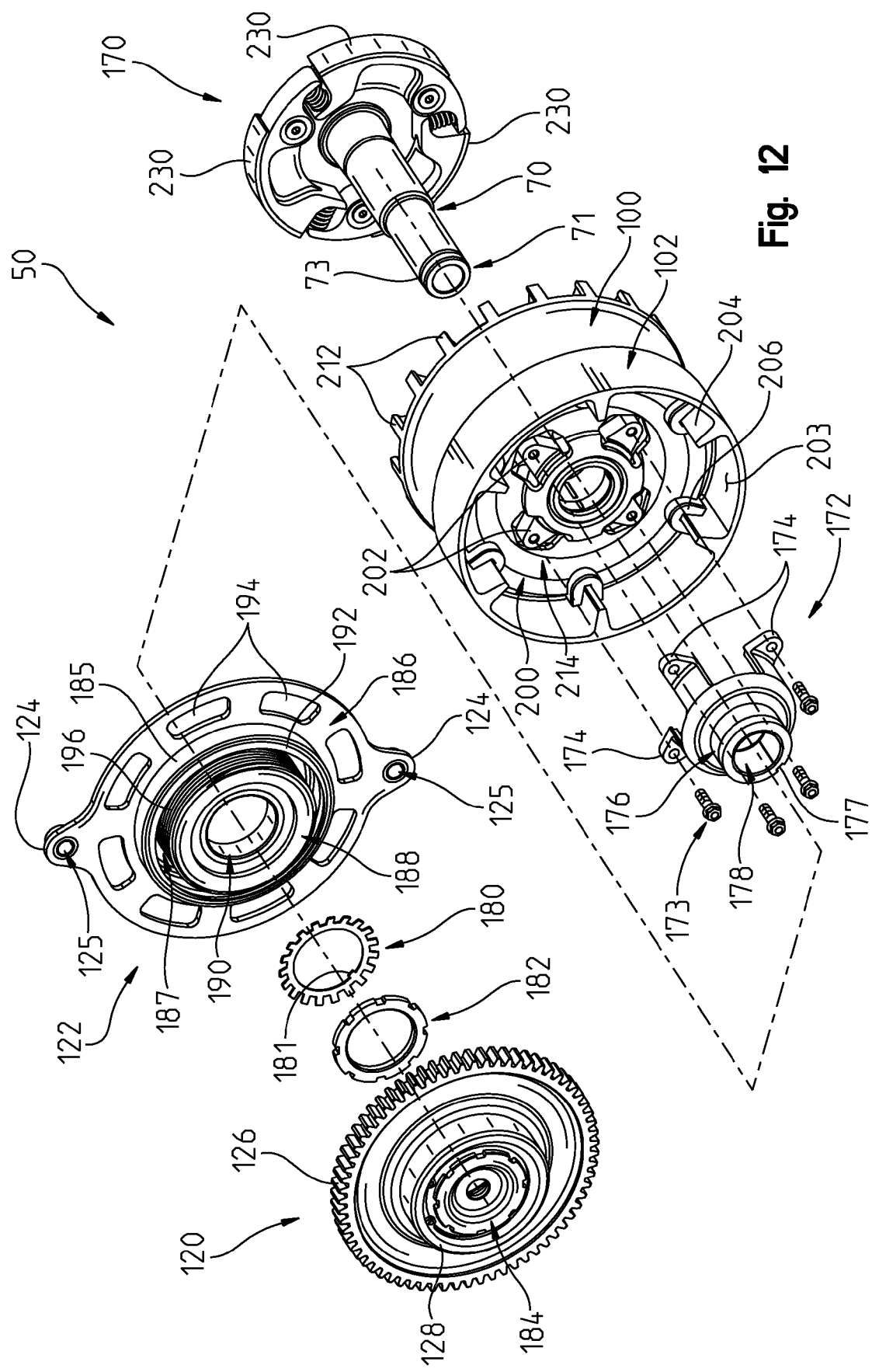
FIG. 12 is an exploded front perspective view of the primary clutch of FIG. 6 and a launch clutch.
Figure 13:
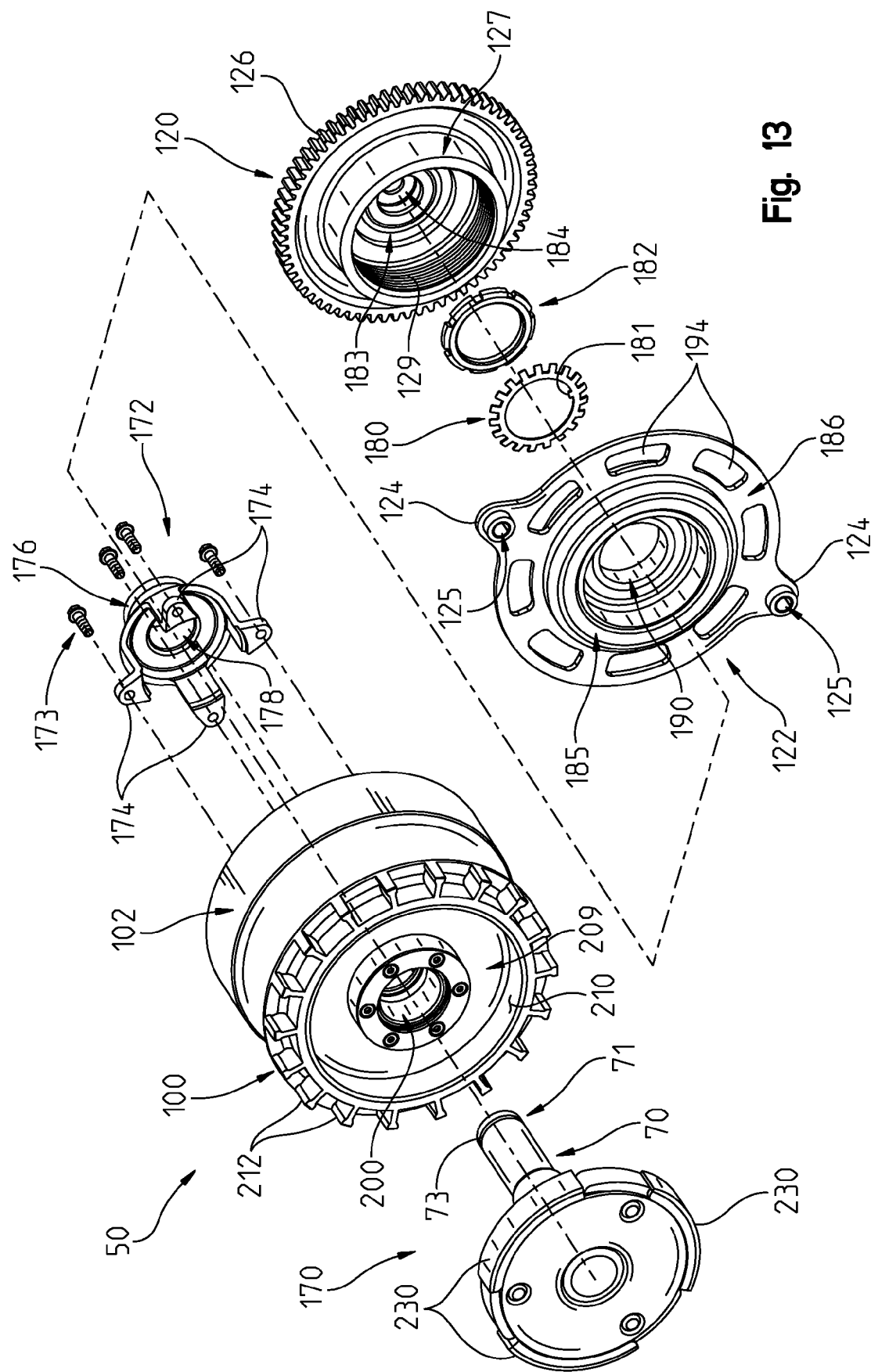
FIG. 13 is an exploded rear perspective view of the primary clutch of FIG. 6 and the launch clutch of FIG. 12.
Figure 17:
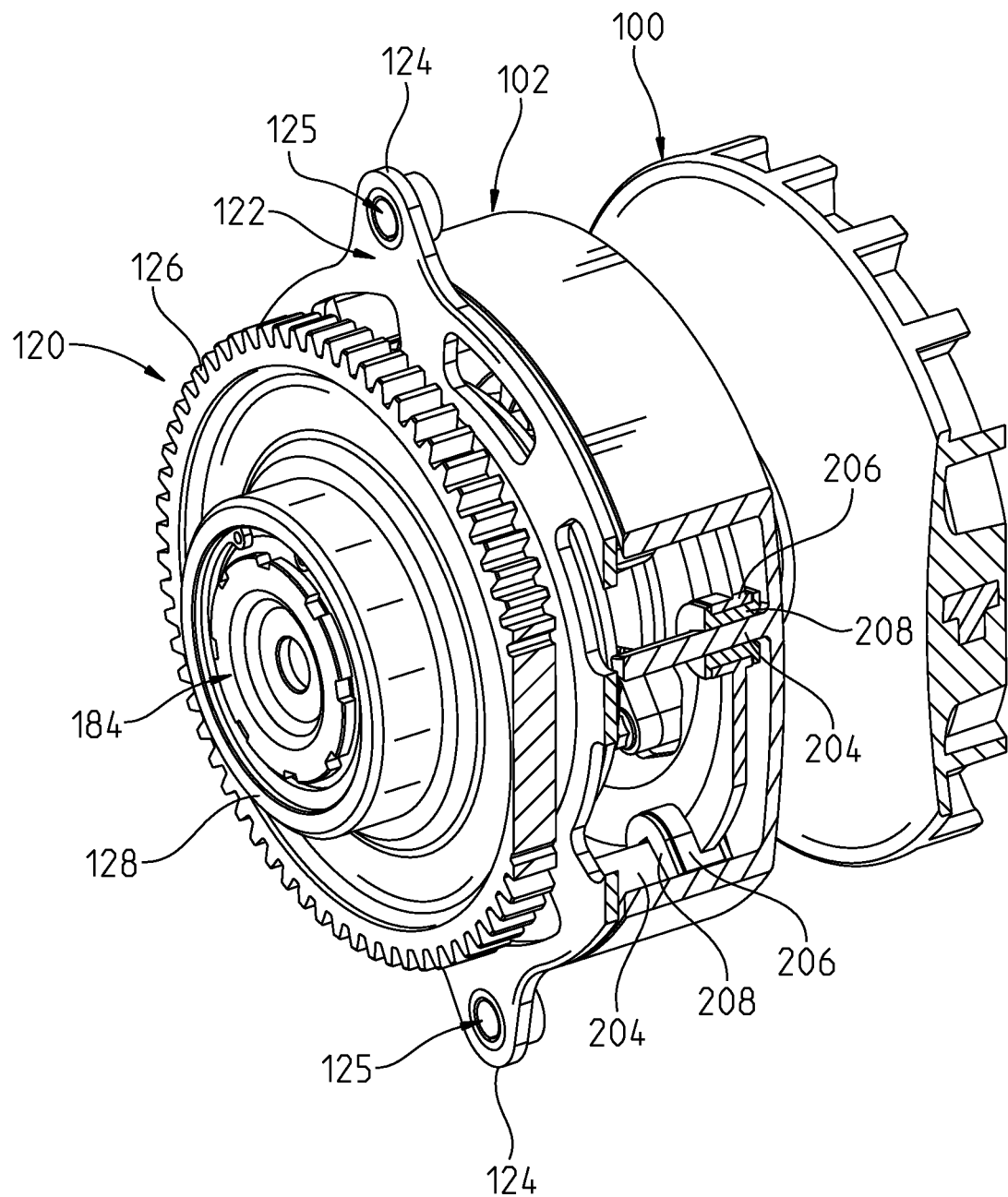
FIG. 17 is a perspective view of the primary clutch of FIG. 6 partially cut away illustrating a sliding interface of the moveable sheave.

As illustrated in FIG. 12, plate portion 214 includes a plurality of sliding couplers 206 that are circumferentially spaced around the outer diameter of plate portion 214. In the illustrated embodiment, the outer diameter of plate portion 214 is nearly the same as the outer diameter of moveable sheave 102 such that couplers 206 of plate portion 214 are immediately adjacent an inner cylindrical wall 203 of sheave 102. Couplers 206 are illustratively clips 206 that are configured to slidingly receive corresponding sliding members or ridges 204 that are circumferentially spaced around inner wall 203 of moveable sheave 102. Ridges 204 extend radially inward from and substantially perpendicular to cylindrical inner wall 203. Ridges 204 illustratively include a radial width and a radial height that is substantially greater than the radial width. As illustrated in FIG. 17, a low-friction liner 208 is positioned in each clip 206 to engage the sliding surface of ridges 204. In one embodiment, liner 208 is a low-friction composite or plastic material, such as polyether ether ketone (PEEK), polyimide-based plastic (e.g. Vespel), or nylon, for example, with additives to reduce friction. As illustrated in FIGS. 14-16, a cylindrical bearing or bushing 222 and an o-ring seal 224 are positioned between moveable sheave 102 and tube portion 216 to locate sheave 102 radially onto tube portion 216. Bushing 222 provides a low friction sliding surface for sheave 102 relative to tube portion 216. In one embodiment, grease is provided in the interfaces between ridges 204 and clips 206 and between bushing 222 and tube portion 216 to reduce sliding friction.

Moveable sheave 102 is configured to slide relative to sliding support 200 along ridges 204 of FIG. 12. In one embodiment, the sliding friction between sheave 102 and sliding support 200 is minimized with the sliding interface between couplers 206 and ridges 204 being near the outer diameter of moveable sheave 102. In the illustrated embodiment, the outer diameter of moveable sheave 102 is large relative to the outer diameters of shaft 70 and tube portion 216. In one embodiment, the outer diameter of moveable sheave 102 is at least three times greater than the outer diameters of shaft 70 and tube portion 216.

As illustrated in FIGS. 14-16, bearing assemblies 183 and 190 are each positioned outside of the outer profile of moveable sheave 102. In particular, referring to FIG. 14, bearing assemblies 183, 190 are positioned axially outside of the end of sheave 102 lying in plane 198. As such, bearing assemblies 183, 190 are axially spaced apart from the sliding interfaces formed with couplers 206 and ridges 204 and with bushing 222 and tube portion 216. In one embodiment, bearing assemblies 183, 190 include angular contact bearings, although other suitable bearings may be used. Neck portion 176 of bushing assembly 172 is also illustratively positioned outside of the outer profile of moveable sheave 102, as illustrated in FIG. 14.

Figure 8:
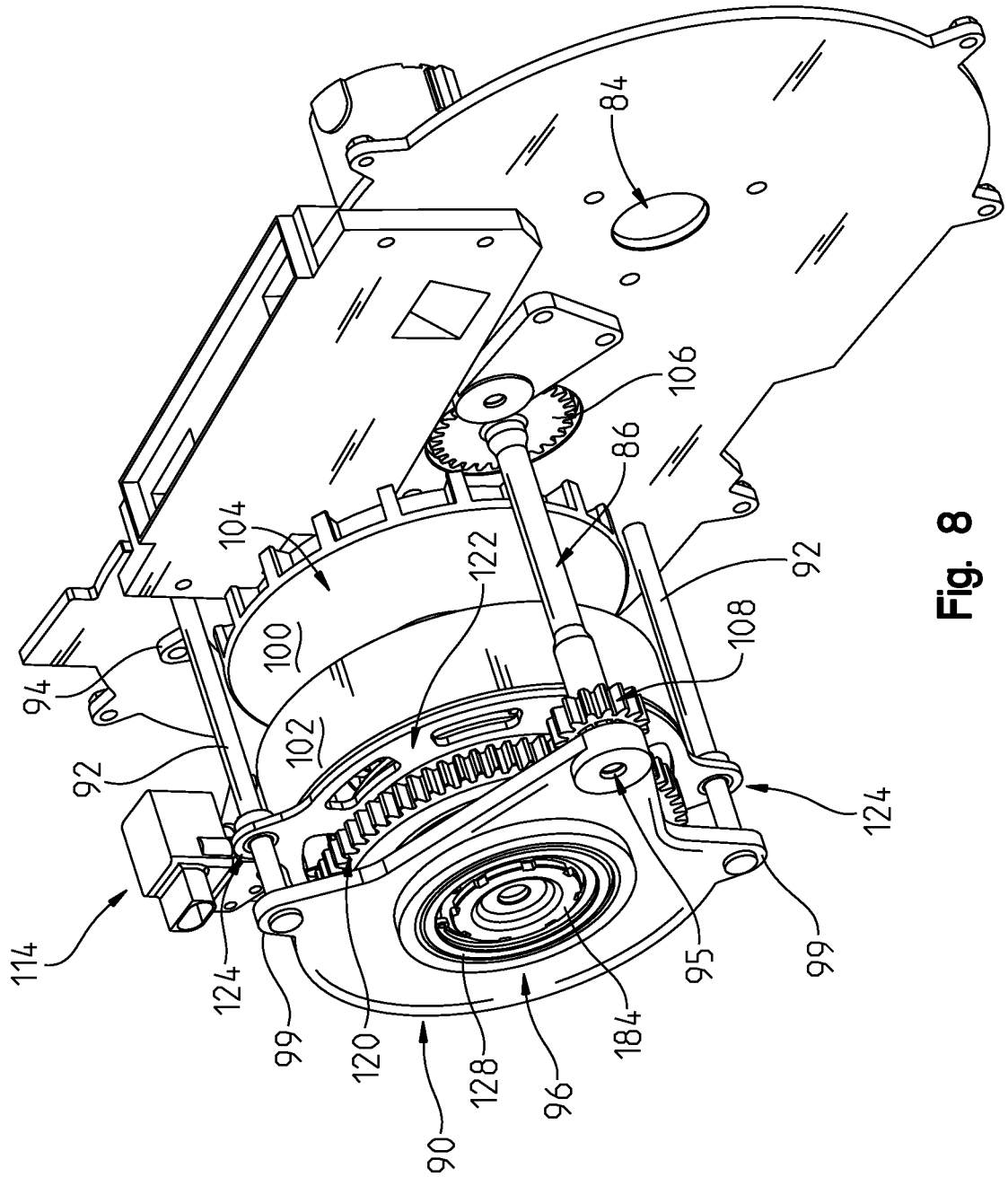
FIG. 8 is a front perspective view of the CVT of FIG. 4 illustrating a moveable sheave of the primary clutch in an open position.
Figure 9:
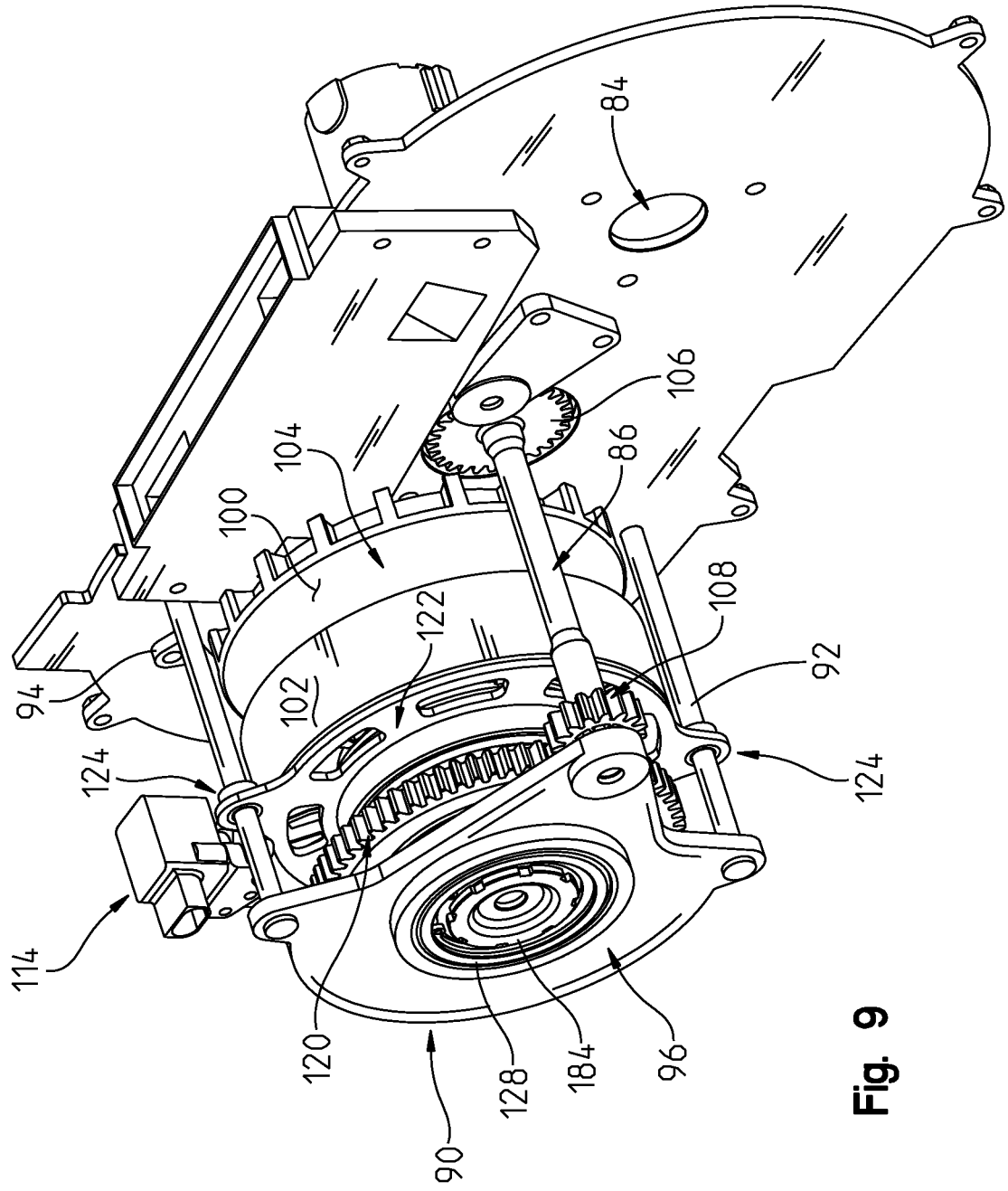
FIG. 9 is a front perspective view of the CVT of FIG. 4 illustrating the moveable sheave of the primary clutch in a closed position.

In operation, the actuation of gear drive 86 by motor 76 (see FIG. 10) is configured to modulate the gear ratio provided by primary clutch 50. Referring to FIG. 10, the output of motor 76 is transferred through reduction gear 130 to main gear drive 86 to thereby rotate outer screw assembly 120 (see FIG. 8) of primary clutch 50. Outer screw assembly 120 is stationary axially and rotates due to the rotation of main gear drive 86 independent of a rotation of shaft 70. Referring to FIGS. 8 and 14, rotation of outer screw assembly 120 in a first direction unscrews threaded screw portion 188 of inner screw assembly 122 from threaded screw portion 127 of outer screw assembly 120, thereby causing inner screw assembly 122 to slide axially along posts 92 towards stationary sheave 100 while remaining rotationally stationary.

Referring to FIG. 14, the axial movement of inner screw assembly 122 provides a thrust force against moveable sheave 102 via bushing assembly 172 to move sheave 102 towards stationary sheave 100. As described herein, bushing assembly 172 rotates within the rotationally stationary inner screw assembly 122 via bearing assembly 190. As such, the thrust force provided by inner screw assembly 122 is applied to bushing assembly 172 through bearing assembly 190. Similarly, rotation of outer screw assembly 120 in a second, opposite direction causes inner screw assembly 122 to move axially away from stationary sheave 100 along posts 92 (see FIG. 8) and to apply a pulling force on bushing assembly 172 and moveable sheave 102 through bearing assembly 190. Bearing assemblies 183, 190 provide axial movement of inner screw assembly 122, bushing assembly 172, and sheave 102 relative to shaft 70 that is independent from the rotational movement of shaft 70, sheaves 100, 102, sliding support 200, and bushing assembly 172. In the illustrated embodiment, the range of axial motion of inner screw assembly 122 relative to outer screw assembly 120 defines the maximum and minimum gear ratios provided with primary clutch 50, although other limit stops may be provided.

Figure 18:
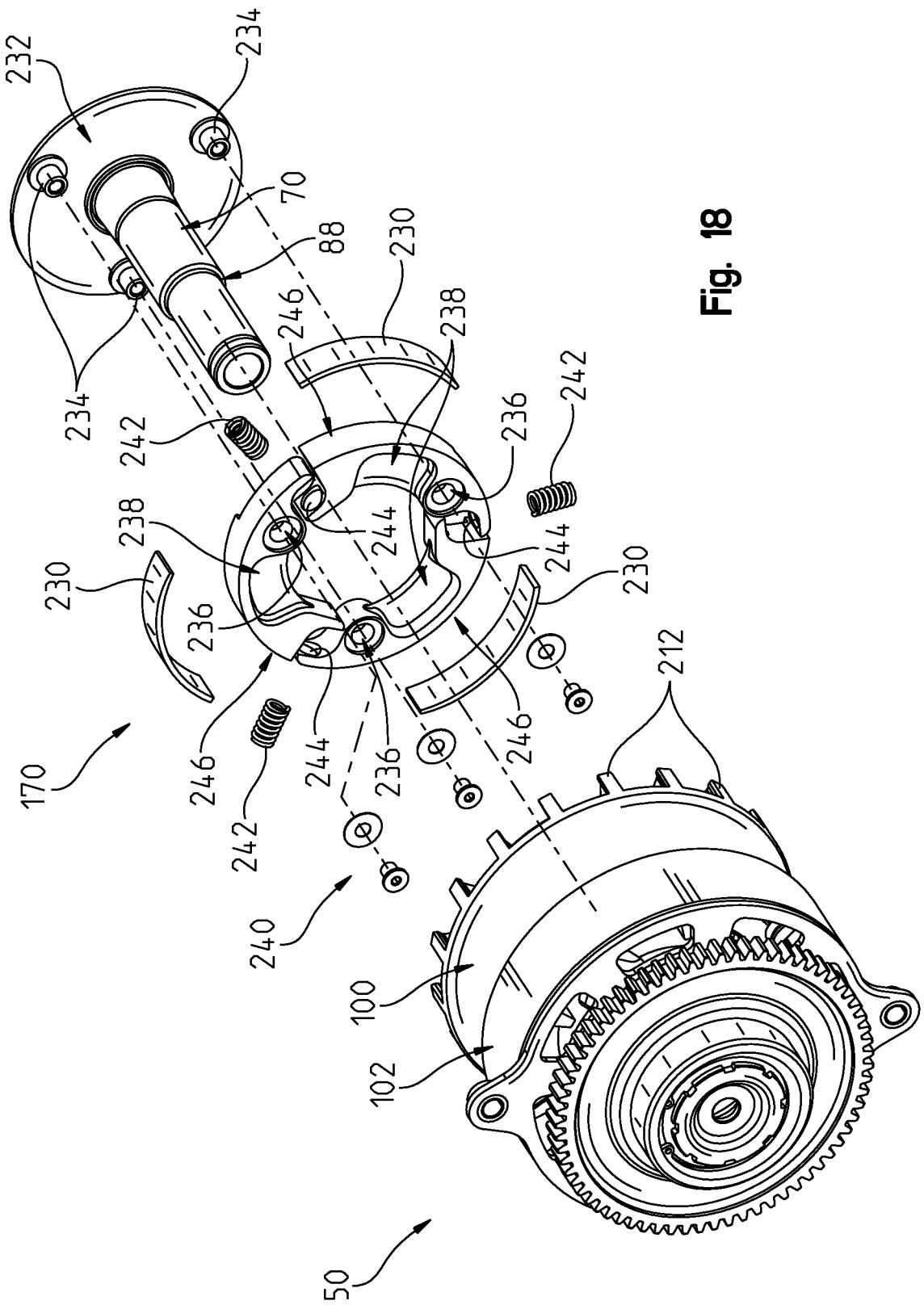
FIG. 18 is a partially exploded front perspective view of the primary clutch and the launch clutch of FIG. 12.
Figure 19:
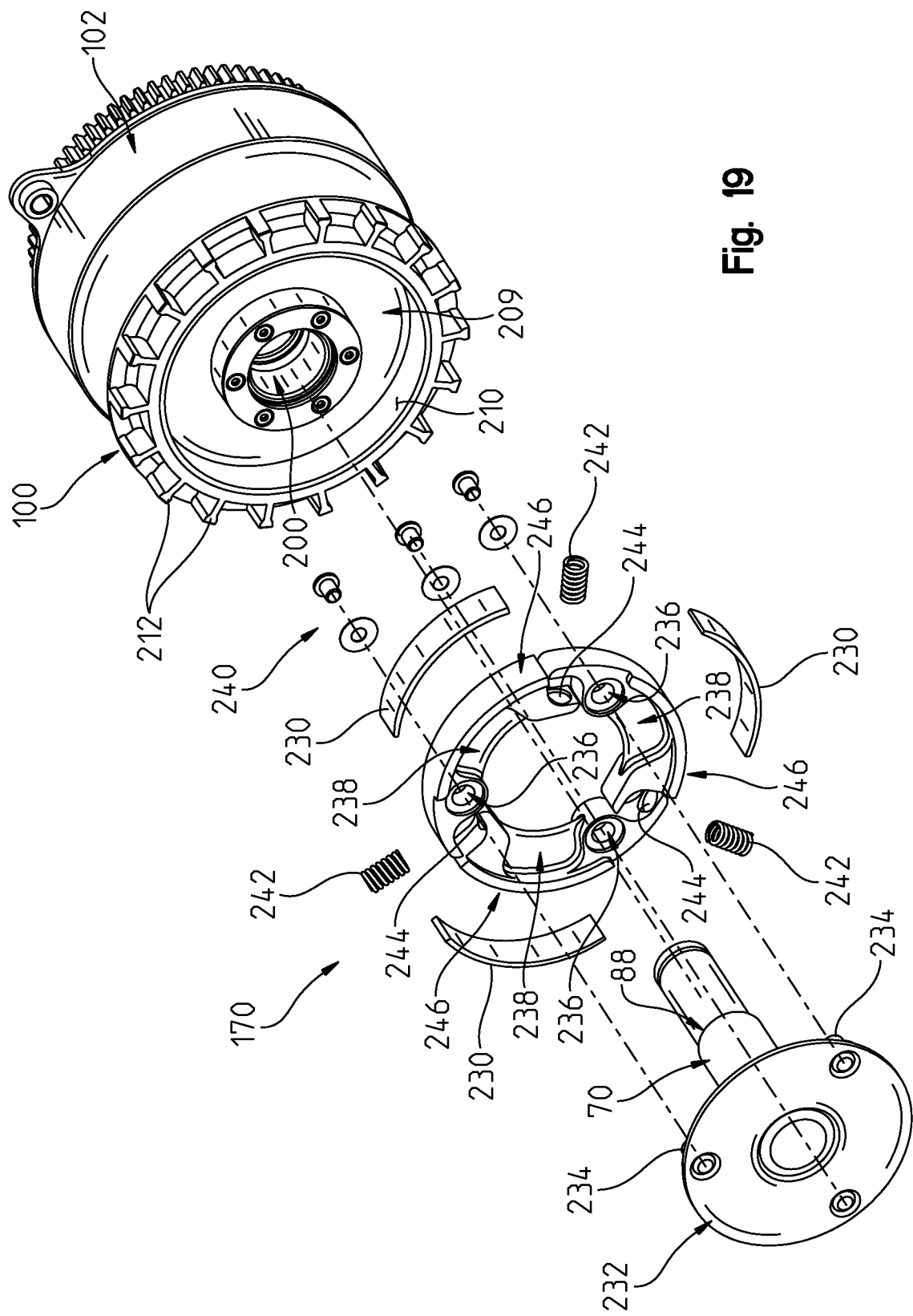
FIG. 19 is a partially exploded rear perspective view of the primary clutch and the launch clutch of FIG. 12.

As illustrated in FIGS. 18 and 19, a clutch assembly 170 is coupled to shaft 70 to serve as a starting or launch clutch for primary clutch 50. Clutch assembly 170 is illustratively a dry centrifugal clutch 170 integrated into primary clutch 50. Clutch assembly 170 is configured to be positioned external to the engine case 43 (see FIG. 2) of engine 42. As such, clutch assembly 170 is not integrated with the engine case 43 of engine 42 and is therefore not positioned in the engine oil. Rather, clutch assembly 170 is positioned outside of the engine case 43 and is coupled to the output shaft 44 of engine 42 to operate as a dry starting clutch for primary clutch 50. As such, clutch assembly 170 is removable from engine 42 by pulling the clutch assembly 170 from shaft 44.

In assembly, clutch assembly 170 is positioned in an interior 209 of primary clutch 50 (see FIG. 19). Clutch assembly 170 includes an end plate 232 coupled to shaft 70 and having a plurality of posts 234. In the illustrated embodiment, shaft 70 and end plate 232 are integrally formed, although shaft 70 may be coupled to end plate 232 using a fastener or press-fit configuration. As illustrated in FIG. 14, shaft 70 includes substantially cylindrical outer and inner surfaces 226, 228, respectively. Inner surface 228 forms a hollow interior region 229 of shaft 70. Outer and inner surfaces 226, 228 illustratively taper from end plate 232 towards end 71. The outer surface of shaft 70 further includes a step 88 such that the diameter of the portion of shaft 70 received by bushing assembly 172 and outer bearing support 184 is smaller than the diameter of the portion of shaft 70 positioned in tube portion 216 of sliding support 200. In the illustrated embodiment, the output shaft 44 of engine 42 (see FIG. 2) is received by interior region 229 of shaft 70 to drive rotation of clutch assembly 170. As such, clutch assembly 170 and shaft 70 rotate with engine 42.

Referring to FIGS. 18 and 19, clutch assembly 170 further includes shoes or arms 238 pivotally mounted to posts 234 via fasteners 240. Arms 238 each include an aperture 236 that receives a corresponding post 234 of end plate 232. Fasteners 240 illustratively include bolts and washers. Each arm 238 includes a friction pad 230 coupled to the outer circumferential surface of each arm 238. A spring 242 is coupled between adjacent arms 238 at seats 244 to bias arms 238 into spaced relation with each other.

In the illustrated embodiment, clutch assembly 170 is disengaged from primary clutch 50 when engine 42 (see FIG. 2) is at or below engine idle speed. As the engine speed and the corresponding rotational speed of clutch assembly 170 increases, the centrifugal force acting on arms 238 overcomes the biasing force of springs 242 and causes ends 246 of arms 238 to swing radially outward, thereby forcing friction pads 230 into engagement with an inner friction surface 210 (see FIG. 13) of stationary sheave 100. The engagement of clutch assembly 170 with stationary sheave 100 transfers torque to sliding support 200 and moveable sheave 102. As such, sheaves 100, 102, sliding support 200, and bushing assembly 172 all rotate with shaft 70. When the rotational speed of shaft 70 decreases to a threshold speed, the reduced centrifugal force causes arms 238 to move radially inward away from surface 210 of sheave 100. As such, clutch assembly 170 disengages primary clutch 50. Stationary sheave 100 illustratively includes a plurality of circumferentially spaced cooling fins 212 configured to reduce the heat generated by the engagement of clutch assembly 170.

In the illustrated embodiment, upon removing cover 61 and bracket 90 from mounting bracket 62 (see FIG. 5), a disengaged centrifugal starting clutch 170 allows primary clutch 50 to be pulled off shaft 70 as one assembled unit. Belt 54 (see FIG. 2) may be removed and/or replaced upon removing primary clutch 50 from shaft 70. Further, actuator assembly 80 (see FIGS. 9 and 10) remains coupled to mounting bracket 62 when primary clutch 50 is removed from shaft 70 such that the gears of actuator assembly 80 (e.g. reduction gear 130) are not required to be removed and reset or recalibrated. In one embodiment, primary clutch 50 and belt 54 are removable from shaft 70 without removing main gear drive 86 (see FIG. 5).

Centrifugal starting clutch 170 serves to separate the shifting function of primary clutch 50 from the engagement function of the primary clutch 50. In particular, the shifting function is performed by the primary clutch 50 via CVT control logic 35 of controller 36 (see FIG. 2), while the engagement of primary clutch 50 is controlled by starting clutch 170. As such, controller 36 is not required to control the engagement of primary clutch 50 because starting clutch 170 automatically engages primary clutch 50 upon reaching a predetermined rotational speed.

In an alternative embodiment, primary clutch 50 may be configured to operate without a starting clutch 170. For example, in this embodiment, primary clutch 50 of CVT 48 is directly coupled to the output of engine 42. When vehicle 10 is at idle or not running, CVT control logic 35 positions moveable sheave 102 away from stationary sheave 100 such that belt 54 is positioned radially inward towards shaft 70, as illustrated in FIG. 6. In one embodiment, CVT control logic 35 positions sheave 102 at a maximum open position when engine 42 is idling or not running such that moveable sheave 102 does not contact belt 54. In one embodiment, sheave 102 is disengaged from belt 54 during shifting of sub-transmission 56 (see FIG. 2). As such, secondary clutch 52 is rotating at a zero or minimal speed upon shifting sub-transmission 56. Engagement of sheave 102 and belt 54 is initiated upon engine driving torque being requested, e.g. upon throttle request by an operator. In another embodiment, sheave 102 is moved into engagement with belt 54 after sub-transmission 56 is shifted out of neutral and into gear. In another embodiment, moveable sheave 102 is spring-loaded away from belt 54 during engine idle, and the shifting of sub-transmission 56 into gear mechanically causes sheave 102 to move back into engagement with belt 54.

In one embodiment, CVT control logic 35 of FIG. 2 provides functionality for spike load reduction of the drive train by automatically shifting CVT 48 (i.e., adjust primary clutch 50) upon detection of vehicle 10 being airborne. For example, when vehicle 10 of FIG. 1 is airborne, wheels 24 may accelerate rapidly due to the wheels 24 losing contact with the ground while the throttle operator 116 (see FIG. 2) is still engaged by the operator. When the wheels 24 again make contact with the ground upon vehicle 10 landing, the wheel speed may decelerate abruptly, possibly leading to damaged or stressed components of the CVT 48 and other drive train components. CVT control logic 35 initiates spike load control upon detection of vehicle 10 being airborne to slow drive train acceleration (e.g., the acceleration of final drive 58) of the airborne vehicle 10. In one embodiment, CVT control logic 35 slows the rate at which CVT 48 upshifts during spike load control. In one embodiment, CVT control logic 35 stops upshifting of CVT 48 at least momentarily during spike load control or downshifts CVT 48 to a lower gear ratio. As such, the drive train acceleration of vehicle 10 is slowed before vehicle 10 returns to the ground, and the inertial loading on CVT 48 and other drive train components (e.g. sub-transmission 56, final drive 58, etc.) upon vehicle 10 landing is reduced or minimized.

In one embodiment, CVT control logic 35 automatically adjusts the gear ratio of CVT 48 of the airborne vehicle 10 such that the wheel speed is controlled to approach the wheel speed detected immediately prior to vehicle 10 becoming airborne. For example, CVT control logic 35 determines a wheel speed of vehicle 10 immediately prior to vehicle 10 becoming airborne or during a transition of vehicle 10 from the grounded state to the airborne state. The determined wheel speed is set as the target speed, and CVT control logic 35 adjusts CVT 48 upon detection of the airborne state to control the wheel speed to return towards the target speed. In one embodiment, CVT control logic 35 adjusts CVT 48 until the wheel speed reaches the target speed or until the vehicle 10 returns to ground. As such, in one embodiment CVT control logic 35 adjusts CVT 48 such that the wheel speed of vehicle 10 upon vehicle 10 returning to the ground is substantially the same as the detected wheel speed immediately prior to vehicle 10 becoming airborne.

In one embodiment, controller 36 determines that vehicle 10 is airborne upon detection of a sudden acceleration in drive train components. For example, controller 36 may detect the sudden acceleration based on feedback from a wheel speed sensor, engine speed sensor, transmission speed sensor, or other suitable speed sensor on the drive train of vehicle 10. In the illustrated embodiment, controller 36 continuously monitors the angular acceleration of the drive train by measuring the speed of one of the shafts of CVT 48 or sub-transmission 56 with a speed sensor 59. Vehicle 10 is determined to be airborne when the acceleration in wheel speed or drive train speed exceeds the design specifications of vehicle 10. For example, vehicle 10 has a maximum wheel acceleration based on available torque from engine 42, the frictional force from the ground, the weight of vehicle 10, and other design limits. When the monitored drive train components accelerate at a faster rate than vehicle 10 is capable under normal operating conditions (i.e., when wheels 24 are in contact with the ground), controller 36 determines that wheels 24 have lost contact with the ground. One or more predetermined acceleration limits are stored at memory 39 (FIG. 2) that correspond to the design limits of vehicle 10 to trigger the spike load control. Upon vehicle 10 returning to ground, controller 36 detects the grounded state of vehicle 10 and resumes normal control of CVT 48. In one embodiment, controller 36 detects the grounded state based on a detected compression of the vehicle suspension.

In one embodiment, the spike load reduction feature of CVT control logic 35 works in conjunction with the electronic throttle control system (e.g., engine control logic 34) to reduce drive train acceleration (i.e., by reducing the throttle opening, etc.) upon detection of an airborne condition, as described in U.S. patent application Ser. No. 13/153,037, filed on Jun. 3, 2011 and entitled "Electronic Throttle Control," the disclosure of which is incorporated herein by reference. The CVT 48 control and electronic throttle control are used together to reduce the acceleration of the drive train when vehicle 10 is airborne. In some operating conditions, a high or increasing throttle demand is provided with throttle operator 116 while vehicle 10 is airborne. In one embodiment, the engine 42 continues to rev due to the high throttle demand until a rev limit of the engine 42 is reached. In the exemplary vehicle 10 having electronic throttle control, airflow to the engine 42 is automatically restricted upon detection of the airborne condition to reduce engine power and to reduce the likelihood of reaching the rev limit.

Controller 36 may detect an airborne condition of vehicle 10 using other methods, such as by detecting the compression distance or height of a suspension system (e.g. front suspension assembly 26 of FIG. 1 and/or rear suspension) of vehicle 10 with a suspension height sensor and/or by monitoring engine torque and power, as described in the referenced U.S. patent application Ser. No. 13/153,037. For example, vehicle 10 includes one or more suspension sensors 119 (FIG. 2) configured to measure the height or longitudinal compression of vehicle suspension (e.g., shocks). With vehicle 10 positioned on the ground, the weight of vehicle 10 causes the suspension to compress to a first height. With tires 22a and/or tires 22b (FIG. 1) airborne, the weight of vehicle 10 is removed from the suspension system and the suspension decompresses or extends to a second unloaded height. Based on feedback from sensors 119 (FIG. 2), controller 36 determines that vehicle 10 is airborne upon the suspension extending past the first height or to the second unloaded height. In one embodiment, the suspension must be extended for a threshold amount of time before controller 36 determines that vehicle 10 is airborne. In one embodiment, controller 36 uses the detected shock height in conjunction with the detected wheel speed acceleration to determine that vehicle 10 is airborne.

In one embodiment, CVT 48 further includes a planetary gear assembly to provide an infinitely variable transmission system. In one embodiment, the planetary gear assembly consists of a ring gear, several planetary gears coupled to a carrier, and a sun gear. The ring gear is driven directly off the output of engine 42 via a gear or chain. The planetary gears and the carrier are connected to and driven by the secondary clutch 52. The sun gear serves as the output of CVT 48 connected to the sub-transmission 56. Based on the gear ratios of the planetary gear assembly, the combined CVT 48 and planetary gear assembly are configured to provide both positive and negative speeds (forward and reverse) by varying the gear ratio of the CVT 48. In one embodiment, the hydrostatic mode provided with controller 36 and described herein is implemented in a CVT 48 having a planetary gear assembly.

Figure 20:
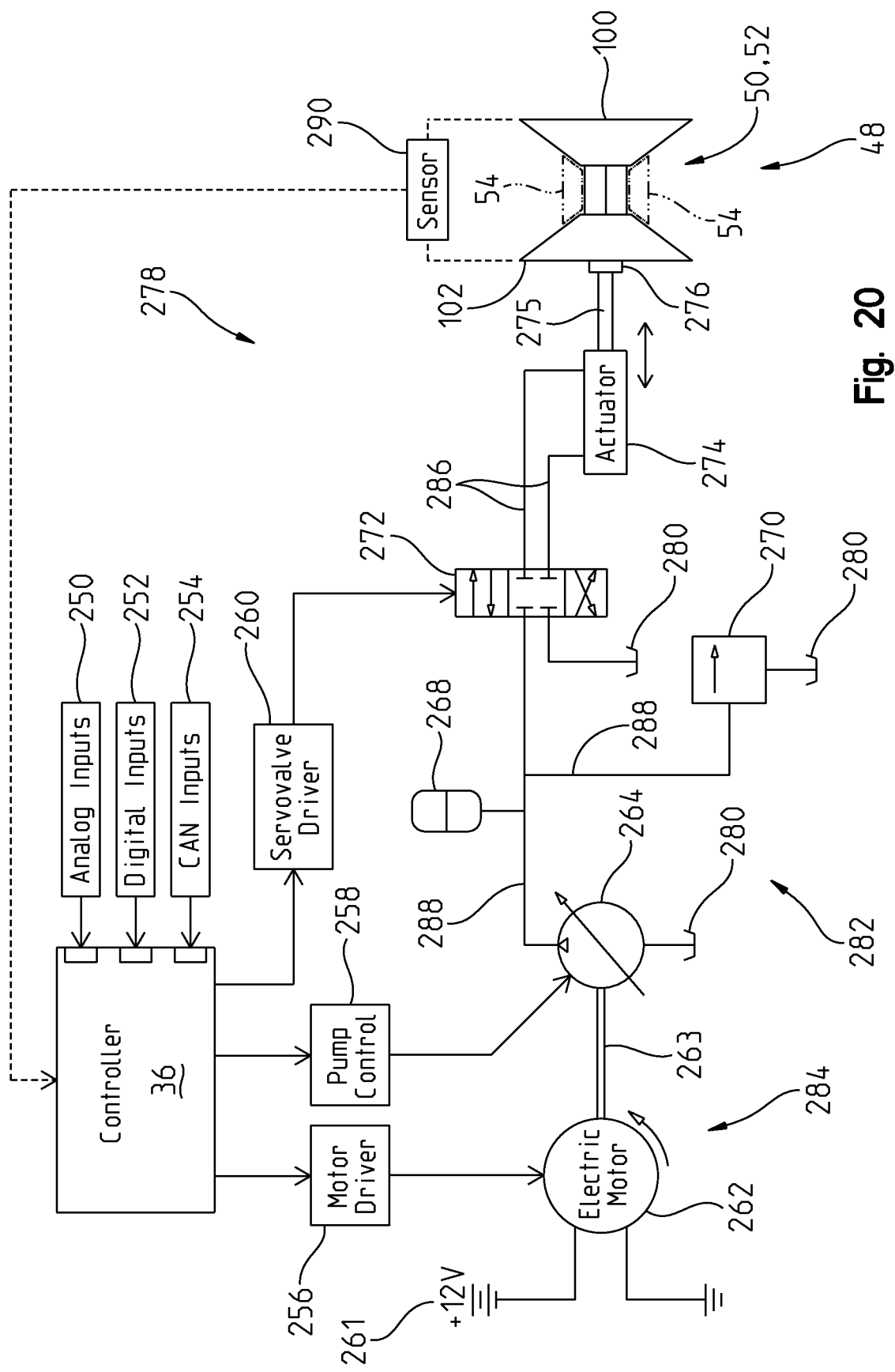
FIG. 20 is a diagrammatic view of an exemplary electro-hydraulic circuit for controlling the CVT of FIG. 2 according to one embodiment.

In one embodiment, CVT 48 is electro-hydraulically actuated, as illustrated with the exemplary electro-hydraulic circuit 278 of FIG. 20. In the illustrated embodiment of FIG. 20, primary clutch 50 of CVT 48 is actuated by electro-hydraulic circuit 278 rather than by actuator assembly 80 of FIGS. 10 and 11. Circuit 278 may also be configured to control secondary clutch 52. Electro-hydraulic circuit 278 illustratively includes a hydraulic circuit 282 and an electric circuit 284. Controller 36 illustratively receives analog inputs 250, digital inputs 252, and CAN inputs 254. Exemplary analog and digital inputs 250, 252 include hydraulic system pressure sensors, a clutch position sensor (e.g. sensor 290 of FIG. 20), a servo valve position sensor, and other sensors detecting various parameters of vehicle 10. Exemplary CAN inputs 254 include an engine speed sensor, throttle position sensor, vehicle speed sensor, vehicle operating mode sensor, and other CAN based sensors that detect various parameters of vehicle 10. Controller 36 is configured to control an electric motor 262 of electric circuit 284 and a pump 264 and a servo valve 272 of hydraulic circuit 282 based on inputs 250, 252, 254.

A motor driver 256 is configured to control the power provided to motor 262 based on control signals from controller 36. Alternatively, a relay may be provided in place of motor driver 256 that is selectively actuated by controller 36 to provide fixed power to motor 262. Motor 262 may be any motor type suitable for driving pump 264. In the illustrated embodiment, motor 262 is a DC electric motor. A voltage supply 261, illustratively 12 VDC, is provided to motor 262, and the speed of motor 262 is controlled by controller 36 via motor driver 256. An output 263 of motor 262 drives pump 264. In the illustrated embodiment, pump 264 is a variable displacement pump 264. A pump control unit 258 of controller 36 modulates the displacement of pump 264 to control hydraulic pressure of hydraulic circuit 282 based on inputs 250, 252, 254. Pump 264 may alternatively be a fixed displacement pump.

A hydraulic accumulator 268 stores pressurized hydraulic fluid to assist pump 264 and motor 262 with meeting the pressure demands of hydraulic circuit 282. For example, accumulator 268 is configured to achieve required pressure demands of hydraulic circuit 282 during peak shift rates of CVT 48. As such, the likelihood of spike loads being induced on the electric circuit 284 during peak shift rates of CVT 48 is reduced. A pressure relief valve 270 is provided to maintain the pressure on hydraulic line 288 below a predetermined maximum threshold pressure. Pressure relief valve 270, pump 264, and servo valve 272 are coupled to a hydraulic return reservoir 280.

Servo valve 272 regulates the flow of hydraulic fluid from line 288 to actuator 274 to adjust the position of moveable sheave 102. Servo valve 272 is illustratively a three-way electro-hydraulic servo valve 272 controlled by a servo valve driver 260 of controller 36. Servo valve driver 260 of controller 36 controls servo valve 272 based on inputs 250, 252, 254.

Actuator 274, illustratively a linear hydraulic actuator, includes a piston 275 coupled to moveable sheave 102 via a rotary bearing 276. In one embodiment, rotary bearing 276 is a flanged bearing or a face bearing, although another suitable bearing 276 may be provided. In one embodiment, actuator 274 is coupled to chassis 15 of vehicle 10 (see FIG. 1), and moveable sheave 102 rotates about piston 275 of actuator 274 and moves axially relative to actuator 274 via bearing 276. Servo valve 272 is coupled to actuator 274 via hydraulic lines 286. In one embodiment, lines 286 are small diameter, high pressure hydraulic lines 286. By regulating the fluid flow to actuator 274 with servo valve 272, linear displacement of actuator 274 is adjusted to cause corresponding axial adjustment of moveable sheave 102.

In one embodiment, electric circuit 284 and hydraulic circuit 282 are positioned on vehicle 10 (see FIG. 1) away from CVT 48, and actuator 274 is positioned immediately adjacent or within housing 60 (see FIG. 4) of CVT 48. As such, hydraulic lines 286 are routed from servo valve 272 to the actuator 274 positioned near CVT 48. For example, electric circuit 284 and hydraulic circuit 282 may be placed beneath hood 32 and/or seats 18a, 18b (see FIG. 1), and CVT 48 and actuator 274 may be positioned towards the rear end 14 of vehicle 10 beneath engine cover 19 (see FIG. 1). As such, the actuation components (i.e. actuator 274) of the moveable sheave(s) 102 of CVT 48 occupy a small space at the location of CVT 48 while some or all of the remaining components of electro-hydraulic circuit 278 are positioned elsewhere on vehicle 10.

In one embodiment, the pressure applied to moveable sheave 102 via actuator 274 is modulated to achieve a desired gear ratio of CVT 48 and/or a desired pinch force on belt 54. As illustrated in FIG. 20, a position sensor 290 is configured to detect the linear position of moveable sheave 102 and provide a corresponding signal to controller 36 with the detected position data. As such, the position of sheave 102 may be monitored during operation. In one embodiment, controller 36 implements a fail-safe mode in the control of moveable sheave 102. In particular, when a system failure or signal loss is detected by controller 36, moveable sheave 102 is positioned to a maximum low ratio or open position such that the pinch force on belt 54 is minimized or removed, as described herein. An exemplary system failure is when no or inadequate hydraulic pressure in hydraulic circuit 282 is detected with inputs 250, 252.

Referring again to drive system 40 of FIG. 2, the electronically controlled clutch 50, 52 of CVT 48 is configured to move to a home position prior to or upon shutting down vehicle 10. For example, the controlled clutch 50, 52 moves to its fully open position (see FIG. 8, for example) or to its fully closed position (see FIG. 9, for example). In the illustrated embodiment, upon vehicle shutdown, moveable sheave 102 of primary clutch 50 moves to its furthest open position, as illustrated in FIG. 8. As such, moveable sheave 102 is positioned away from and out of contact with belt 54 prior to vehicle 10 being started, thereby reducing the likelihood of vehicle 10 accelerating upon starting engine 42. In one embodiment, for an electronically controlled secondary clutch 52, the moveable sheave (not shown) of secondary clutch 52 is moved to its furthest closed position upon or prior to vehicle shutdown.

Referring to FIG. 2, vehicle 10 includes a system battery 118 (e.g. 12 VDC) configured to provide power for starting vehicle 10 and to provide peripheral power to vehicle 10 during operation. The system battery 118 provides power to actuator assembly 80 to move moveable sheave 102 to the home position upon vehicle 10 being shutdown or being stopped and shifted into neutral. Primary clutch 50 of CVT 48 is also configured to return to a home position upon vehicle 10 suffering an abrupt power loss, as described herein with reference to FIGS. 21-23.

In another embodiment, vehicle 10 does not have a system battery 118. For example, vehicle 10 may include a mechanical rope and recoil assembly that is pulled by an operator to start engine 42. In particular, the pull of the rope by an operator rotates a power generator that starts engine 42 of vehicle 10, and the power generator when driven by rotating engine 42 provides peripheral power to the electronic components of vehicle 10 during operation. See, for example, generator 304 of FIG. 22. As such, power from a system battery 118 is not available to move primary clutch 50 to its home position while vehicle 10 is shut down. In this embodiment, primary clutch 50 is moved to its home position prior to shutting down vehicle 10 using the power provided with generator 304, as described herein.

Figure 21:
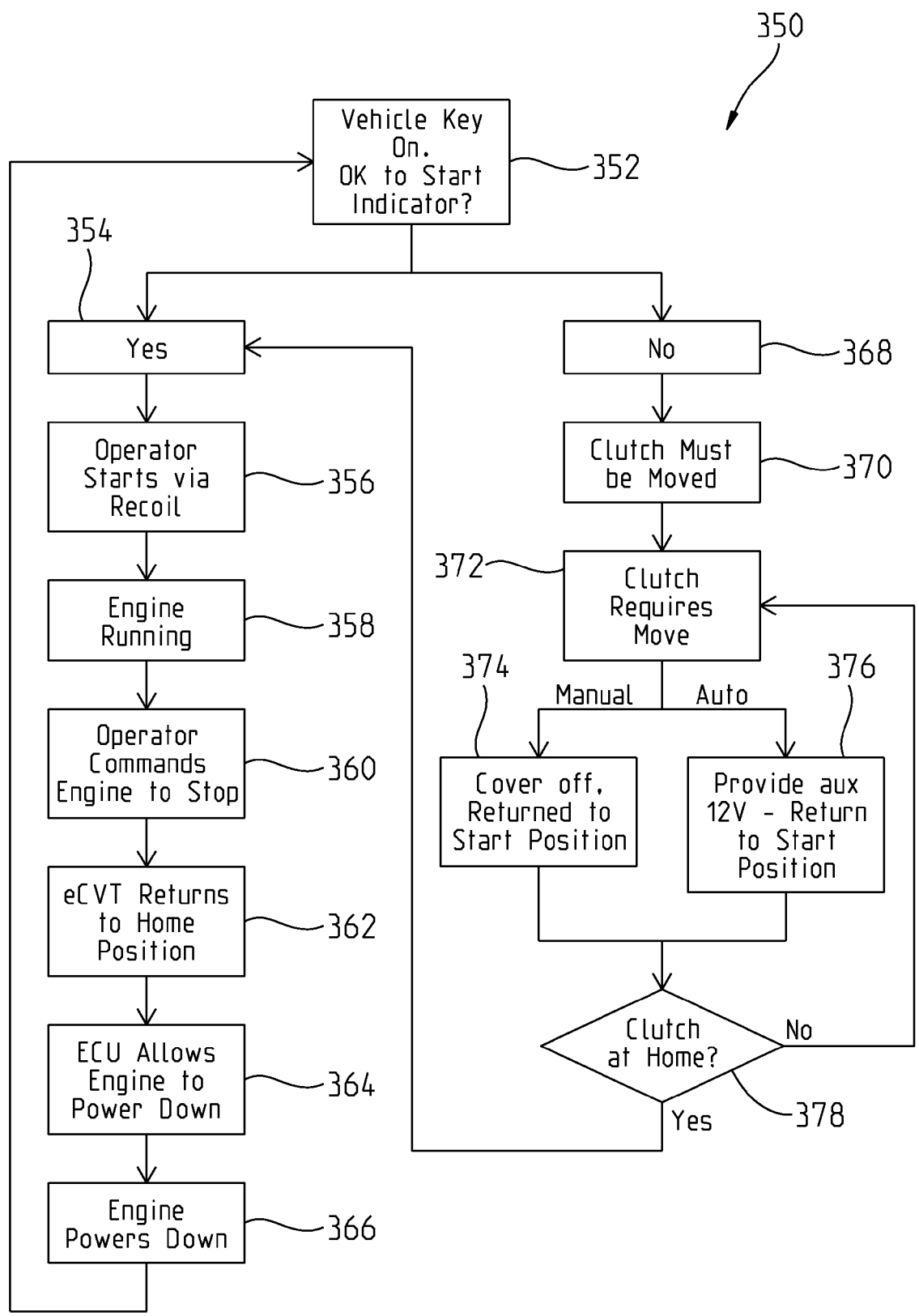
FIG. 21 is a block diagram illustrating an exemplary control strategy for moving a clutch of the CVT of FIG. 2 to a home position.

Referring to FIG. 21, an exemplary control strategy 350 is illustrated for moving primary clutch 50 to its home position in a vehicle 10 not having a system battery 118. Control strategy 350 is illustratively implemented by controller 36 of FIG. 2. At block 352, an indicator (e.g. audible or visual) is provided on vehicle 10 upon moving the vehicle key to the ON position to indicate to the operator if primary clutch 50 is at its home position. In one embodiment, the indicator, such as a light, for example, is powered by a small, low-voltage battery. The indicator may alternatively be mechanically linked to the CVT 48 to detect the position of clutch 50. If primary clutch 50 is at its home position, engine 42 is started by the operator, as illustrated at blocks 354, 356, and 358. For example, an operator may start engine 42 via a manual start system, such as a rope/recoil assembly or kick start assembly. In one embodiment, actuation of the manual start system is blocked when primary clutch 50 is not at its home position at block 352.

Upon an operator commanding engine 42 to stop at block 360 (e.g. turning the vehicle key to OFF), primary clutch 50 automatically returns to its home position at block 362 prior to controller 36 allowing engine 42 to power down. In particular, controller 36 executes a shut down sequence at block 362 wherein controller 36 retains engine power despite the operator commanding shutdown, moves sheave 102 of primary clutch 50 to its home position by routing power from generator 304 (FIG. 22) to actuator assembly 80, and then allows engine 42 to shut down (block 364). At block 366, engine 42 shuts down. Accordingly, primary clutch 50 is at the home position before engine 42 shuts down such that vehicle 10 may be properly started up again at a future time without having to reset clutch 50.

Figure 22:
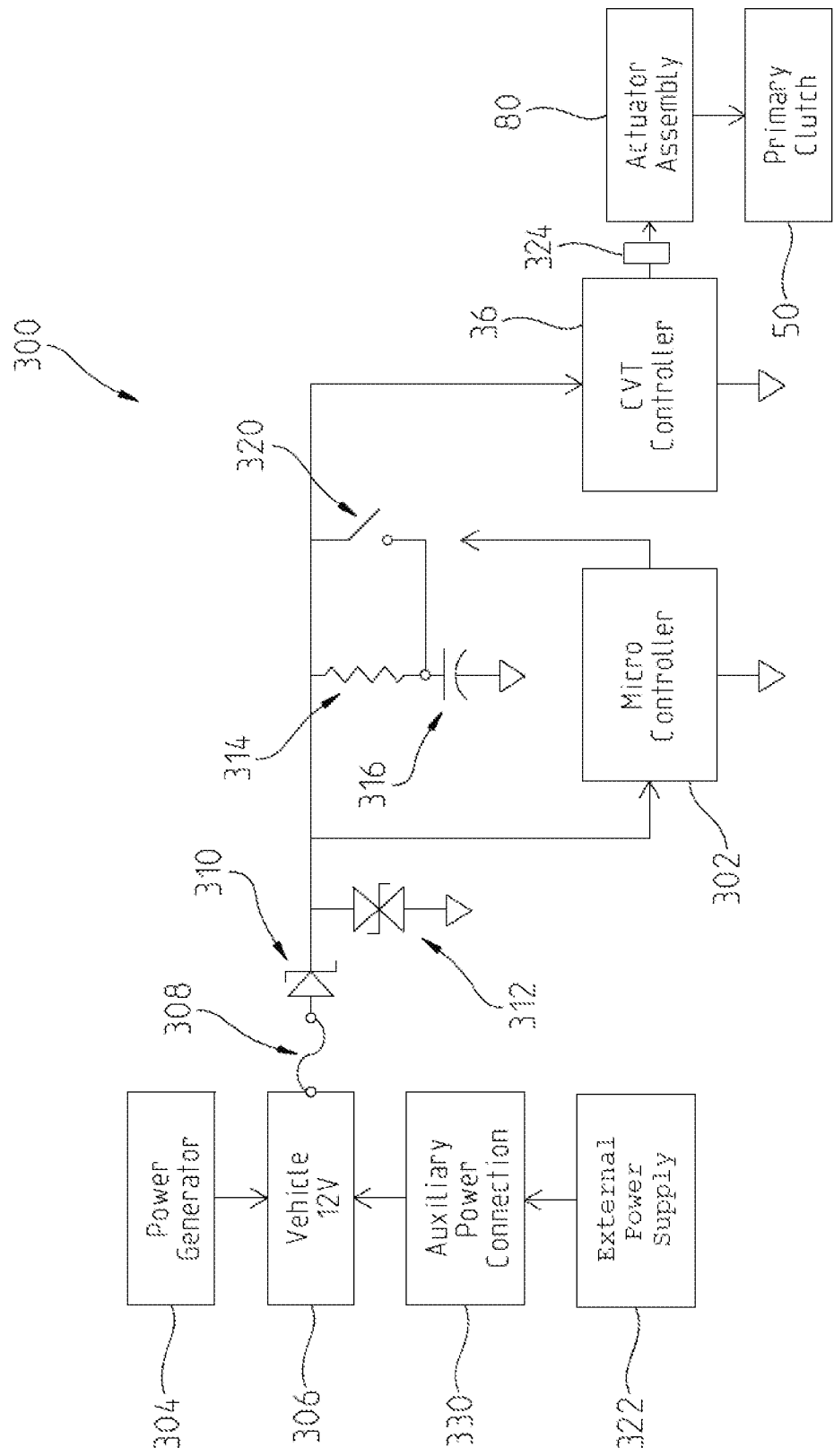
FIG. 22 is a diagrammatic view of an exemplary control system of the vehicle of FIG. 1 without a system battery.

If primary clutch 50 is not at its home position at block 352, primary clutch 50 must be moved to its home position prior to starting vehicle 10, as illustrated at blocks 368, 370, and 372. For example, clutch 50 may require a reset when vehicle 10 abruptly loses power before controller 36 is able to reset clutch 50 to its home position. Primary clutch 50 may be reset manually or via automated control. In the manual reset of block 374, an operator removes cover 61 (see FIG. 5) of CVT 48 and manually resets moveable sheave 102 to its home position by turning outer screw assembly 120 (see FIG. 5). In the automated reset of block 376, vehicle 10 includes an auxiliary power connector 330 for connecting vehicle 10 to an external power supply 322 (e.g. 12 VDC), as illustrated in the exemplary control system 300 of FIG. 22. In one embodiment, the external power supplied through auxiliary power connector 330 is routed to controller 36 to power the controller 36, as illustrated in FIG. 22. Upon detecting the presence of external power, controller 36 moves primary clutch 50 to its home position via actuator assembly 80. In another embodiment, power provided through auxiliary power connector 330 is routed to a switch 324 or other tool (e.g., diagnostic tool) that an operator actuates to return primary clutch 50 to the home position. For example, switch 324 includes a closed position that allows current to pass to actuator 80 to move clutch 50 to the home position and an open position that blocks current from actuator 80. An operator actuates switch 324 to control the delivery of power to actuator 80 and thus to control the position of clutch 50. In one embodiment, switch 324 is used in conjunction with controller 36 (as illustrated in FIG. 22) such that switch 324 enables and disables the automated return of clutch 50 to the home position controlled by controller 36. Alternatively, switch 324 may bypass controller 36 such that switch 324 controls the delivery of power to actuator 80 and the position of clutch 50 without controller 36. At block 378, if primary clutch 50 is at the home position, the operator is able to start engine 42 at blocks 354 and 356. If primary clutch 50 is not at the home position at block 378, the process returns to block 372 for additional manual or automated movement of clutch 50.

Referring to FIG. 22, the exemplary control system 300 is further configured to provide a fail safe for returning clutch to the home position upon sudden power loss in a vehicle 10 not having a system battery 318 (FIG. 2). Control system 300 illustratively includes a microcontroller 302 that controls a switch 320 to selectively route power stored at a capacitor 316 to controller 36. Microcontroller 302 includes a processor and a memory accessible by the processor and containing software with instructions for monitoring vehicle power 306, detecting power interruption, and controlling switch 320. Microcontroller 302 and controller 36 may alternatively be integrated in a single controller that includes logic that performs the functions described herein of both controllers 302, 36. Generator 304, driven by engine 42 (FIG. 2) during vehicle operation, provides vehicle power 306 (illustratively 12 VDC) for controller 36, microcontroller 306, and other vehicle components and for charging capacitor 316 during vehicle operation. Capacitor 316 may alternatively be charged by external power supply 322 via auxiliary connection 330. Capacitor 316 is charged during vehicle operation while electrically decoupled from actuator 80 (i.e., with switch 320 open). A fuse 308 and a diode 310, illustratively a Zener diode 310, are provided in series between vehicle 306 and controllers 302, 36 to provide reverse voltage protection. A diode 312, illustratively a transient voltage suppression diode 312, is coupled between the output of diode 310 and ground to provide over-voltage protection for controllers 302, 36. A resistor 314 is provided for charging capacitor 316.

Microcontroller 302 is configured to close switch 320 upon detection of a power loss at vehicle power 306. For example, upon vehicle 10 abruptly losing power and generator 304 shutting down, microcontroller 302 senses the drop or loss of vehicle power 306 and closes switch 320. In one embodiment, microcontroller 302 includes a power source (e.g., capacitor) that powers microcontroller 302 after a vehicle power loss so that microcontroller 302 can close switch 320 after the power loss. With switch 320 closed, power stored at capacitor 316 is routed to controller 36 for moving primary clutch 50 of CVT 48 to the home position. In one embodiment, capacitor 316 is an ultra-capacitor. Capacitor 316 may include another suitable energy storage device 316, such as a lithium ion battery or another lightweight battery that is smaller than a typical vehicle system battery 318 (FIG. 2).

Figure 23:
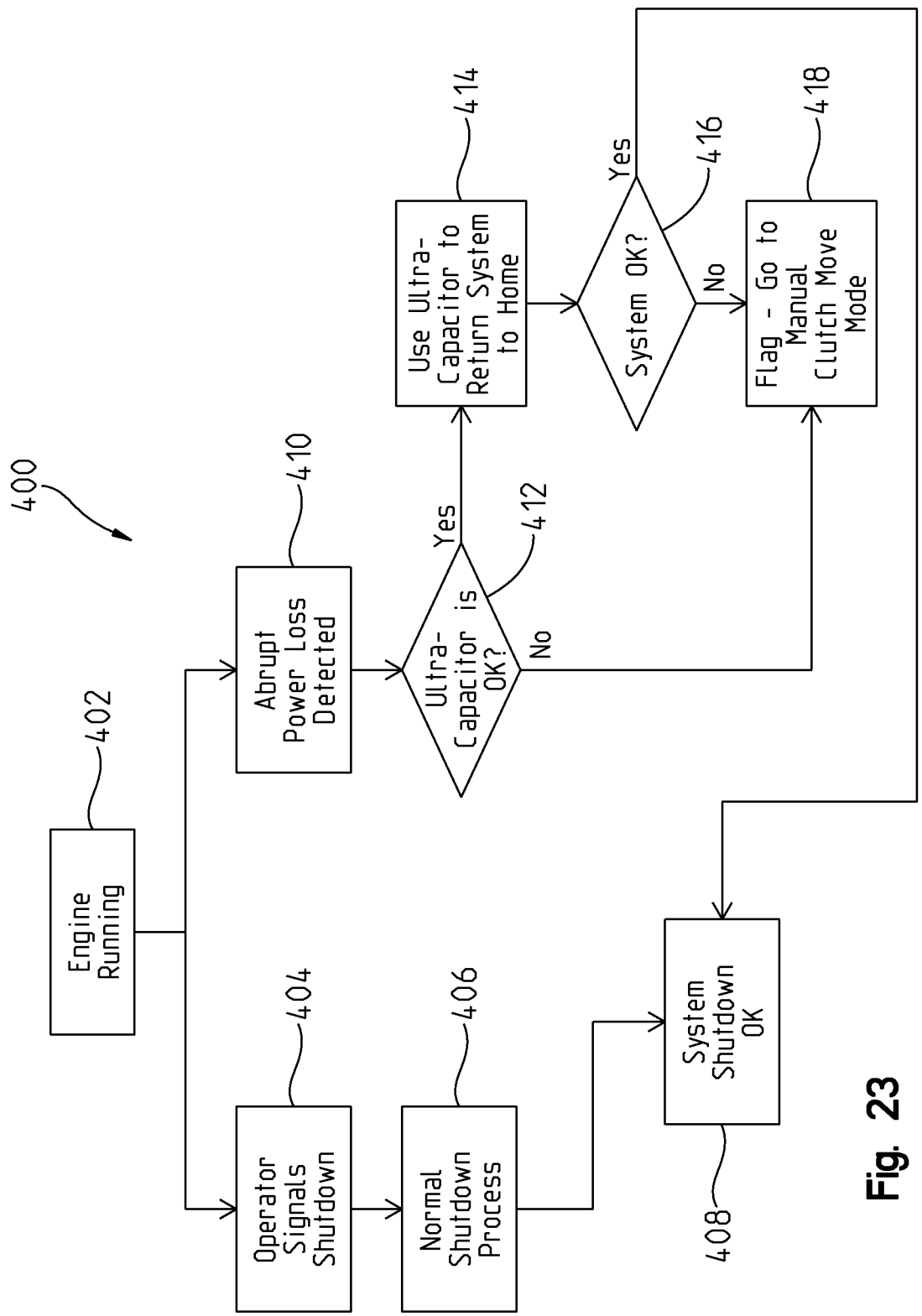
FIG. 23 is a block diagram illustrating an exemplary control strategy of the control system of FIG. 22 for moving a clutch of the CVT of FIG. 2 to a home position.

Referring to FIG. 23, an exemplary control strategy 400 is illustrated for control system 300 of FIG. 22. With engine running at block 402, an operator signals a vehicle shutdown at block 404, and the normal shutdown process for vehicle 10 is performed at block 406. For example, the shutdown process illustrated in blocks 360, 362, 364, and 366 of FIG. 21 and described herein is performed at block 406 of FIG. 23. If an abrupt power loss is detected by controller 302 (FIG. 22) at block 410, controller 302 determines at block 412 if capacitor 316 is charged and functioning properly. If controller 302 determines capacitor 316 is not functioning properly, switch 320 is not closed and primary clutch 50 is moved to its home position at block 418 manually or via auxiliary power connection 320, as described with blocks 374 and 376 of FIG. 21. If capacitor 316 is functioning properly at block 412, microcontroller 302 closes switch 320 to route power from capacitor 316 to controller 36 at block 414. Controller 36 uses the power from capacitor 316 to drive actuator assembly 80 to move primary clutch 50 of CVT 48 to its home position. At block 416, controller 36 (or microcontroller 302) determines if clutch 50 is at its home position based on feedback from a position sensor (e.g. sensor 290 of FIG. 20). If clutch 50 is at its home position, the shutdown of vehicle 10 is determined to be proper at block 408. If clutch 50 is not at its home position at block 416, process 400 proceeds to block 418 for a manual (or automated) reset of clutch 50, as described herein with blocks 374, 376 of FIG. 21. In one embodiment, capacitor 316 is sized to contain enough energy for moving clutch 50 to its home position based on a predetermined worst-case set of initial operating conditions where power interruptions could occur.

In another embodiment, vehicle 10 includes a mechanical return system for automatically positioning primary clutch 50 at the home position upon system power being removed. For example, in this embodiment, a mechanical spring/linkage system is coupled to moveable sheave 102 (see FIG. 5) of primary clutch 50 to position primary clutch 50 in its home position upon vehicle 10 being powered down. When power is returned to vehicle 10, controller 36 operates normally to control primary clutch 50, as described herein.

CVT control logic 35 (FIG. 2) is operative to implement traction control upon detecting a loss of tire traction. In particular, controller 36 determines a loss of traction has occurred upon detecting a high rate of change of the speed of one or more wheels 24 (FIG. 1), i.e., when the rate of change of speed exceeds a threshold rate. For example, one or more wheels 24 may accelerate or decelerate rapidly upon loss of traction, indicating that the wheel(s) 24 have spun out or have locked up. In one embodiment, upon detection of traction loss, CVT control logic 35 inhibits shifting of CVT 48 and holds the gear ratio of CVT 48 substantially constant until determining that traction has been regained. By holding the gear ratio constant, undesirable shifting of CVT 48 due to the rapid change in speed of wheels 24 during traction loss is avoided. In one embodiment, CVT control logic 35 determines that traction has been regained based on the monitored speed of wheels 24.

Controller 36 provides a plurality of operating modes for CVT 48 selectable with one or more mode selection devices 113 (FIG. 2). Exemplary operating modes include automatic, manual mimic, and hydrostatic modes. Further, controller 36 provides a cruise control mode selectable with a cruise switch. In the cruise control mode, at least one of the engine throttle position and the gear ratio of CVT 48 is held constant to hold the vehicle speed at a target vehicle speed. In one embodiment, the vehicle speed upon selection of the cruise control mode by an operator is set as the target vehicle speed, although the target vehicle speed may be entered by an operator via a user interface of vehicle 10. In one embodiment, the throttle position of engine 42 is locked or held constant by engine control logic 34 in cruise mode to hold the engine torque substantially constant, and the gear ratio of CVT 48 is varied by CVT control logic 35 based on vehicle speed feedback to maintain the target vehicle speed. In another embodiment, the gear ratio of CVT 48 is held constant during cruise control while the throttle position of engine 42 is varied to maintain the target vehicle speed. Alternatively, both the throttle position and the gear ratio of CVT 48 may be held substantially constant or may be simultaneously adjusted to control vehicle speed to the target speed.

In the hydrostatic mode, the engine speed and the gear ratio of CVT 48 are controlled independently by an operator. For example, the engine speed is selected (e.g. with throttle operator 116 or another suitable operator input device) based on a particular use or application of vehicle 10, i.e., for powering vehicle implements with a power take-off, for charging system capacity, etc. The gear ratio of CVT 48 is selected by an operator with a separate input device, such as a pedal lever, or joystick. In one embodiment, the hydrostatic operating mode is selectable only when vehicle 10 is substantially stopped or when vehicle 10 is moving below a threshold vehicle speed (e.g., 5 mph).

CVT 48 is controlled by CVT control logic 35 to operate in either the manual mimic mode or the automatic mode based on an operator's selection of the manual or automatic mode via mode selection device 113. In the automatic mode, CVT control logic 35 actively adjusts CVT 48 across a continuum of available gear ratios based on the detected engine speed, the position of throttle operator 116, and a target engine speed, as described herein. In the manual mimic mode, CVT control logic 35 shifts CVT 48 between a plurality of discrete gear ratios to simulate a traditional manual or automatic transmission. In particular, primary clutch 50 is moved to predetermined fixed positions based on an operator shift input (e.g., input from shifter 55 of FIG. 2), and each position provides a different discrete gear ratio. For example, in a first indicated gear, primary clutch 50 is moved to a first predetermined position providing a first gear ratio. When a second indicated gear is selected with shifter 55, primary clutch 50 is moved to a second predetermined position providing a second gear ratio higher than the first gear ratio.

In the illustrated embodiment, an operator inputs a shift command to controller 36 to initiate the discrete gear shift in the manual mimic mode. In one example, the actuation of shifter 55 (FIG. 2) signals to controller 36 to shift the discrete gear ratio of CVT 48. Exemplary shifters 55 include paddles, switches, knobs, shift lever 29 (FIG. 1), or other suitable shift devices. In one embodiment, an upshifter 55 and a downshifter 55 are mounted adjacent steering wheel 28 (FIG. 1) such that an operator may shift gears in manual mimic mode without having to completely remove their hand from the steering wheel 28. In one embodiment, primary clutch 50 is moved to five or six predetermined positions across the displacement range of primary clutch 50 to provide five or six discrete gear ratios of CVT 48, although fewer or additional gear ratios may be provided. In another embodiment, CVT control logic 35 is operative to shift CVT 48 automatically between each predefined discrete gear ratio.

In the automatic mode of operation, CVT control logic 35 continually calculates a target engine speed during vehicle operation based on the detected throttle operator position. Based on the calculated target engine speed and the current engine speed, CVT control logic 35 proactively shifts CVT 48 to a gear ratio that will cause engine control logic 34 (FIG. 2) to control engine 42 to the calculated target engine speed, as described below. An operator is able to adjust the clutch shift profile of CVT 48, and thus the target engine speed corresponding to throttle input, based on input via input device 111 to adjust the desired performance and/or fuel economy of vehicle 10.

Figure 24:
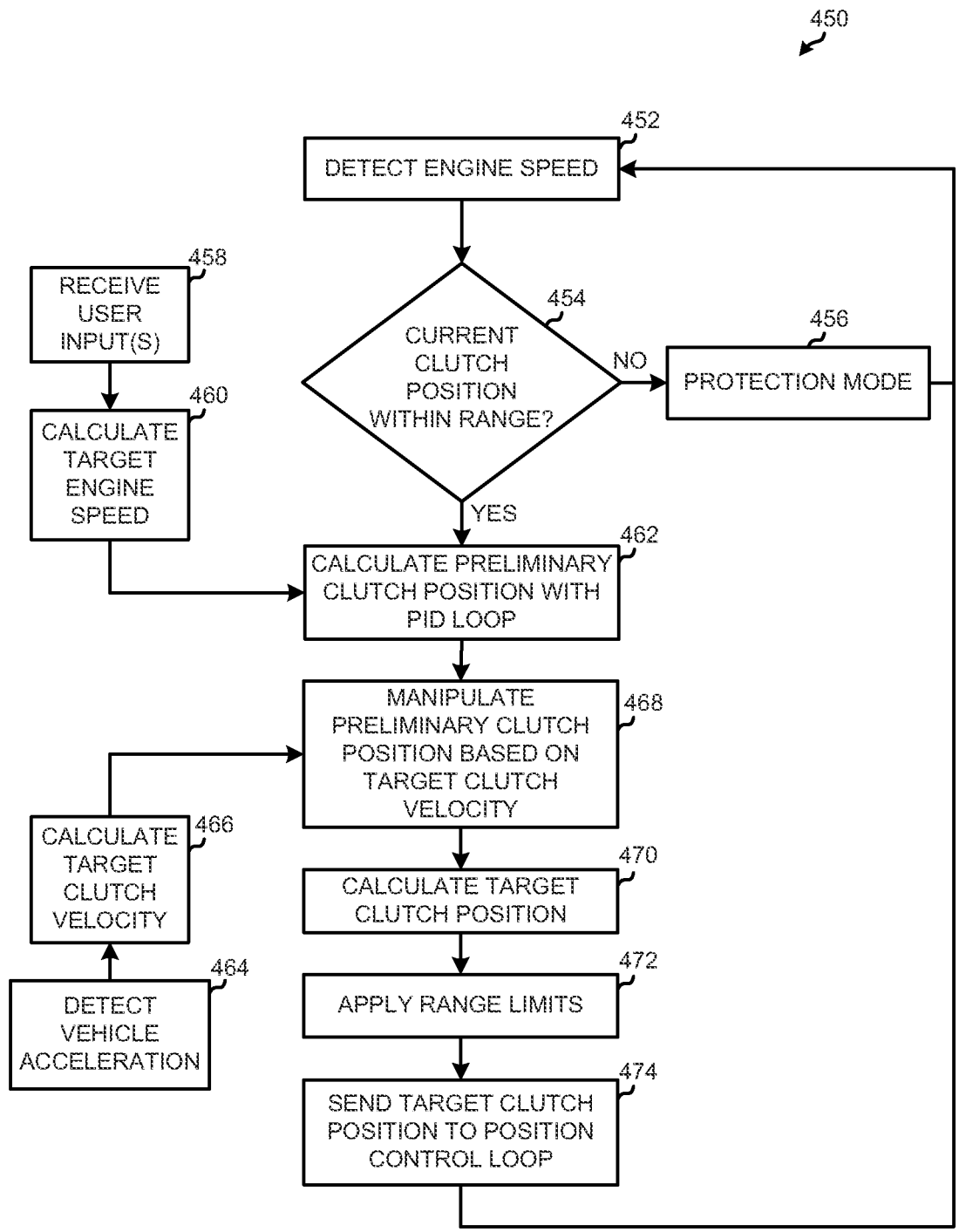
FIG. 24 is a block diagram illustrating an exemplary method for calculating a target position of the primary clutch of FIG. 6.

Referring to FIG. 24, a flow diagram 450 of an exemplary method performed by CVT control logic 35 is illustrated for calculating a target position of primary clutch 50 in the automatic mode of operation. Reference is made to CVT 48 of FIGS. 2-19 throughout the description of FIG. 24. Flow diagram 450 illustrates a control loop that is executed by CVT control logic 35 to continually adjust the target clutch position (i.e., the target gear ratio of CVT 48) during vehicle operation based on the detected engine speed, the throttle demand, and the target engine speed, as described herein. Based on the target clutch position, CVT control logic 35 is further operative to provide a control signal delivered to actuator assembly 80 to move primary clutch 50 to the target clutch position, as described herein with respect to flow diagram 500 of FIG. 29.

At block 452, CVT control logic 35 detects the current engine speed based on feedback from an engine speed sensor 59. At block 454, CVT control logic 35 determines if the position of primary clutch 50 is currently within operating range limits based on position sensor 114 (FIG. 5). In particular, if moveable sheave 102 is positioned (or is commanded by actuator assembly 80 to be positioned) beyond its predetermined limits of travel along shaft 70, CVT control logic 35 enters a protection mode at block 456 by controlling motor 76 according to the maximum voltage curve illustrated in FIG. 30 and described herein. In one embodiment, the protection mode includes disabling motor 76 and holding sheave 102 at the nearest maximum position within the travel range limits. Upon generating a clutch command signal to move clutch 50 to another position within the range limits, motor 76 is enabled and controlled to move clutch 50 accordingly. As such, the likelihood of damaging clutch components and/or burning out motor 76 is reduced. If the current clutch position is within the travel limits at block 454, CVT control logic 35 proceeds to block 462.

At block 462, CVT control logic 35 calculates a preliminary target clutch position (i.e., position of moveable sheave 102 along shaft 70) based on the current engine speed detected at block 452, a target engine speed calculated at block 460, and the current clutch position. In the illustrated embodiment, the target engine speed is calculated at block 460 based on a target engine speed map 480, illustrated in FIG. 27 and described below. CVT control logic 35 receives user inputs at block 458 and calculates the target engine speed based on the user inputs. In the illustrated embodiment, the user inputs received at block 458 are the throttle operator position (e.g., pedal position) and a clutch control variable (i.e., a calibration factor used in clutch control). The throttle operator position is provided with the position sensor of throttle operator 116 (FIG. 2). The clutch control variable, also referred to herein as the "K factor," is illustratively selected with input device 111 (FIG. 2). In particular, input device 111 is manipulated by an operator to select the value of the clutch control variable provided as input to CVT control logic 35 for modifying the clutch shift profile of CVT 48. For example, based on the clutch control variable, CVT control logic 35 implements operating characteristics of vehicle 10 ranging from an economic operation with maximized fuel economy to a sport operation with maximized vehicle performance.

Referring to FIG. 25, an exemplary input device 111 is illustrated as a rotary knob 111. In one embodiment, rotary knob 111 is coupled to a potentiometer or other suitable sensing device for providing position feedback to CVT control logic 35. The magnitude (e.g., voltage magnitude) of the signal provided with knob 111 to CVT control logic 35 corresponds to the position of knob 111. Each position of knob 111 corresponds to a different value of the clutch control variable used in the calculation of the target engine speed at block 460 of FIG. 24. Rotary knob 111 is illustratively mounted to front dashboard 31 of vehicle 10. A vehicle performance indication 430 and a shift intensity indication 432 are illustratively provided adjacent rotary knob 111. In the automatic mode of operation, the vehicle performance indication 430 illustrates the vehicle performance corresponding to the position of knob 111. In the manual mimic mode of operation, the shift intensity indication 432 illustrates the shift quality or shift intensity selected based on the position of knob 111 (described further herein). Rotary knob 111 includes a pointer or selection tab 434 that points to the desired performance level (automatic mode) or the desired shift intensity (manual mode) provided on respective indications 430, 432. To maximize average fuel economy in the automatic mode, rotary knob 111 is rotated fully counterclockwise such that tab 434 points towards the "economy" mode illustrated on indication 430. To maximize vehicle performance (e.g., acceleration, torque, etc.) in the automatic mode, rotary knob 111 is rotated fully clockwise such that tab 434 points to the "sport" mode illustrated on indication 430. As the position of knob 111 is rotated from the economy indication to the sport indication, the performance of vehicle 10 corresponding to the throttle demand increases while the average fuel economy decreases.

Figure 26:
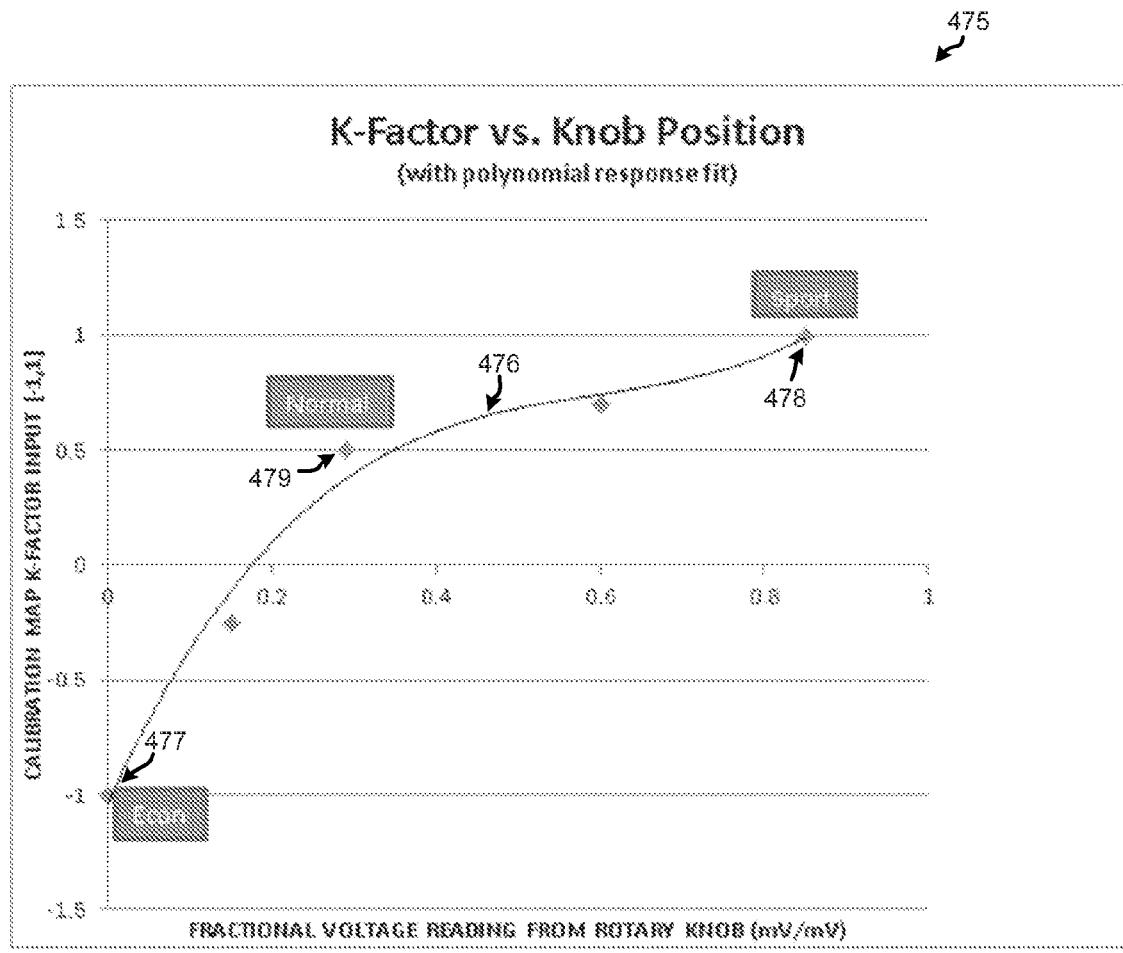
FIG. 26 is an exemplary graph illustrating the clutch control variable as a function of signal output from the input device of FIG. 25.

In the illustrated embodiment, the clutch control variable selected with rotary knob 111 has normalized values ranging from −1.0 to +1.0, and each value corresponds to a desired performance of vehicle 10. Referring to FIG. 26, a graph 475 illustrates a curve 476 representing exemplary values of the clutch control variable (i.e., K-factor values) on the y-axis that correspond to a voltage magnitude or position of rotary knob 111 on the x-axis. Curve 476 is illustratively a polynomial regression curve that is fit to several K-factor values, although other suitable curves may be provided depending on the configuration of knob 111. A K-factor value of −1.0 (point 477) corresponds to the economy mode wherein rotary knob 111 of FIG. 25 is rotated fully counterclockwise. A K-factor value of +1.0 (point 478) corresponds to the sport mode wherein rotary knob 111 of FIG. 25 is rotated fully clockwise. Intermediate K-factor values between −1.0 and +1.0 correspond to different performance levels of vehicle 10 (and thus different rotational positions of knob 111). For example, as the K-factor value increases from −1.0 to +1.0, the performance of vehicle 10 associated with throttle demand increases while the average fuel economy decreases. A K-factor value of 0.5 (point 479) illustratively corresponds to a normal mode of operation wherein the average fuel economy and vehicle performance are both at average or unmodified levels. In the illustrated embodiment, the clutch control variable may be set to any intermediate value continuously through the range between −1.0 and +1.0. Other suitable mappings of the voltage from rotary knob 111, or from another input device 111, to the clutch control variable may be provided.

In another embodiment, shifters 55 (FIG. 2) are used to adjust the value of the clutch control variable in the automatic mode (block 458 of FIG. 24). For example, each actuation of the upshifter 55 or downshifter 55 increments the clutch control variable up or down respectively to adjust the clutch shift profile of CVT 48 incrementally. As such, a discrete number of available clutch shift profiles are selectable with shifters 55 ranging from the peak economy mode to the peak performance mode.

Figure 27:
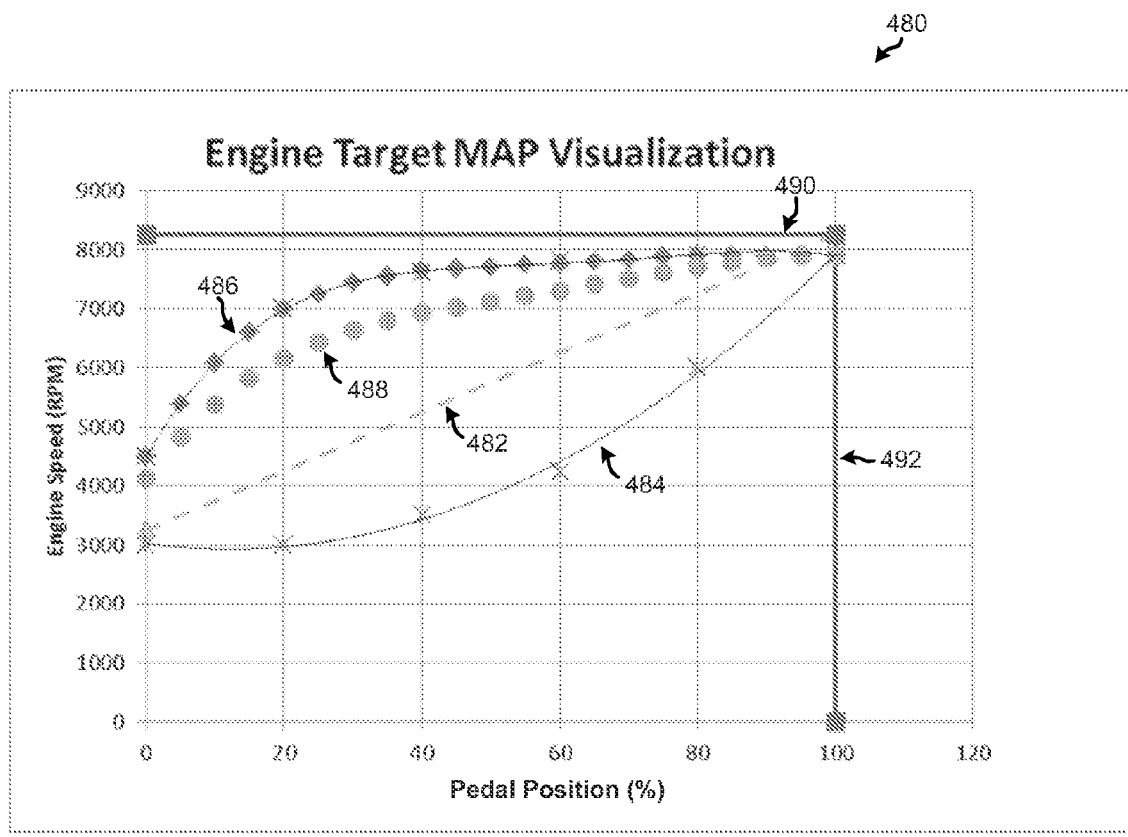
FIG. 27 is a graph illustrating an exemplary target engine speed map based on throttle demand.

As described above, CVT control logic 35 calculates the target engine speed at block 460 (FIG. 24) based on the clutch control variable selected with rotary knob 111 (or with shifters 55) and the throttle demand. Referring to FIG. 27, an exemplary engine target map 480 is shown illustrating target engine speeds (in rpm) corresponding to a particular throttle demand, i.e., a position of throttle operator 116. Depending on the selected value of the clutch control variable, a different target engine speed curve is calculated and/or selected by CVT control logic 35. Based on the selected target engine speed curve, CVT control logic 35 determines at block 460 of FIG. 24 a target engine speed that corresponds to the detected throttle operator position.

The x-axis of FIG. 27 illustrates the entire range of throttle operator positions from 0% (throttle operator 116 fully released) to 100% (throttle operator 116 fully depressed or actuated by the operator). The y-axis of FIG. 27 illustrates the entire range of target engine speeds. Line 490 represents an exemplary maximum engine speed of engine 42 of about 8300 rpm. Line 492 illustrates the maximum throttle operator position of 100%. Curve 482 of FIG. 27 identifies target engine speeds corresponding to the throttle demand when the K factor is equal to zero. Curve 482 illustrates a linear relationship between the throttle demand and engine speed. Curve 484 corresponds to a K factor of −1.0 and identifies the target engine speeds for the maximized economy mode. Curve 486 corresponds to a K factor of +1.0 and identifies the target engine speeds for the maximized sport mode. Another exemplary curve 488 corresponds to a K factor of +0.75 and illustrates target engine speeds for a mode having increased but not maximized performance characteristics. In one embodiment, each curve includes an associated array of points (e.g., 20 points, etc.), and linear interpolation is used to calculate the target engine speed curve from the array of points.

In one embodiment, CVT control logic 35 calculates a target engine speed curve in real-time during vehicle operation upon detecting the selected value of the clutch control variable. In particular, a group of points from at least one target engine speed curve of map 480 is stored in memory 39 of controller 36. For example, an array of 20 points from linear curve 482 is stored in memory 39. Based on the K-factor value selected with input device 111, an offset or distance from each point in the stored array is calculated and stored in an offset array having the same size as the point array for curve 482. Each offset may be proportional to the K-factor value. Based on the offset array and the point array for curve 482, CVT control logic 35 determines a new array of points that define a new target engine speed curve. In one embodiment, linear interpolation is used to calculate the target engine speed curve from the determined new set of points. In another embodiment, multiple target engine speed curves may be stored in a lookup table in memory 39, and CVT control logic 35 may retrieve and utilize a target engine speed curve that corresponds to the selected value of the clutch control variable. Only four curves are shown in map 480 of FIG. 27 for illustrative purposes. However, CVT control logic 35 is operative to calculate a different curve for each K-factor value. In an embodiment wherein the magnitude of the signal from input device 111 is continuously adjustable, the range of engine speed curves that may be calculated is therefore also continuous.

Referring again to the method of FIG. 24, CVT control logic 35 calculates the target engine speed at block 460 by calculating the curve based on the K-factor and determining the target engine speed corresponding to the throttle demand. With the target engine speed calculated, CVT control logic 35 then determines the target position of primary clutch 50 of CVT 48 that would allow vehicle 10 to achieve that target engine speed, i.e., the clutch position that would cause engine control logic 34 to control engine 42 from the current engine speed to the target engine speed. As such, CVT control logic 35 calculates a preliminary target clutch position at block 462 based on the detected engine speed (block 452), the determined target engine speed, and the current clutch position. In the illustrated embodiment, CVT control logic 35 calculates the preliminary clutch position at block 462 using a PID (proportional-integral-derivative) control loop with the current engine speed, the target engine speed, and the current clutch position as the input variables. In an alternative embodiment, vehicle speed is further considered by CVT control logic 35 in the calculation of the target clutch position.

At block 468, CVT control logic 35 manipulates the preliminary target clutch position at block 470 based on the current vehicle acceleration detected at block 464. In one embodiment, CVT control logic 35 detects the current acceleration based on speed feedback from a ground speed sensor 59 (FIG. 2). CVT control logic 35 calculates a target clutch velocity at block 466 based on the detected vehicle acceleration and modifies the preliminary target clutch position at block 468 based on the target clutch velocity. The target clutch velocity is the rate at which clutch 50 (i.e., moveable sheave 102) is to be moved to its new position, i.e., the rate of change of the gear ratio of CVT 48. By modifying the target clutch position based on the vehicle acceleration, CVT control logic 35 implements feedforward control of clutch 50 by predicting where the clutch 50 needs to be moved to in order for the engine control logic 34 to react and control engine 42 to the target engine speed identified at block 460. As such, the gear ratio of CVT 48 is proactively shifted based on the vehicle acceleration such that engine 42 achieves the target engine speed. For example, if the target engine speed is higher than the current engine speed of vehicle 10, and vehicle 10 is accelerating rapidly, CVT control logic 35 calculates a clutch velocity configured to shift CVT 48 quickly to reduce the likelihood that engine control logic 34 overshoots the target engine speed. The target clutch velocity determined at block 466 thus serves as a manipulation variable to modify the preliminary target clutch position calculated at block 462.

Figure 28:
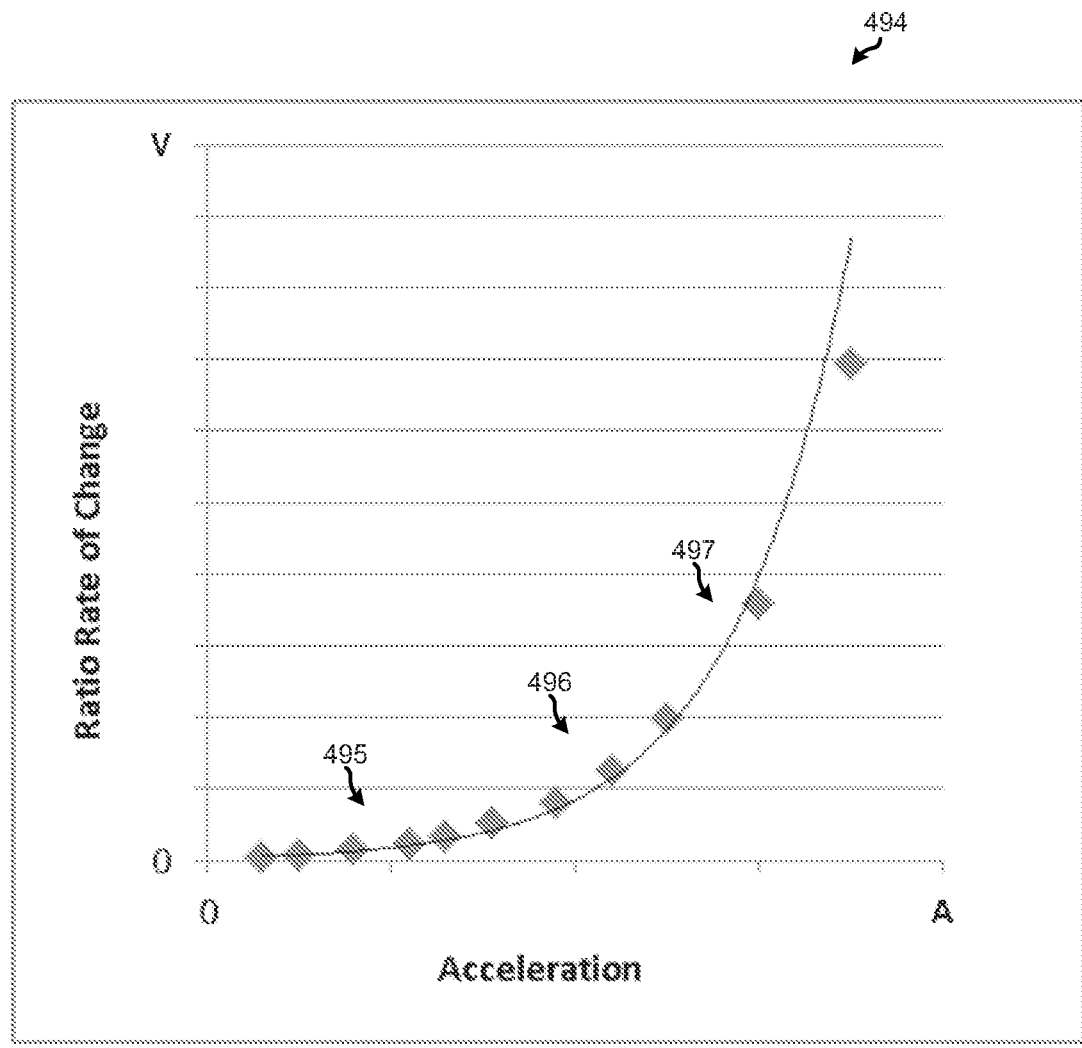
FIG. 28 is a graph illustrating an exemplary target clutch velocity as a function of vehicle acceleration for calculating the target clutch position.

In one embodiment, the target velocity of clutch 50 is determined based on a lookup table or other predetermined mapping. FIG. 28 illustrates an exemplary graph 494 that maps the vehicle acceleration values (x-axis) to corresponding clutch velocities (y-axis). In the exemplary mapping of FIG. 28, the target clutch velocity increases gradually around region 495 as the vehicle acceleration increases. As the vehicle acceleration continues to increase, the target clutch velocity increases more rapidly around region 496 before increasing exponentially around region 497. As such, the higher the vehicle acceleration, the more quickly the target clutch velocity increases. The mapping of FIG. 28 illustrates an exemplary clutch control strategy, and other suitable target clutch velocities may be selected for a given vehicle acceleration.

Upon calculating the target clutch position at block 472, CVT control logic 35 applies travel range limits of CVT 48 at block 474. In particular, if the target clutch position is outside of predetermined limits of travel along shaft 70, CVT control logic 35 resets the target clutch position to the nearest maximum position before proceeding to block 474. If the target clutch position is within the travel limits at block 472, CVT control logic 35 proceeds to block 474. At block 474, CVT control logic 35 sends the calculated target clutch position to the position control algorithm described in FIG. 29.

Figure 29:
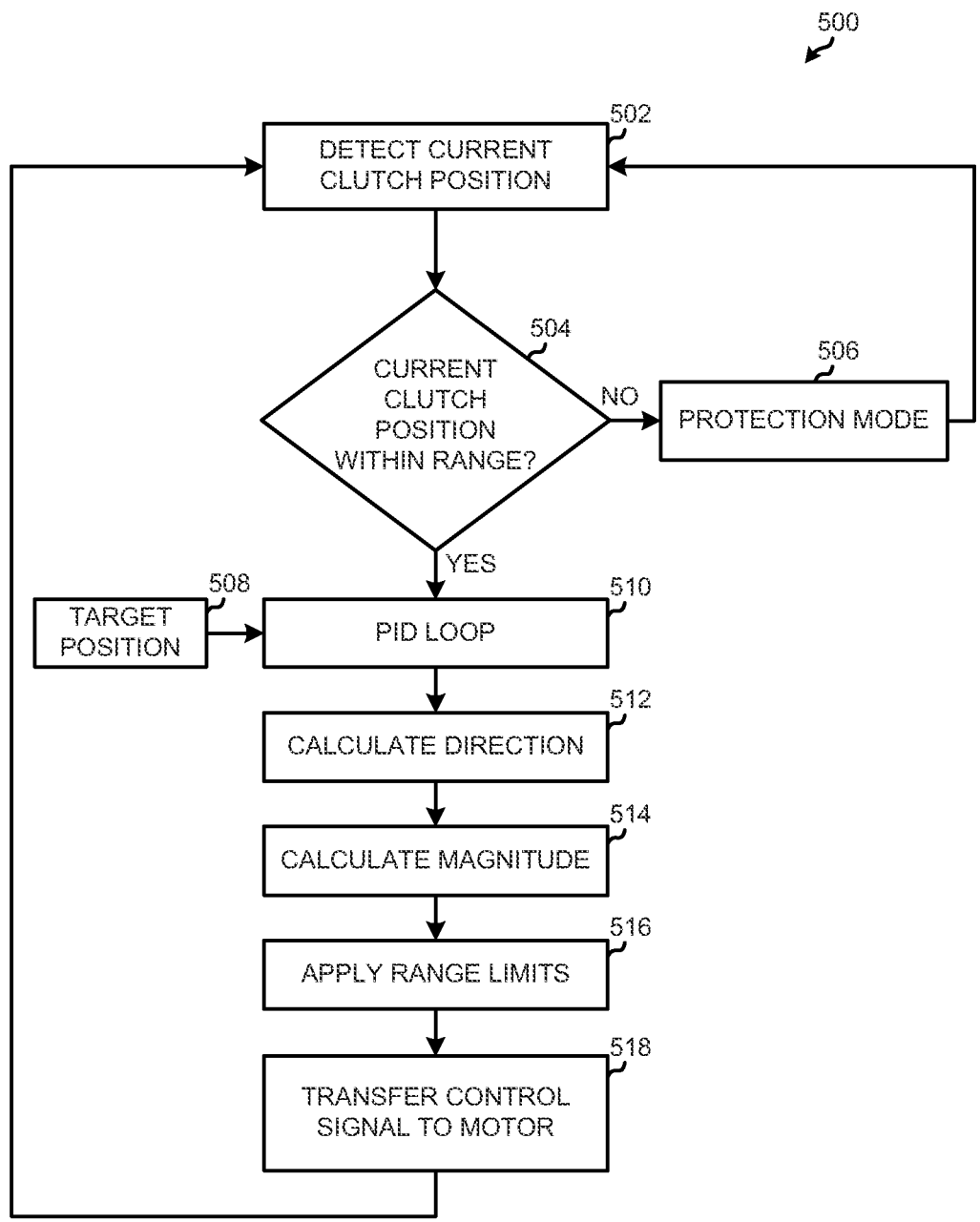
FIG. 29 is a block diagram illustrating an exemplary method for calculating a control signal provided to the actuator assembly of FIG. 7 for controlling the position of the primary clutch of FIG. 6.

Referring to FIG. 29, a flow diagram 500 of an exemplary method performed by CVT control logic 35 is illustrated for generating a control signal for adjusting CVT 48 to the target clutch position. The control signal is provided to actuator assembly 80 during vehicle operation to control CVT 48 based on the calculated target clutch position. At block 502, CVT control logic 35 detects the current position of primary clutch 50 based on position sensor 114 (FIG. 5). Blocks 504 and 506 are identical to blocks 454 and 456 of FIG. 24. In particular, if the current or commanded clutch position is out of range, CVT control logic 35 enters a protection mode, as described above. At block 510, CVT control logic 35 enters a PID loop with the detected current clutch position and the target clutch position (block 508) as input variables. In the automatic mode, the target clutch position of block 508 is calculated with the method of FIG. 24, as described above. In the manual mimic mode, the target clutch position is determined based on the discrete gear ratio selected by the operator via shifters 55 (FIG. 2). The output of the PID loop of block 510 is the calculated direction (block 512) and magnitude (514) of clutch movement. In particular, at block 512 the rotational direction of motor 76 and thus the axial direction of moveable sheave 102 are determined. At block 514, the magnitude (e.g., voltage or current magnitude) of the clutch control signal to be provided to motor 76 is determined based on the comparison of the current clutch position and the target clutch position. At block 516, CVT control logic 35 applies the travel range limits of CVT 48 to the target clutch position, as described herein with respect to block 472 of FIG. 24. At block 518, CVT control logic 35 transfers the clutch control signal to motor 76 (or to a motor driver of motor 76) for controlling the gear ratio of CVT 48. In one embodiment, the clutch control signal defines a percentage of pulse-width modulation to be applied to motor 76 as well as the direction of rotation of motor 76.

Figure 30:
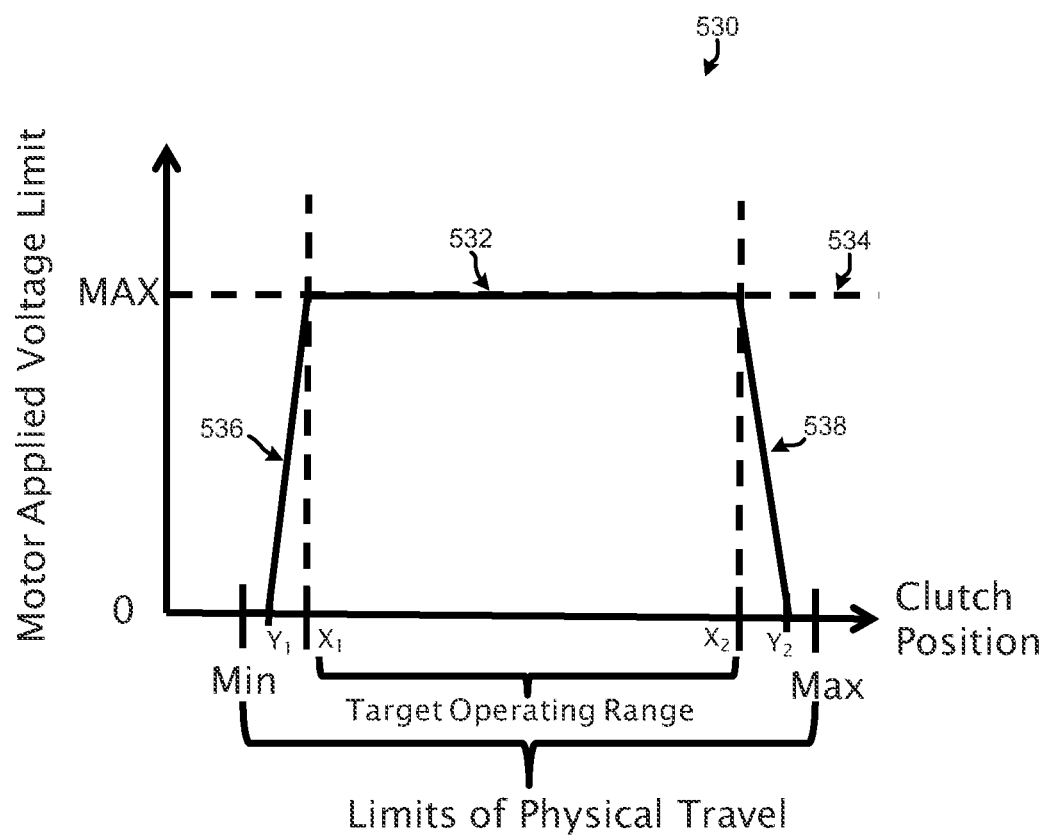
FIG. 30 is a graph illustrating an exemplary applied voltage limit for the motor of FIG. 2 based on the position of the primary clutch.

In one embodiment, the travel range limits implemented at block 472 of FIG. 24 and block 516 of FIG. 29 are based on the maximum applied voltage limits illustrated in graph 530 of FIG. 30. Graph 530 illustrates an exemplary maximum applied voltage (y-axis) as a function of the position of clutch 50 (x-axis). Moveable sheave 102 of primary clutch 50 has a minimum position limit and a maximum position limit defined by the physical limits of travel, i.e., hard stops, of moveable sheave 102. The minimum position limit corresponds to a fully closed clutch 50 wherein moveable sheave 102 is positioned against fixed sheave 100. The maximum position limit corresponds to a fully open clutch wherein screw portion 188 of inner screw assembly 122 is fully received within screw portion 127 of outer screw assembly 120 (FIG. 14). Clutch 50 further includes a target operating range illustratively defined between positions $X_1$ and $X_2$ of graph 530 that is a smaller travel range than the range defined by the physical limits of travel. In the target operating range, the voltage applied to motor 76 is limited to a maximum limit 534, as illustrated with line 532. Between end position $X_1$ of the target operating range and the minimum physical limit, the maximum applied voltage is ramped down along line 536 from limit 534 to a zero voltage when clutch 50 reaches position $Y_1$. Similarly, between end position $X_2$ of the target operating range and the maximum physical limit, the maximum applied voltage is ramped down along line 538 from limit 534 to a zero voltage when clutch 50 reaches position $Y_2$. Voltage is removed from motor 76 at clutch positions $Y_1$ and $Y_2$ before moveable sheave 102 can reach the respective minimum and maximum travel limits. As such, when the position of clutch 50 is outside the target operating range, the applied voltage is gradually reduced, illustratively linearly, and is removed entirely from motor 76 prior to clutch 50 reaching the minimum/maximum positions to reduce the likelihood of driving moveable sheave 102 into the physical hard stops of CVT 48.

In the manual mimic mode of operation of CVT 48, controller 36 (FIG. 2) is operative to interrupt engine torque during the transition between discrete gear ratios. Torque interruption includes reducing or removing engine torque temporarily during the gear shift. Such torque interruption serves to simulate the inertia shift or shift feel associated with shifting gears in a traditional sequential manual or automatic transmission. In one embodiment, the torque interruption further serves to improve the shift speed provided by motor 76 by reducing the axial loads on primary clutch 50 due to engine torque during the shift transient. In the illustrated embodiment, the torque interruption is implemented during an upshift, although torque interruption may also be implemented during downshifts. In one embodiment, CVT control logic 35 detects the shift request from shifter 55 and sends a message or command to engine control logic 34 requesting the torque interruption. In the exemplary embodiment, torque reduction is implemented by engine control logic 34 by temporarily inhibiting or suppressing engine ignition during the transition between discrete gear ratios (i.e., inhibiting or cutting spark from one or more spark plugs of engine 42). Other suitable methods for interrupting engine torque during shift transients may be implemented, such as, for example, by retarding ignition timing, reducing the throttle or air intake, reducing or cutting fuel injection, etc. In one embodiment, vehicle or driveline brakes may be temporarily applied during shift transients to reduce vehicle torque.

Figure 31:
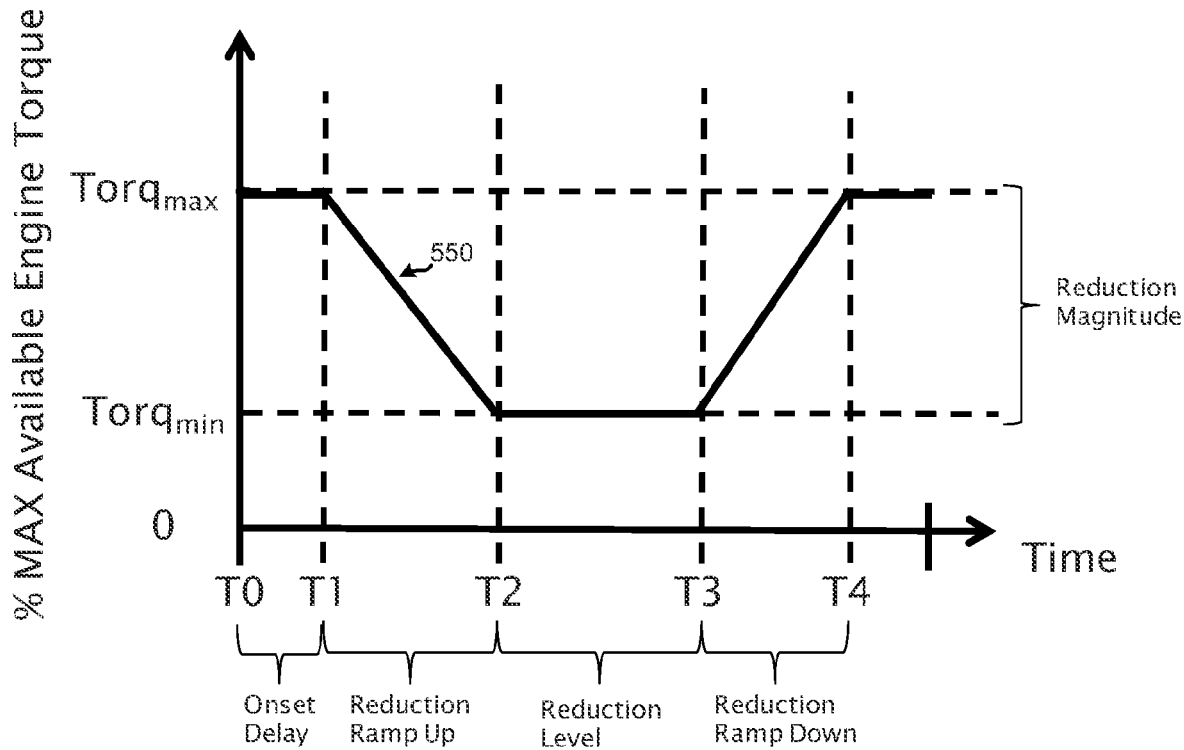
FIG. 31 is a graph illustrating an exemplary maximum available engine torque as a function of time for interrupting engine torque during a gearshift in the manual operating mode of the CVT of FIG. 2.

Referring to FIG. 31, an exemplary torque interruption profile 550 calculated by CVT control logic 35 is illustrated with the percentage of the maximum available engine torque on the y-axis and time on the x-axis. At time $T_0$, the torque interruption request is received by engine control logic 34 from CVT control logic 35 upon an operator requesting a gear shift with one of shifters 55. An onset delay between times $T_0$ and $T_1$ serves to delay the onset of the torque reduction. At time $T_1$, implementation of the torque reduction begins. In one embodiment, voltage is applied to motor 76 at about time $T_1$ such that primary clutch 50 begins moving to the new discrete position at about time $T_1$. Between times $T_1$ and $T_2$, the torque reduction is ramped up to reduce the available engine torque from $Torq_{max}$ to $Torq_{min}$. In the illustrated embodiment, $Torq_{max}$ is equal to the maximum available torque (i.e., 100% of available engine torque). In the illustrated embodiment, $Torq_{min}$ is a fraction of the maximum available torque, such as, for example, 30% or 40% of the maximum available torque. Any suitable $Torq_{min}$ may be provided that is less than $Torq_{max}$. Between times $T_2$ and $T_3$, full torque reduction is implemented for a predetermined duration, i.e., the available torque is held at $Torq_{min}$. At time $T_3$, the full torque reduction is ramped back down to increase the available torque from $Torq_{min}$ to $Torq_{max}$ between times $T_3$ and $T_4$. At time $T_4$, the torque reduction ends, and engine control logic 34 allows full available engine torque. In the illustrated embodiment, the available engine torque is linearly decreased between times $T_1$ and $T2$ and linearly increased between times $T_3$ and $T_4$, although other reduction profiles may be implemented. In one embodiment, the primary clutch 50 completes movement to the new discrete gear position at about time $T_4$ or between times $T_3$ and $T_4$.

The torque interruption request provided by CVT control logic 35 identifies several parameters that define torque interruption profile 550. In the illustrated embodiment, the onset delay (time from $T_0$ and $T_1$), the magnitude (i.e., difference between $Torq_{min}$ and $Torq_{max}$), the duration (time from $T_1$ and $T_4$), and the ramp rates (time from $T_1$ to $T_2$ and from $T_3$ to $T_4$) of the torque reduction are all included in the torque interruption request to define torque interruption profile 550. The intensity of each upshift is dependent on the values of these parameters.

In the illustrated embodiment, torque interruption profile 550 of FIG. 31 is modified by an operator with input device 111 to adjust the shift intensity. In particular, referring again to FIG. 25, the rotational position of knob 111 in the manual mimic mode corresponds to a desired shift intensity or quality. The shift intensity is continuously adjustable between "soft" intensity with minimized torque interruption (tab 434 fully counterclockwise) to "firm" shift intensity with maximized torque interruption (tab 434 full clockwise), as illustrated with indication 432 of FIG. 25. In the illustrated embodiment, the magnitude and/or the duration of the torque interruption are modified based on the position of knob 111. In some embodiments, the onset delay is also adjustable with input device 111. Any other suitable parameters of the torque reduction profile 550 may be adjusted with input device 111 and/or with other operator input. As such, CVT control logic 35 is operative to generate the torque interruption request based on the position of knob 111.

In one embodiment, the torque interruption profile 550 is further dependent on the current discrete gear ratio and the discrete gear ratio requested with the shifter 55. For example, a shift from the first indicated gear to the second indicated gear in manual mimic mode may be controlled by controller 36 to have a greater shift intensity than a shift from the fourth indicated gear to the fifth indicated gear. Other suitable adjustments of the torque interruption profile may be implemented based on the gear transition.

In the exemplary embodiment, five indicated gears (first through fifth) are provided in the manual mode, i.e., an operator may select with shifters 55 between five indicated gears. Fewer or additional indicated gears may be provided. In the illustrated embodiment, the indicated first gear has a gear ratio that is variable across a low range, and the other indicated gears (second through fifth) have fixed discrete gear ratios. In particular, in the first indicated gear the actual gear ratio of CVT 48 is continuously adjusted between a minimum low gear ratio and a higher gear ratio. As such, when the indicated first gear is selected by an operator in the manual mode, CVT control logic 35 continuously varies the gear ratio across a predetermined low range (similar to variable clutch operation in the automatic mode). Once an operator selects the indicated second gear with shifter 55, CVT control logic 35 shifts CVT 48 to a discrete gear ratio that is higher than the gear ratios provided in the low range of the indicated first gear. In one embodiment, such variable clutch operation in the indicated first gear reduces the speed at which an operator must shift between the first and second indicated gears while still providing the low-end power available in low gear ratios.

Figure 32:
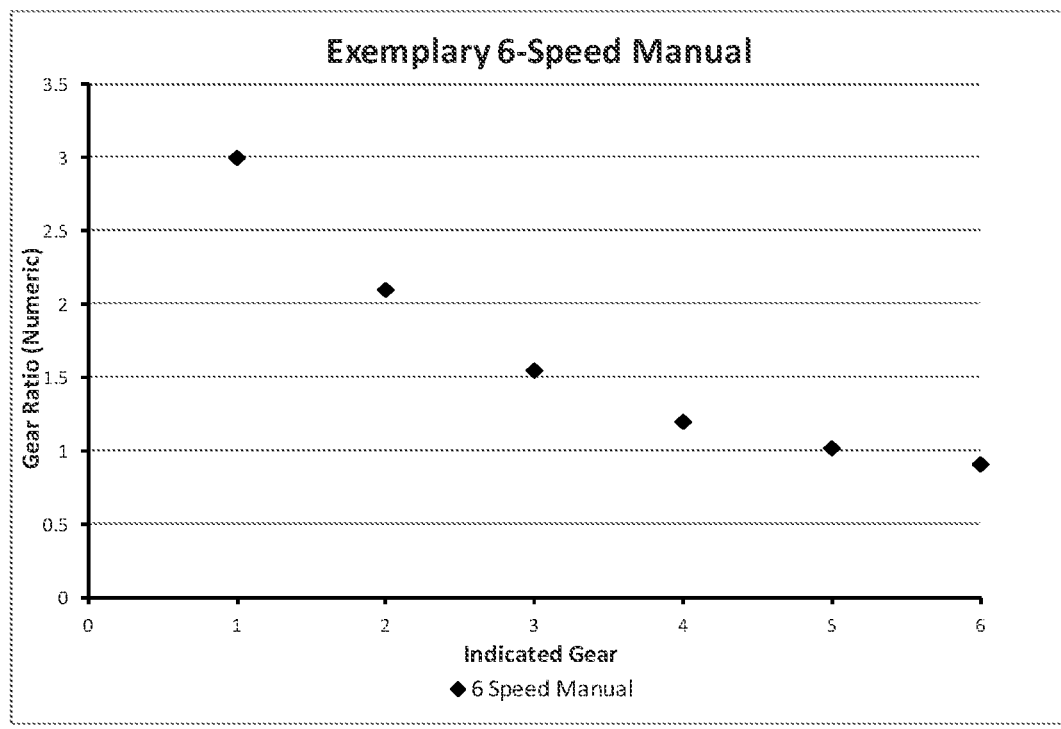
FIG. 32 is a graph illustrating an exemplary shifting scheme for a standard manual transmission.
Figure 33:
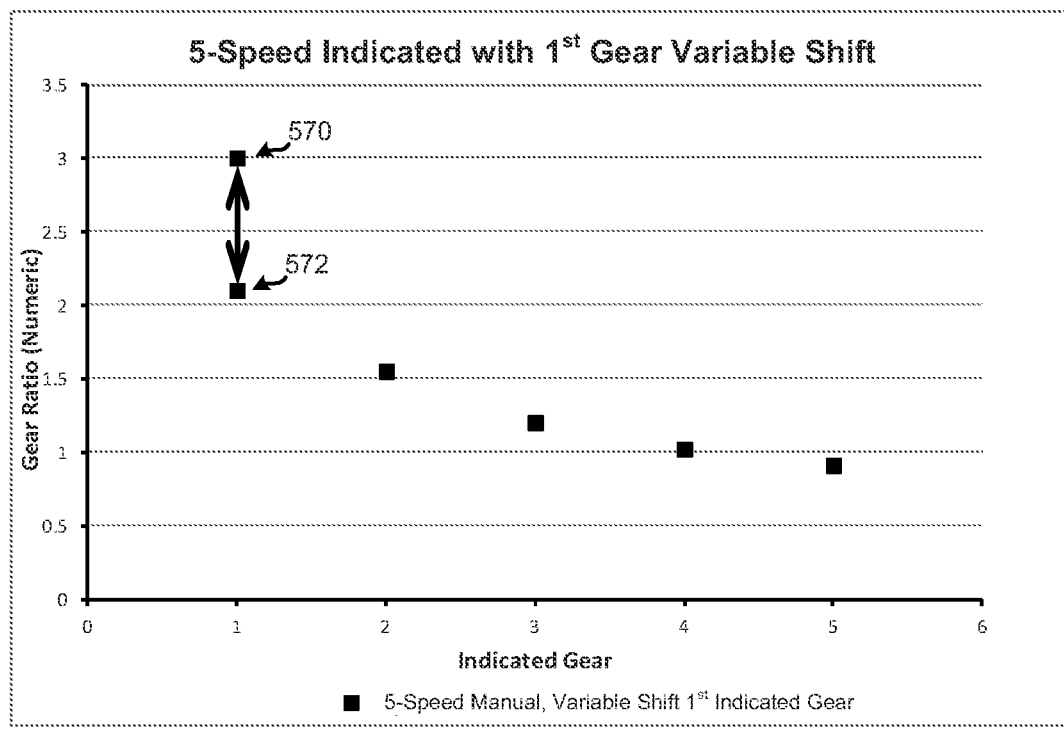
FIG. 33 is a graph illustrating an exemplary shifting scheme for the CVT of FIG. 2 operating in the manual mode.

For example, FIG. 32 illustrates an exemplary shifting scheme for a standard six-speed manual sequential transmission. Each indicated gear on the x-axis (i.e., selected by an operator with a shift device) corresponds to a single fixed, physical gear ratio on the y-axis. Indicated sixth gear of FIG. 32 corresponds to vehicle overdrive, for example. FIG. 33 illustrates an exemplary shifting scheme provided with the manual mimic mode of CVT 48. When the indicated first gear is selected (with shifters 55), CVT control logic 35 controls the gear ratio to vary between a minimum low gear ratio 570 (e.g., 3.0 ratio) and a maximum low gear ratio 572 (e.g., 2.1 ratio). As such, the control of CVT 48 in the indicated first gear of manual mode is similar to the control in automatic mode over the low clutch travel range. Each of indicated gears two through five of the exemplary manual mode of FIG. 33 has a corresponding single fixed gear ratio. In the illustrated embodiment, gear ratios 570, 572 of the indicated first gear correspond to the first and second gear ratios of the exemplary standard shifting scheme of FIG. 32.

CVT control logic 35 further includes shift protection logic operative to monitor vehicle operating characteristics before allowing an upshift or a downshift in the manual operating mode. In particular, CVT control logic 35 determines whether it will execute a shift request based on the monitored engine speed. For each indicated gear in the manual mimic mode, a low engine speed threshold and a high engine speed threshold are stored in memory 39. For a downshift request, CVT control logic 35 does not implement the downshift if the detected engine speed is above the high engine speed threshold that is associated with the current indicated gear. For an upshift request, CVT control logic 35 does not implement the upshift if the detected engine speed is below the low engine speed threshold that is associated with the current indicated gear. In one embodiment, the high engine speed threshold for each indicated gear is set to reduce the likelihood that a downshift causes the engine 42 to overspeed or redline. In one embodiment, the low engine speed threshold for each indicated gear is set to reduce the likelihood that an upshift causes the engine 42 to fall below a minimum ideal operating speed while the vehicle is moving. As such, the likelihood that the starting clutch 170 disengages or slips relative to primary clutch 50 during vehicle operation is reduced, for example. Further, the low engine speed threshold further ensures that CVT 48 is at a minimum clutch ratio (i.e., the indicated first gear) when vehicle 10 comes to a stop. In the illustrated embodiment, CVT control logic 35 does not consider vehicle speed when determining whether a shift request is allowed during normal vehicle operation. Because vehicle speed is not considered, the protection control is implemented with the same low and high engine speed thresholds regardless of the final drive ratio (e.g., low or high gear) provided with sub-transmission 56 (FIG. 2). In one embodiment, upon a detected failure of the engine speed signal, the vehicle speed is considered by control logic 35 to determine whether to execute the shift request.

In one embodiment, CVT control logic 35 forces a downshift in the manual mimic mode when the detected engine speed drops below a predetermined threshold speed. Each indicated gear other than first gear has an associated predetermined threshold speed that dictates when a downshift will be automatically executed by CVT control logic 35. For each indicated gear, the predetermined threshold speed for forcing a downshift is lower than the low threshold speed for preventing execution of an upshift request described above.

Figure 34:
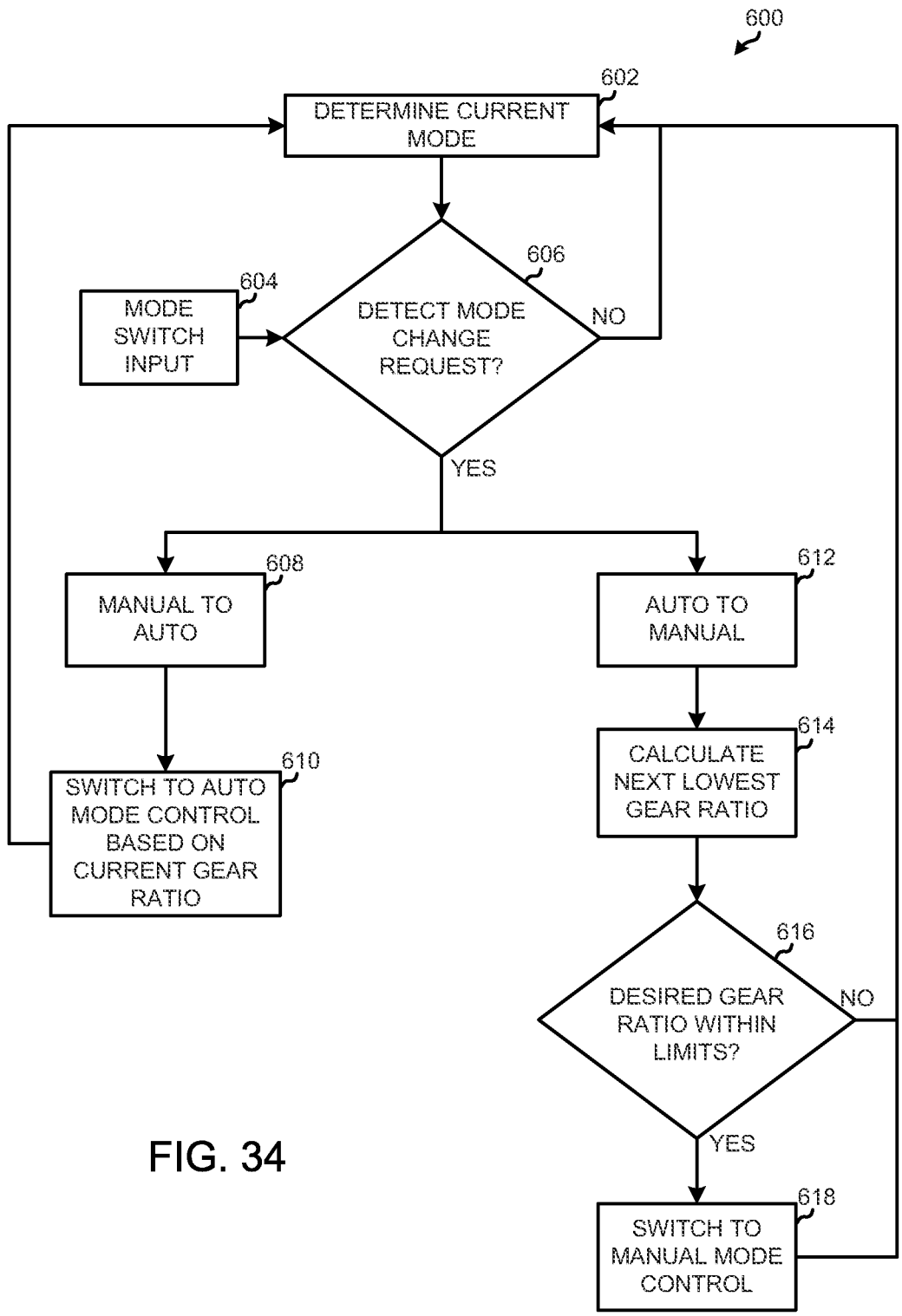
FIG. 34 is a block diagram illustrating an exemplary method for transitioning between automatic and manual operating modes of the CVT of FIG. 2 during vehicle operation.

CVT control logic 35 is operative to allow an operator to switch between automatic and manual modes on the fly during movement of vehicle 10. An operator may request a change between the automatic and manual modes with mode selection device 113 at any time during vehicle operation. CVT control logic 35 monitors operating parameters of vehicle 10 to determine whether the mode change request is safe for execution. Referring to FIG. 34, a flow diagram 600 of an exemplary mode change operation of CVT control logic 35 is illustrated. At block 602, CVT control logic 35 determines the current mode of operation (automatic or manual). At block 606, CVT control logic 35 detects a mode change request from mode selection device 113 (block 604). Upon detection of the mode change request, CVT control logic 35 implements one of two mode change strategies—manual to automatic or automatic to manual. For a manual to automatic mode change request (block 608), CVT control logic 35 determines a target clutch position based on the throttle demand, the current engine speed, and the target engine speed, as described herein with respect to FIG. 24. CVT control logic 35 then compares the target clutch position to the current fixed clutch position of the manual mode, and calculates the transition from the current fixed clutch position to the target clutch position. CVT control logic 35 then switches from the manual mode to the automatic mode at block 610 and implements the transition.

For an automatic to manual mode change request (block 612), CVT control logic 35 determines the next lowest discrete gear ratio of the manual mode at block 614 as compared with the current clutch position. The clutch position corresponding to the next lowest discrete gear ratio is pre-selected and loaded into the gear state before the mode transition occurs. At block 616, CVT control logic 35 determines if the selected discrete gear ratio is within predetermined limits based on the engine speed. In particular, CVT control logic 35 calculates the distance between the current clutch position and the desired clutch position corresponding to the discrete gear selected at block 614. CVT control logic 35 compares this distance to the total distance between the desired clutch position (of the selected discrete gear) and the clutch position of the next highest discrete gear above the selected lower discrete gear. A high engine speed threshold is calculated based on these parameters as follows:

$$EngSpd_{Threshold} = \frac{ClutchPos_{NextDiscrete} - ClutchPos_{Current}}{ClutchPos_{NextDiscrete} - ClutchPos_{Selected}} * 2500 + 6000 \quad (1)$$

wherein $EngSpd_{Threshold}$ is the engine speed threshold (in rpm), $ClutchPos_{current}$ is the current clutch position, $ClutchPos_{NextDiscrete}$ is the clutch position of the next highest discrete gear above the lower discrete gear selected at block 614, and $ClutchPos_{Selected}$ is the clutch position of the discrete gear selected at block 614. In the exemplary equation (1), if the current clutch position is far away from the position of the new target position ($ClutchPos_{Selected}$), the engine speed threshold is close to 6000 rpm. If the current clutch position is near the new target position ($ClutchPos_{Selected}$), the engine speed threshold approaches 8500 rpm. Other suitable engine speed thresholds may be provided.

At block 616, if the current engine speed is less than or equal to EngSpdThreshold, then the mode change is executed. If the current engine speed is greater than $EngSpd_{Threshold}$ at block 616, then the mode change is inhibited until the engine speed drops below the threshold. As such, CVT control logic 35 shifts down to the next lowest discrete gear ratio when transitioning from automatic to manual modes. If at the time of the mode request the gear ratio of CVT 48 in the automatic mode is lower than the lowest discrete gear ratio in manual mode, CVT control logic 35 upshifts CVT 48 to the indicated first gear of the manual mode.

CVT control logic 35 is further operative to monitor for slip of starting clutch 170 (FIG. 18) relative to primary clutch 50. CVT control logic 35 compares the detected engine speed to the rotational speed of primary clutch 50 during operation of CVT 48. CVT control logic 35 determines that starting clutch 170 is slipping relative to primary clutch 50 based on the primary clutch speed deviating from the detected engine speed. Upon the difference in engine speed and primary clutch speed exceeding a predetermined threshold, CVT control logic 35 issues a warning (visual and/or audible) to the operator that the starting clutch 170 needs inspection and/or servicing. The warning may be provided on display 53 of FIG. 2, for example.

CVT control logic 35 is further operative to monitor for wear or deterioration of CVT belt 54 (FIG. 6). Based on the position of primary clutch 50 provided with position sensor 114, CVT control logic 35 determines an expected gear ratio of CVT 48. CVT control logic 35 measures the rotational speeds of primary and secondary clutches 50, 52 to determine the actual gear ratio of CVT 48. If the actual gear ratio deviates from the expected gear ratio by more than a threshold amount, CVT control logic 35 determines that belt 54 may be worn or faulty and may be past its useful life. Accordingly, CVT control logic 35 issues a warning (e.g., via display 53) to the operator that the belt 54 needs inspection and/or servicing.

In one embodiment, primary clutch 50 is adjusted in the automatic mode based on engine speed according to a brake specific fuel consumption map stored at memory 39 of controller 36. In particular, controller 36 is operative to set engine speed operating points based on the brake specific fuel consumption map to improve or maximize fuel economy throughout the operating range of engine 42. The engine speed operating points are selected based on minimum specific fuel consumption as a function of increasing power levels.

In one embodiment, other operating characteristics of vehicle 10 may be adjusted by controller 36 based on the K-factor provided with input device 111. In one exemplary embodiment, the stiffness of the vehicle suspension is adjusted based on the mode selected and the vehicle performance selected. In one embodiment, a stiffer suspension improves vehicle handling while diminishing the smoothness of the ride. For example, in the manual mode, the stiffness of the suspension of vehicle 10 is increased to improve vehicle handling. In the automatic mode, the stiffness of the suspension of vehicle 10 is increased proportionally as rotary knob 111 (FIG. 25) is turned clockwise towards the improved sport performance. Other suitable operating characteristics of vehicle 10 may be adjusted based on the clutch profile selected with input device 111, such as, for example, power steering control, the enabled/disabled status of anti-lock brakes, the enabled/disabled status of traction control, the enabled/disabled status of rear differential lock, and the intrusion level of vehicle stability control.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of controlling a continuously variable transmission of a vehicle, the vehicle including an engine operative to drive the continuously variable transmission, the method including:
controlling, by transmission control logic, a first clutch of the continuously variable transmission of the vehicle to an initial fixed position in a manual mode of operation, the continuously variable transmission including the first clutch, a second clutch, and a belt coupled to the first and second clutches, the first clutch being adjustable to modulate a gear ratio of the continuously variable transmission, the first clutch of the continuously variable transmission in the manual mode of operation being adjustable between a plurality of discrete fixed positions based on shift requests initiated with a shift request device;
receiving a shift request identifying a target fixed position of the first clutch of the continuously variable transmission;
shifting the continuously variable transmission from the initial fixed position to the target fixed position; and
initiating a torque reduction of the engine during the shifting to reduce a torque generated by the engine, wherein at least one of a magnitude and a duration of the torque reduction is adjustable based on an operator input device.

2. The method of claim 1, further including adjusting the at least one of the magnitude and the duration of the torque reduction based on an adjustment request initiated with the operator input device.

3. The method of claim 1, wherein the initiating the torque reduction of the engine includes generating a torque reduction request that identifies the at least one of the magnitude and the duration of the torque reduction.

4. The method of claim 3, wherein the transmission control logic generates the torque reduction request and provides the torque reduction request to engine control logic, the engine control logic being operative to adjust control of the engine based on the torque reduction request.

5. The method of claim 1, wherein the torque reduction includes at least one of suppressing engine ignition and retarding engine ignition timing during a transition of the first clutch of the continuously variable transmission from the initial fixed position to the target fixed position.

6. The method of claim 1, wherein the torque reduction includes reducing an opening of a throttle valve of the engine during a transition of the first clutch of the continuously variable transmission from the initial fixed position to the target fixed position.

7. The method of claim 1, wherein an onset delay of the torque reduction is adjustable based on the operator input device, the onset delay including a delay between the receipt of the shift request and the initiation of the torque reduction of the engine.

8. The method of claim 1, wherein the at least one of the magnitude and the duration of the torque reduction is varied based on a selected gear ratio of the continuously variable transmission.

9. A vehicle including:
a chassis;
a ground engaging mechanism configured to support the chassis;
an engine supported by the chassis;
a continuously variable transmission driven by the engine, the continuously variable transmission including a first clutch, a second clutch, and a belt coupled to the first and second clutches, the first clutch being adjustable to modulate a gear ratio of the continuously variable transmission;
at least one controller configured to control a position of the first clutch of the continuously variable transmission in a manual mode of operation;
a shift request device in communication with the at least one controller, wherein in the manual mode of operation the first clutch of the continuously variable transmission is shifted by the at least one controller between a plurality of discrete fixed positions based on shift requests initiated with the shift request device; and an operator input device in communication with the at least one controller, wherein the at least one controller is operative to initiate a torque reduction of the engine during a shift of the first clutch of the continuously variable transmission from an initial fixed position to a target fixed position, wherein at least one of a magnitude and a duration of the torque reduction is adjustable based on the operator input device.

10. The vehicle of claim 9, wherein the at least one controller includes engine control logic operative to control operation of the engine and transmission control logic operative to control operation of the continuously variable transmission, wherein the transmission control logic generates a torque reduction request received by the engine control logic to initiate the torque reduction of the engine.

11. The vehicle of claim 9, wherein the torque reduction includes at least one of suppressing engine ignition and retarding engine ignition timing during a transition of the first clutch of the continuously variable transmission from the initial fixed position to the target fixed position.

12. The vehicle of claim 9, further including a throttle valve controlled by the at least one controller and configured to regulate a speed of the engine, wherein the torque reduction includes reducing an opening of a throttle valve of the engine during a transition of the first clutch of the continuously variable transmission from the initial fixed position to the target fixed position.

13. The vehicle of claim 9, further including an operating mode selection device in communication with the at least one controller for selecting between an automatic mode of operation and the manual mode of operation, wherein in the automatic mode of operation the position of the first clutch of the continuously variable transmission is varied across a continuous range based on a speed of the engine and a throttle demand.

14. The vehicle of claim 9, wherein an onset delay of the torque reduction is adjustable based on the operator input device, the onset delay including a delay between a receipt of a shift request and the initiation of the torque reduction of the engine.

15. The vehicle of claim 9, wherein the at least one controller varies the at least one of the magnitude and the duration of the torque reduction based on a selected gear ratio of the continuously variable transmission.

* * * * *